US012341624B2

(12) United States Patent
Park et al.

(10) Patent No.: US 12,341,624 B2
(45) Date of Patent: *Jun. 24, 2025

(54) BUILDING MANAGEMENT SYSTEM WITH IDENTITY MANAGEMENT

(71) Applicant: Johnson Controls Technology Company, Auburn Hills, MI (US)

(72) Inventors: Youngchoon Park, Brookfield, WI (US); Sudhi R. Sinha, Milwaukee, WI (US); Erik S. Paulson, Madison, WI (US); Justin Ploegert, Cudahy, WI (US); Dominick O'Dierno, Mt Pleasant, WI (US); Karl F. Reichenberger, Mequon, WI (US)

(73) Assignee: JOHNSON CONTROLS TECHNOLOGY COMPANY, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,295

(22) Filed: Sep. 12, 2023

(65) Prior Publication Data

US 2024/0080219 A1 Mar. 7, 2024

Related U.S. Application Data

(63) Continuation of application No. 17/222,733, filed on Apr. 5, 2021, now Pat. No. 11,764,991, which is a
(Continued)

(51) Int. Cl.
*H04L 12/28* (2006.01)
*G06F 16/901* (2019.01)

(52) U.S. Cl.
CPC ...... *H04L 12/2827* (2013.01); *G06F 16/9024* (2019.01); *H04L 12/2809* (2013.01); *H04L 12/2812* (2013.01); *H04L 12/2832* (2013.01)

(58) Field of Classification Search
CPC .................. H04L 12/2827; H04L 12/2809
(Continued)

(56) References Cited

U.S. PATENT DOCUMENTS 5,301,109 A 4/1994 Landauer et al.
5,446,677 A 8/1995 Jensen et al.
(Continued)

FOREIGN PATENT DOCUMENTS

AU 2019226217 A1 11/2020
AU 2019226264 A1 11/2020
(Continued)

OTHER PUBLICATIONS

Balaji et al, "Brick: Metadata schema for portable smart building applications," Applied Energy, 2018 (20 pages).
(Continued)

*Primary Examiner* — Sibte H Bukhari
(74) *Attorney, Agent, or Firm* — Foley & Lardner LLP

(57) ABSTRACT

A building system for identity management of a building, the building system including one or more storage devices configured to store instructions thereon, that, when executed by one or more processors, cause the one or more processors to receive a request to determine whether an entity has a privilege and determine whether the entity has the privilege by querying, based on the request, a graph database to identity information of the graph database that indicates whether the entity has the privilege, wherein the graph database stores nodes representing at least one of users, equipment, events, or spaces of the building, wherein the graph database stores edges between the nodes representing relationships between the users, equipment, events, or spaces. The instructions cause the one or more processors to generate a response including a determination whether the entity has the privilege.

20 Claims, 42 Drawing Sheets

Related U.S. Application Data continuation-in-part of application No. 16/688,819, filed on Nov. 19, 2019, now Pat. No. 11,108,587, which is a continuation of application No. 16/260,078, filed on Jan. 28, 2019, now Pat. No. 10,505,756, which is a continuation-in-part of application No. 16/048,052, filed on Jul. 27, 2018, now Pat. No. 10,417,451, said application No. 16/260,078 is a continuation-in-part of application No. 16/142,578, filed on Sep. 26, 2018, now Pat. No. 11,307,538, and a continuation-in-part of application No. 16/036,685, filed on Jul. 16, 2018, now Pat. No. 11,280,509, said application No. 16/142,578 is a continuation-in-part of application No. 15/644,581, filed on Jul. 7, 2017, now Pat. No. 10,169,486, said application No. 16/142,578 is a continuation-in-part of application No. 15/644,519, filed on Jul. 7, 2017, now Pat. No. 10,095,756, said application No. 16/142,578 is a continuation-in-part of application No. 15/644,560, filed on Jul. 7, 2017, now Pat. No. 10,417,245, said application No. 16/260,078 is a continuation-in-part of application No. 16/142,758, filed on Sep. 26, 2018.

(60) Provisional application No. 63/005,841, filed on Apr. 6, 2020, provisional application No. 62/611,974, filed on Dec. 29, 2017, provisional application No. 62/533,581, filed on Jul. 17, 2017, provisional application No. 62/564,247, filed on Sep. 27, 2017, provisional application No. 62/611,984, filed on Dec. 29, 2017, provisional application No. 62/612,167, filed on Dec. 29, 2017, provisional application No. 62/457,654, filed on Feb. 10, 2017, provisional application No. 62/588,179, filed on Nov. 17, 2017, provisional application No. 62/588,190, filed on Nov. 17, 2017, provisional application No. 62/611,962, filed on Dec. 29, 2017, provisional application No. 62/588,114, filed on Nov. 17, 2017.

(58) Field of Classification Search
USPC .......................................................... 709/224
See application file for complete search history.

(56) References Cited

U.S. PATENT DOCUMENTS

| | | |
|---|---|---|
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,657,540 B1 | 2/2010 | Bayliss |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,219,736 B1 | 12/2015 | Lewis et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,658,607 B2 | 5/2017 | Coogan et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,454,927 B2 | 10/2019 | Oberhauser et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,600,263 B2 | 3/2020 | Park et al. |
| 10,678,866 B1 | 6/2020 | Ranganathan et al. |
| 10,705,492 B2 | 7/2020 | Harvey |
| 10,708,078 B2 | 7/2020 | Harvey |
| 10,760,815 B2 | 9/2020 | Janakiraman et al. |
| 10,762,475 B2 | 9/2020 | Song et al. |
| 10,798,175 B1 | 10/2020 | Knight et al. |
| 10,824,120 B2 | 11/2020 | Ahmed |
| 10,845,771 B2 | 11/2020 | Harvey |
| 10,853,146 B1 | 12/2020 | Talayco |

(56) References Cited

U.S. PATENT DOCUMENTS

| | | |
|---|---|---|
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,054,796 B2 | 7/2021 | Holaso |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 11,385,613 B2 | 7/2022 | Ludwig et al. |
| 11,556,105 B2 | 1/2023 | Cooley et al. |
| 11,561,522 B2 | 1/2023 | Cooley et al. |
| 11,561,523 B2 | 1/2023 | Cooley et al. |
| 11,573,551 B2 | 2/2023 | Cooley et al. |
| 11,586,167 B2 | 2/2023 | Cooley et al. |
| 11,663,375 B2 | 5/2023 | Brett et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2004/0210348 A1 | 10/2004 | Imhof et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0198228 A1 | 9/2005 | Bajwa et al. |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2009/0287736 A1 | 11/2009 | Shike et al. |
| 2010/0045439 A1 | 2/2010 | Tak et al. |
| 2010/0058248 A1 | 3/2010 | Park |
| 2010/0070981 A1 | 3/2010 | Hadar et al. |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1* | 4/2011 | Mackay ............... G05B 15/02 707/769 |
| 2011/0087988 A1 | 4/2011 | Ray et al. |
| 2011/0088000 A1 | 4/2011 | Mackay |
| 2011/0093424 A1 | 4/2011 | Zimmermann et al. |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0085719 A1 | 4/2013 | Brun et al. |
| 2013/0086010 A1 | 4/2013 | Wenzel et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0268128 A1 | 10/2013 | Casilli et al. |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0168977 A1 | 6/2015 | Oswald et al. |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |

(56) References Cited

U.S. PATENT DOCUMENTS

| | | |
|---|---|---|
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0312696 A1 | 10/2015 | Ribbich et al. |
| 2015/0316902 A1 | 11/2015 | Wenzel et al. |
| 2015/0316907 A1 | 11/2015 | Elbsat et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | McFarland et al. |
| 2016/0014070 A1 | 1/2016 | Adkins |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0255139 A1 | 9/2016 | Rathod |
| 2016/0260063 A1 | 9/2016 | Harris et al. |
| 2016/0292303 A1 | 10/2016 | Hong et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0335865 A1 | 11/2016 | Sayavong et al. |
| 2016/0342906 A1 | 11/2016 | Shaashua et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0286572 A1 | 10/2017 | Hershey et al. |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | MacMillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1* | 12/2017 | Park .................... G06F 3/04847 |
| 2017/0357607 A1 | 12/2017 | Cayemberg et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gartner et al. |
| 2018/0048485 A1 | 2/2018 | Pelton et al. |
| 2018/0069932 A1 | 3/2018 | Tiwari et al. |
| 2018/0075038 A1 | 3/2018 | Azvine et al. |
| 2018/0113897 A1 | 4/2018 | Donlan et al. |
| 2018/0114140 A1 | 4/2018 | Chen et al. |
| 2018/0119975 A1 | 5/2018 | Park et al. |
| 2018/0137288 A1 | 5/2018 | Polyakov |
| 2018/0150753 A1 | 5/2018 | Farrell et al. |
| 2018/0157930 A1 | 6/2018 | Rutschman et al. |
| 2018/0159756 A1 | 6/2018 | Matthews et al. |
| 2018/0159876 A1 | 6/2018 | Park et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0232422 A1 | 8/2018 | Park et al. |
| 2018/0232423 A1 | 8/2018 | Park et al. |
| 2018/0232459 A1 | 8/2018 | Park et al. |
| 2018/0238575 A1 | 8/2018 | Park et al. |
| 2018/0239982 A1 | 8/2018 | Rutschman et al. |
| 2018/0246988 A1 | 8/2018 | Johnson et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0331916 A1 | 11/2018 | Damaggio et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0026359 A1 | 1/2019 | Park et al. |
| 2019/0026710 A1 | 1/2019 | Chow et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0095259 A1 | 3/2019 | Nakamura |
| 2019/0095644 A1 | 3/2019 | Park et al. |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138333 A1 | 5/2019 | Deutsch et al. |
| 2019/0138512 A1 | 5/2019 | Pourmohammad et al. |
| 2019/0138662 A1 | 5/2019 | Deutsch et al. |
| 2019/0138970 A1 | 5/2019 | Deutsch et al. |

(56) References Cited

U.S. PATENT DOCUMENTS

| | | |
|---|---|---|
| 2019/0147883 A1 | 5/2019 | Mellenthin et al. |
| 2019/0155238 A1 | 5/2019 | Srivastava et al. |
| 2019/0158309 A1 | 5/2019 | Park et al. |
| 2019/0163152 A1 | 5/2019 | Worrall et al. |
| 2019/0182273 A1 | 6/2019 | Walsh et al. |
| 2019/0253427 A1 | 8/2019 | Kling et al. |
| 2019/0260831 A1 | 8/2019 | Milev et al. |
| 2019/0268178 A1 | 8/2019 | Fairweather et al. |
| 2019/0288866 A1 | 9/2019 | Smith et al. |
| 2019/0294978 A1 | 9/2019 | Sachs |
| 2019/0310979 A1 | 10/2019 | Masuzaki et al. |
| 2019/0325329 A1 | 10/2019 | Rais-Ghasem et al. |
| 2019/0354544 A1 | 11/2019 | Hertz et al. |
| 2019/0354922 A1 | 11/2019 | Berti et al. |
| 2019/0370671 A1 | 12/2019 | Martinez Canedo et al. |
| 2019/0377306 A1 | 12/2019 | Harvey |
| 2020/0050605 A1 | 2/2020 | Tung et al. |
| 2020/0064007 A1 | 2/2020 | Escapa et al. |
| 2020/0090085 A1 | 3/2020 | Martinez Canedo et al. |
| 2020/0097493 A1 | 3/2020 | Gawrys et al. |
| 2020/0128036 A1 | 4/2020 | Sarzynski et al. |
| 2020/0142365 A1 | 5/2020 | Sharma et al. |
| 2020/0226156 A1 | 7/2020 | Borra et al. |
| 2020/0285203 A1 | 9/2020 | Thakur et al. |
| 2020/0336328 A1 | 10/2020 | Harvey |
| 2020/0348632 A1 | 11/2020 | Harvey |
| 2020/0366697 A1 | 11/2020 | Vittal |
| 2020/0387576 A1 | 12/2020 | Brett et al. |
| 2020/0393157 A1 | 12/2020 | Turney et al. |
| 2020/0396208 A1 | 12/2020 | Brett et al. |
| 2020/0412810 A1 | 12/2020 | Knight et al. |
| 2021/0034357 A1 | 2/2021 | Kesavan et al. |
| 2021/0042299 A1 | 2/2021 | Migliori |
| 2021/0043221 A1 | 2/2021 | Yelchuru et al. |
| 2021/0133670 A1 | 5/2021 | Cella et al. |
| 2021/0173969 A1 | 6/2021 | Abbey et al. |
| 2021/0191826 A1 | 6/2021 | Duraisingh et al. |
| 2021/0200764 A1 | 7/2021 | Ploegert et al. |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2021/0405629 A1 | 12/2021 | Malakuti et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0215264 A1 | 7/2022 | Harvey et al. |
| 2022/0335184 A1 | 10/2022 | Wesley et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |
| 2023/0169220 A1 | 6/2023 | Ramanasankaran et al. |
| 2023/0214555 A1 | 7/2023 | Harvey et al. |
| 2023/0252205 A1 | 8/2023 | Harvey et al. |
| 2023/0334200 A1 | 10/2023 | Meiners |

FOREIGN PATENT DOCUMENTS

| | | |
|---|---|---|
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| CN | 110622139 A | 12/2019 |
| EP | 2 528 033 A1 | 11/2012 |
| EP | 3 268 821 B1 | 1/2018 |
| EP | 3 324 306 A1 | 5/2018 |
| EP | 4 226 263 A1 | 8/2023 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2020/061621 A1 | 4/2020 |
| WO | WO-2021/067731 A2 | 4/2021 |
| WO | WO-2022/042925 A1 | 3/2022 |
| WO | WO-2022/103812 A1 | 5/2022 |
| WO | WO-2022/103813 A1 | 5/2022 |
| WO | WO-2022/103820 A1 | 5/2022 |
| WO | WO-2022/103822 A1 | 5/2022 |
| WO | WO-2022/103824 A1 | 5/2022 |
| WO | WO-2022/103829 A1 | 5/2022 |
| WO | WO-2022/103831 A1 | 5/2022 |

OTHER PUBLICATIONS

Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Balaji, B et al., "Brick: Towards a Unified Metadata Schema For Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://

(56) References Cited

OTHER PUBLICATIONS brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. Ser. No. 201780003995.9 dated Apr. 8, 2021 (21 pages with English language translation).
Chinese Office action on CN Appl. Ser. No. 201780043400.2 dated Apr. 25, 2021 (15 pages with English language translation).
Curry, E et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Noiv. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).

Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT Appl. No. PCT/US2022/034101 dated Oct. 10, 2022 (21 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 15 pages.
International Search Report and Written Opinion on PCT/US2020/058381, dated Jan. 27, 2021, 30 pages.
Japanese Office Action on JP Appl. Ser. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Maryasin, O., "Home Automation System Ontology for Digital Building Twin," 2019 XXI International Conference Complex Systems: Control and Modeling Problems (CSCMP), IEEE, Sep. 2019 (pp. 70-74).
Microsoft, "Azure Digital Twins: Next-generation IoT solutions that model the real world," URL: https://azure.microsoft.com/en-us/services/digital-twins/, Retrieved Jan. 8, 2021, 12 pages.

(56) References Cited

OTHER PUBLICATIONS

Nissin Electric Co., Ltd., "Smart power supply system (SPSS)," Outline of the scale verification plan, Nissin Electric Technical Report, Japan, Apr. 23, 2014, vol. 59, No. 1 (23 pages with English language abstract).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, First ed. published 2020 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing Ltd., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2023 (7 pages).
Valtolina et al., "Ontology-Based Consistent Specification of Sensor Data Acquisition Plans in Cross-Domain IoT Platforms," IEEE Access, Dec. 2019, vol. 7 (pp. 176141-176169).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wang et al., "Linking energy-cyber-physical systems with occupancy prediction and interpretation through WiFi probe-based ensemble classification," Applied Energy, 2019, vol. 236 (pp. 55-69).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Yao et al., "State of the art review on model predictive control (MPC) in Heating Ventilation and Air-conditioning (HVAC) field," Building and Environment, 2021, vol. 200 (18 pages).
Zhou, Q. et al., "Knowledge-infused and Consistent Complex Event Processing over Real-time and Persistent Streams," Further Generation Computer Systems, 2017, 76 (pp. 391-406).
Australian Examination Report No. 1 on AU Appl. No. 2024219353 dated Sep. 20, 2024 (3 pages).

* cited by examiner

FIG. 31

Entity Relationship Manager

My Dashboard >

Collection List > Collections: uatidentitygraph

Relationships

[ ADD RELATIONSHIP ] [ ADD ENTITY ] [ ER IMPORTER ]

Entities

| | ENTITY NAME | ENTITY TYPE | | | |
|---|---|---|---|---|---|
| ☐ | AspireDome HW Badge... | Brick_Badge | ◆ | ✏ | ▦ |
| ☐ | TICKETHOLDER_NADER_A... | Brick_Person | ◆ | ✏ | ▦ |
| ☐ | NaderA | Brick_Person | ◆ | ✏ | ▦ |
| ☐ | Alexander Nader | Brick_Person | ◆ | ✏ | ▦ |
| ☐ | Alito Record 532521 | Brick_Vehicle | ◆ | ✏ | ▦ |
| ☐ | Alex Nader:Fingerpri... | Brick_Credentials | ◆ | ✏ | ▦ |

« < 1 > »

Page 1 of 1    Show [10] per page

Help  Contact Us  Privacy  Terms

Good Evening, Bruce Banner

FIG. 32

Entity Relationship Manager

My Dashboard >
Entity Relationship Manager

Good Evening, Bruce Banner

Collection List > Collections: uatidentitygraph

Relationships

[ADD RELATIONSHIP] [ADD ENTITY] [ER IMPORTER]

| ENTITY NAME | ENTITY TYPE | | | |
|---|---|---|---|---|
| AspireDome HW Badge... | Brick_Badge | ◉ | ✎ | ▦ |
| TICKETHOLDER_NADER A... | Brick_Person | ◉ | ✎ | ▦ |
| NaderA | Brick_Person | ◉ | ✎ | ▦ |
| Alexander Nader | Brick_Person | ◉ | ✎ | ▦ |
| Alex Nader | Brick_Person | ◉ | ✎ | ▦ |

Page 1 of 1   « ‹ [1] › »

Show [10] per page

Help   Contact Us   Privacy   Terms

Entity Relationship Manager

My Dashboard > Collection List > Collections: uatidentitygraph > Details: AspireDome HW Badge 13224

View Entity: AspireDome HW Badge 13224

EDIT ENTITY

Good Evening, Bruce Banner

| Details | Total Number of Relationships | 4 |
|---|---|---|
| Relationships | Total Number of Relationship Types | 6 |
| MetaData | | |

| Relationship | Related Entity | Relationship ID |
|---|---|---|
| ▪ Brick__hasCredentials | NADER_ALEX_FPRINT_3_APR_2019_01 | NADER_ALEX_FPRINT_SCAN_001 |
| ▪ Brick__isSameAs | Anader_Oracle_HR | Golden_HR_isSameAs_DIG_5320 |
| | HW_PROWATCH_NaderA | Golden_DomeProwatch_isSameAs_DIG_5320 |
| | FIFA_73782_NADER_ALEX | Golden_FIFA_isSameAs_DIG_5320 |
| ▪ ◉ undefined | | |

ADD RELATIONSHIP

Help   Contact Us   Privacy   Terms

FIG. 37

| | | | |
|---|---|---|---|
| ≡ ◻ | | | ● Good Evening, Bruce Banner ▾ |
| ▦ My Dashboard > <br> ▦ Entity Relationship Manager | | | |
| Collection List > Collections: uatidentitygraph > Details: Alex Nader | | | |
| View Entity: Alex Nader | | | |
| Details | Total Number of Relationships | 3 | |
| Relationships | Total Number of Relationship Types | 5 | |
| MetaData | | | ✎ EDIT ENTITY |
| | Relationship | Related Entity | Relationship ID |
| | ▫ Brick__IsSameAs | | |
| | | Anader_Oracle_HR | Golden_HR_isSameAs_DIG_5320 |
| | | HW_PROWATCH_NaderA | Golden_DomeProwatch_isSameAs_DIG_5320 |
| | | FIFA_73782_NADER_ALEX | Golden_FIFA_isSameAs_DIG_5320 |
| | ▫ ● undefined | | |
| | ⛓ ADD RELATIONSHIP | | |
| | | | Help Contact Us Privacy Terms |

BUILDING MANAGEMENT SYSTEM WITH IDENTITY MANAGEMENT

CROSS-REFERENCE TO RELATED PATENT APPLICATIONS

This application is a continuation of U.S. patent application Ser. No. 17/222,733 filed Apr. 5, 2021, which claims the benefit of and priority to U.S. Provisional Patent Application No. 63/005,841 filed Apr. 6, 2020. U.S. patent application Ser. No. 17/222,733 filed Apr. 5, 2021 is also a continuation-in-part of U.S. patent application Ser. No. 16/688,819 filed Nov. 19, 2019 (now U.S. Pat. No. 11,108,587) which is a continuation of U.S. patent application Ser. No. 16/260,078 filed Jan. 28, 2019 (now U.S. Pat. No. 10,505,756) which is a continuation-in-part of U.S. patent application Ser. No. 16/048,052 filed Jul. 27, 2018 (now U.S. Pat. No. 10,417,451), which claims the benefit of and priority to U.S. Provisional Patent Application No. 62/564,247 filed Sep. 27, 2017, U.S. Provisional Patent Application No. 62/611,984 filed Dec. 29, 2017, and U.S. Provisional Patent Application No. 62/611,974 filed Dec. 29, 2017. U.S. patent application Ser. No. 16/260,078 filed Jan. 28, 2019 (now U.S. Pat. No. 10,505,756) is also a continuation-in-part of U.S. patent application Ser. No. 16/142,578 filed Sep. 26, 2018 (now U.S. Pat. No. 11,307,538), which claims the benefit of and priority to U.S. Provisional Patent Application No. 62/564,247 filed Sep. 27, 2017, and U.S. Provisional Patent Application No. 62/612,167 filed Dec. 29, 2017. U.S. patent application Ser. No. 16/142,578 filed Sep. 26, 2018 is a continuation-in-part of U.S. patent application Ser. No. 15/644,519 filed Jul. 7, 2017 (now U.S. Pat. No. 10,095,756), which claims the benefit of and priority to U.S. Provisional Patent Application No. 62/457,654 filed Feb. 10, 2017. U.S. patent application Ser. No. 16/142,578 filed Sep. 26, 2018 is also a continuation-in-part of U.S. patent application Ser. No. 15/644,581 filed Jul. 7, 2017 (now U.S. Pat. No. 10,169,486), which claims the benefit of and priority to U.S. Provisional Patent Application No. 62/457,654 filed Feb. 10, 2017. U.S. patent application Ser. No. 16/142,578 filed Sep. 26, 2018 is also a continuation-in-part of U.S. patent application Ser. No. 15/644,560 filed Jul. 7, 2017 (now U.S. Pat. No. 10,417,245), which claims the benefit of and priority to U.S. Provisional Patent Application No. 62/457,654 filed Feb. 10, 2017. U.S. patent application Ser. No. 16/260,078 filed Jan. 28, 2019 (now U.S. Pat. No. 10,505,756) is also a continuation-in-part of U.S. patent application Ser. No. 16/142,758 filed Sep. 26, 2018 which claims the benefit of and priority to U.S. Provisional Patent Application No. 62/564,247 filed Sep. 27, 2017, U.S. Provisional Patent Application No. 62/588,179 filed Nov. 17, 2017, U.S. Provisional Patent Application No. 62/588,190 filed Nov. 17, 2017, U.S. Provisional Patent Application No. 62/588,114 filed Nov. 17, 2017, and U.S. Provisional Patent Application No. 62/611,962 filed Dec. 29, 2017. U.S. patent application Ser. No. 16/260,078 filed Jan. 28, 2019 is also a continuation-in-part of U.S. patent application Ser. No. 16/036,685 filed Jul. 16, 2018, which claims the benefit of and priority to U.S. Provisional Patent Application No. 62/533,581 filed Jul. 17, 2017. The entirety of each of these patent applications are incorporated by reference herein.

BACKGROUND

This application relates generally to identity management. More specifically, this application relates to identity management for building systems. Identity management systems can track users and what abilities those users have. For example, credentials of users can be linked to abilities that the users can perform, e.g., login credentials for accessing a system. However, managing, updating, and interpreting the abilities that the users have can be a resource intensive process. For example, various policies for a large group of users can be stored on a very granular level for implementing each ability of a user, this can require a significant amount of configuration time and may be difficult for a user to interpret, understand, and manage.

SUMMARY

One implementation of the present disclosure is a building system for identity management of a building, the building system including one or more storage devices configured to store instructions thereon, that, when executed by one or more processors, cause the one or more processors to receive a request to determine whether an entity has a privilege, determine whether the entity has the privilege by querying, based on the request, a graph database to identity information of the graph database that indicates whether the entity has the privilege, wherein the graph database stores nodes representing at least one of users, equipment, events, or spaces of the building, wherein the graph database stores edges between the nodes representing relationships between the users, equipment, events, or spaces, and generate a response including a determination whether the entity has the privilege.

In some embodiments, the entity is at least one of a user, a device, a system, or a space of the building.

In some embodiments, the graph database include a first node of the nodes representing the entity and a second node of the nodes representing the privilege. In some embodiments, querying the graph database to identity the information of the graph database that indicates whether the entity has the privilege includes identifying whether one or more edges of the edges link the first node to the second node.

In some embodiments, the graph database includes one or more nodes of the nodes representing at least one of roles of the entity, an organization of the entity, or a group associated with the entity, wherein the graph database includes one or more first edges of the edges between a first node of the nodes representing the entity and the one or more nodes of the nodes and one or more second edges of the edges between the one or more nodes and a second node representing the privilege. In some embodiments, querying, based on the request, the graph database to identity the information of the graph database that indicates whether the entity has the privilege includes identifying the one or more first edges between the first node representing the entity and the one or more nodes and the one or more second edges between the one or more nodes and the second node representing the privilege.

In some embodiments, the instructions cause the one or more processors to receive a privileges for entities from a first system of the building and store the privileges in the graph database, identify the privileges for the entities by querying at least the graph database, and send the privileges to a second system for enforcement by the second system.

In some embodiments, the graph database includes a node of the nodes representing the entity and a second node of the nodes representing a different entity. In some embodiments, the graph database includes a first directional edge of the edges from the node to the second node representing a first relationship between the entity and the different entity. In some embodiments, the graph database includes a second directional edge of the edges from the node to the second node representing a second relationship different than the first relationship between the entity and the different entity.

In some embodiments, the graph database includes a first node of the nodes representing the entity, a second node of the nodes representing a credential of the entity, and a third node of the nodes representing a second credential of the entity. In some embodiments, the edges include a first edge of the edges between the first node and the second node associating the credential to the entity and a second edge of the edges between the first node and the third node associating the second credential to the entity. In some embodiments, the instructions cause the one or more processors to verify the credential and the second credential for the entity by querying the graph database and identifying the first edge between the first node and the second node and identifying the second edge between the first node and the third node.

In some embodiments, the instructions cause the one or more processors to determine whether the entity has the privilege by identifying a policy rule of policy rules that applies to the privilege and interpreting the policy rule by querying the graph database to identify the information of the graph database, the information providing an interpretation of the policy rule that indicates whether the entity has the privilege.

In some embodiments, querying the graph database to identity the information includes identifying one or more particular edges of the edges between a first node of the nodes representing a first entity included within the policy rule and a second node of the nodes representing a second entity associated with the privilege.

Another implementation of the present disclosure is a method including receiving, by a processing circuit, a request to determine whether an entity has a privilege. The method includes determining, by the processing circuit, whether the entity has the privilege by querying, based on the request, a graph database to identity information of the graph database that indicates whether the entity has the privilege, wherein the graph database stores nodes representing at least one of users, equipment, events, or spaces of the building, wherein the graph database stores edges between the nodes representing relationships between the users, equipment, events, or spaces and generating, by the processing circuit, a response including a determination whether the entity has the privilege.

In some embodiments, the entity is at least one of a user, a device, a system, or a space of the building.

In some embodiments, the graph database include a first node of the nodes representing the entity and a second node of the nodes representing the privilege. In some embodiments, querying the graph database to identity the information of the graph database that indicates whether the entity has the privilege includes identifying whether one or more edges of the edges link the first node to the second node.

In some embodiments, the graph database includes one or more nodes of the f nodes representing at least one of roles of the entity, an organization of the entity, or a group associated with the entity, wherein the graph database includes one or more first edges of the edges between a first node of the nodes representing the entity and the one or more nodes of the nodes and one or more second edges of the edges between the one or more nodes and a second node representing the privilege. In some embodiments, querying, based on the request, the graph database to identity the information of the graph database that indicates whether the entity has the privilege includes identifying the one or more first edges between the first node representing the entity and the one or more nodes and the one or more second edges between the one or more nodes and the second node representing the privilege.

In some embodiments, the method includes receiving, by the processing circuit, privileges for entities from a first system of the building and store the privileges in the graph database, identifying, by the processing circuit, the privileges for the entities by querying at least the graph database, and sending, by the processing circuit, the privileges to a second system for enforcement by the second system.

In some embodiments, the graph database includes a node of the nodes representing the entity and a second node of the nodes representing a different entity. In some embodiments, the graph database includes a first directional edge of the edges from the node to the second node representing a first relationship between the entity and the different entity. In some embodiments, the graph database includes a second directional edge of the edges from the node to the second node representing a second relationship different than the first relationship between the entity and the different entity.

In some embodiments, the graph database includes a first node of the nodes representing the entity, a second node of the nodes representing a credential of the entity, and a third node of the nodes representing a second credential of the entity. In some embodiments, wherein the edges include a first edge of the edges between the first node and the second node associating the credential to the entity and a second edge of the edges between the first node and the third node associating the second credential to the entity. In some embodiments, the method further includes verifying, by the processing circuit, the credential and the second credential for the entity by querying the graph database and identifying the first edge between the first node and the second node and identifying the second edge between the first node and the third node.

In some embodiments, determining, by the processing circuit, whether the entity has the privilege includes identifying a policy rule of policy rules that applies to the privilege and interpreting the policy rule by querying the graph database to identify the information of the graph database, the information providing an interpretation of the policy rule that indicates whether the entity has the privilege.

In some embodiments, querying the graph database to identity the information includes identifying one or more particular edges of the edges between a first node of the nodes representing a first entity included within the policy rule and a second node of the nodes representing a second entity associated with the privilege.

Another implementation of the present disclosure is one or more storage devices configured to store instructions thereon, that, when executed by one or more processors, cause the one or more processors to receive a request to determine whether an entity has a privilege, determine whether the entity has the privilege by querying, based on the request, a graph database to identity information of the graph database that indicates whether the entity has the privilege, wherein the graph database stores nodes representing at least one of users, equipment, events, or spaces of a building, wherein the graph database stores edges between the nodes representing relationships between the users, equipment, events, or spaces, and generate a response including a determination whether the entity has the privilege.

In some embodiments, the entity is at least one of a user, a device, a system, or a space of the building.

BRIEF DESCRIPTION OF THE DRAWINGS

The above and other aspects and features of the present disclosure will become more apparent to those skilled in the art from the following detailed description of the example embodiments with reference to the accompanying drawings.

FIG. 31 is an interface illustrating a vehicle object for an identity graph and properties of the vehicle object, according to an exemplary embodiment.

FIGS. 32-33 are interfaces including entity names and entity types of an entity graph, according to an exemplary embodiment.

FIG. 35 is an interface illustrating a user object, according to an exemplary embodiment.

FIG. 36 is an interface illustrating a user badge, according to an exemplary embodiment.

FIGS. 37-40 are interfaces for editing relationships of an entity graph, according to an exemplary embodiment.

DETAILED DESCRIPTION

Figure 1:
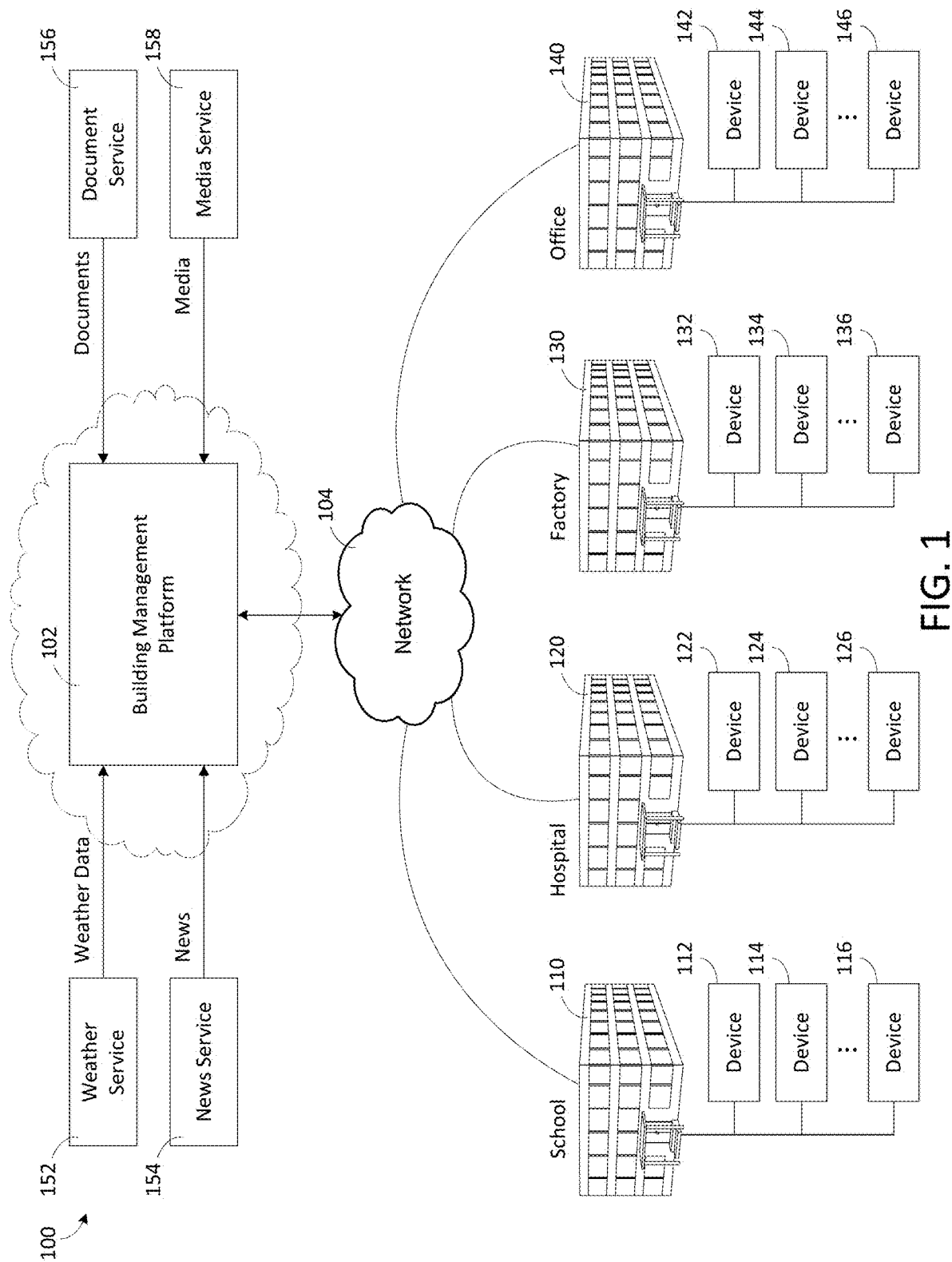
FIG. 1 is a block diagram of a smart building environment, according to an exemplary embodiment.

Hereinafter, example embodiments will be described in more detail with reference to the accompanying drawings. FIG. 1 is a block diagram of a smart building environment 100, according to some exemplary embodiments. Smart building environment 100 is shown to include a building management platform 102. Building management platform 102 can be configured to collect data from a variety of different data sources. For example, building management platform 102 is shown collecting data from buildings 110, 120, 130, and 140. For example, the buildings may include a school 110, a hospital 120, a factory 130, an office building 140, and/or the like. However the present disclosure is not limited to the number or types of buildings 110, 120, 130, and 140 shown in FIG. 1. For example, in some embodiments, building management platform 102 may be configured to collect data from one or more buildings, and the one or more buildings may be the same type of building, or may include one or more different types of buildings than that shown in FIG. 1.

Building management platform 102 can be configured to collect data from a variety of devices 112-116, 122-126, 132-136, and 142-146, either directly (e.g., directly via network 104) or indirectly (e.g., via systems or applications in the buildings 110, 120, 130, 140). In some embodiments, devices 112-116, 122-126, 132-136, and 142-146 are internet of things (IoT) devices. IoT devices may include any of a variety of physical devices, sensors, actuators, electronics, vehicles, home appliances, and/or other items having network connectivity which enable IoT devices to communicate with building management platform 102. For example, IoT devices can include smart home hub devices, smart house devices, doorbell cameras, air quality sensors, smart switches, smart lights, smart appliances, garage door openers, smoke detectors, heart monitoring implants, biochip transponders, cameras streaming live feeds, automobiles with built-in sensors, DNA analysis devices, field operation devices, tracking devices for people/vehicles/equipment, networked sensors, wireless sensors, wearable sensors, environmental sensors, RFID gateways and readers, IoT gateway devices, robots and other robotic devices, GPS devices, smart watches, virtual/augmented reality devices, and/or other networked or networkable devices. While the devices described herein are generally referred to as IoT devices, it should be understood that, in various embodiments, the devices referenced in the present disclosure could be any type of devices capable of communicating data over an electronic network.

In some embodiments, IoT devices may include sensors or sensor systems. For example, IoT devices may include acoustic sensors, sound sensors, vibration sensors, automotive or transportation sensors, chemical sensors, electric current sensors, electric voltage sensors, magnetic sensors, radio sensors, environment sensors, weather sensors, moisture sensors, humidity sensors, flow sensors, fluid velocity sensors, ionizing radiation sensors, subatomic particle sensors, navigation instruments, position sensors, angle sensors, displacement sensors, distance sensors, speed sensors, acceleration sensors, optical sensors, light sensors, imaging devices, photon sensors, pressure sensors, force sensors, density sensors, level sensors, thermal sensors, heat sensors, temperature sensors, proximity sensors, presence sensors, and/or any other type of sensors or sensing systems.

Examples of acoustic, sound, or vibration sensors include geophones, hydrophones, lace sensors, guitar pickups, microphones, and seismometers. Examples of automotive or transportation sensors include air flow meters, air-fuel ratio (AFR) meters, blind spot monitors, crankshaft position sensors, defect detectors, engine coolant temperature sensors, Hall effect sensors, knock sensors, map sensors, mass flow sensors, oxygen sensors, parking sensors, radar guns, speedometers, speed sensors, throttle position sensors, tire-pressure monitoring sensors, torque sensors, transmission fluid temperature sensors, turbine speed sensors, variable reluctance sensors, vehicle speed sensors, water sensors, and wheel speed sensors.

Examples of chemical sensors include breathalyzers, carbon dioxide sensors, carbon monoxide detectors, catalytic bead sensors, chemical field-effect transistors, chemiresistors, electrochemical gas sensors, electronic noses, electrolyte-insulator-semiconductor sensors, fluorescent chloride sensors, holographic sensors, hydrocarbon dew point analyzers, hydrogen sensors, hydrogen sulfide sensors, infrared point sensors, ion-selective electrodes, nondispersive infrared sensors, microwave chemistry sensors, nitrogen oxide sensors, olfactometers, optodes, oxygen sensors, ozone monitors, pellistors, pH glass electrodes, potentiometric sensors, redox electrodes, smoke detectors, and zinc oxide nanorod sensors.

Examples of electromagnetic sensors include current sensors, Daly detectors, electroscopes, electron multipliers, Faraday cups, galvanometers, Hall effect sensors, Hall probes, magnetic anomaly detectors, magnetometers, magnetoresistances, mems magnetic field sensors, metal detectors, planar hall sensors, radio direction finders, and voltage detectors.

Examples of environmental sensors include actinometers, air pollution sensors, bedwetting alarms, ceilometers, dew warnings, electrochemical gas sensors, fish counters, frequency domain sensors, gas detectors, hook gauge evaporimeters, humistors, hygrometers, leaf sensors, lysimeters, pyranometers, pyrgeometers, psychrometers, rain gauges, rain sensors, seismometers, SNOTEL sensors, snow gauges, soil moisture sensors, stream gauges, and tide gauges. Examples of flow and fluid velocity sensors include air flow meters, anemometers, flow sensors, gas meter, mass flow sensors, and water meters.

Examples of radiation and particle sensors include cloud chambers, Geiger counters, Geiger-Muller tubes, ionisation chambers, neutron detections, proportional counters, scintillation counters, semiconductor detectors, and thermoluminescent dosimeters. Examples of navigation instruments include air speed indicators, altimeters, attitude indicators, depth gauges, fluxgate compasses, gyroscopes, inertial navigation systems, inertial reference nits, magnetic compasses, MHD sensors, ring laser gyroscopes, turn coordinators, tialinx sensors, variometers, vibrating structure gyroscopes, and yaw rate sensors.

Examples of position, angle, displacement, distance, speed, and acceleration sensors include auxanometers, capacitive displacement sensors, capacitive sensing devices, flex sensors, free fall sensors, gravimeters, gyroscopic sensors, impact sensors, inclinometers, integrated circuit piezoelectric sensors, laser rangefinders, laser surface velocimeters, Light Detection And Ranging (LIDAR) sensors, linear encoders, linear variable differential transformers (LVDT), liquid capacitive inclinometers odometers, photoelectric sensors, piezoelectric accelerometers, position sensors, position sensitive devices, angular rate sensors, rotary encoders, rotary variable differential transformers, selsyns, shock detectors, shock data loggers, tilt sensors, tachometers, ultrasonic thickness gauges, variable reluctance sensors, and velocity receivers.

Examples of optical, light, imaging, and photon sensors include charge-coupled devices, complementary metal-oxide-semiconductor (CMOS) sensors, colorimeters, contact image sensors, electro-optical sensors, flame detectors, infra-red sensors, kinetic inductance detectors, led as light sensors, light-addressable potentiometric sensors, Nichols radiometers, fiber optic sensors, optical position sensors, thermopile laser sensors, photodetectors, photodiodes, photomultiplier tubes, phototransistors, photoelectric sensors, photoionization detectors, photomultipliers, photoresistors, photoswitches, phototubes, scintillometers, Shack-Hartmann sensors, single-photon avalanche diodes, superconducting nanowire single-photon detectors, transition edge sensors, visible light photon counters, and wavefront sensors.

Examples of pressure sensors include barographs, barometers, boost gauges, bourdon gauges, hot filament ionization gauges, ionization gauges, McLeod gauges, oscillating u-tubes, permanent downhole gauges, piezometers, pirani gauges, pressure sensors, pressure gauges, tactile sensors, and time pressure gauges. Examples of force, density, and level sensors include bhangmeters, hydrometers, force gauge and force sensors, level sensors, load cells, magnetic level gauges, nuclear density gauges, piezocapacitive pressure sensors, piezoelectric sensors, strain gauges, torque sensors, and viscometers.

Examples of thermal, heat, and temperature sensors include bolometers, bimetallic strips, calorimeters, exhaust gas temperature gauges, flame detections, Gardon gauges, Golay cells, heat flux sensors, infrared thermometers, microbolometers, microwave radiometers, net radiometers, quartz thermometers, resistance thermometers, silicon bandgap temperature sensors, special sensor microwave/imagers, temperature gauges, thermistors, thermocouples, thermometers, and pyrometers. Examples of proximity and presence sensors include alarm sensors, Doppler radars, motion detectors, occupancy sensors, proximity sensors, passive infrared sensors, reed switches, stud finders, triangulation sensors, touch switches, and wired gloves.

In some embodiments, different sensors send measurements or other data to building management platform 102 using a variety of different communications protocols or data formats. Building management platform 102 can be configured to ingest sensor data received in any protocol or data format and translate the inbound sensor data into a common data format. Building management platform 102 can create a sensor object smart entity for each sensor that communicates with Building management platform 102. Each sensor object smart entity may include one or more static attributes that describe the corresponding sensor, one or more dynamic attributes that indicate the most recent values collected by the sensor, and/or one or more relational attributes that relate sensors object smart entities to each other and/or to other types of smart entities (e.g., space entities, system entities, data entities, etc.).

In some embodiments, building management platform 102 stores sensor data using data entities. Each data entity may correspond to a particular sensor and may include a timeseries of data values received from the corresponding sensor. In some embodiments, building management platform 102 stores relational entities that define relationships between sensor object entities and the corresponding data entity. For example, each relational entity may identify a particular sensor object entity, a particular data entity, and may define a link between such entities.

Building management platform 102 can collect data from a variety of external systems or services. For example, building management platform 102 is shown receiving weather data from a weather service 152, news data from a news service 154, documents and other document-related data from a document service 156, and media (e.g., video, images, audio, social media, etc.) from a media service 158 (hereinafter referred to collectively as $3^{rd}$ party services). In some embodiments, building management platform 102 generates data internally. For example, building management platform 102 may include a web advertising system, a website traffic monitoring system, a web sales system, or other types of platform services that generate data. The data generated by building management platform 102 can be collected, stored, and processed along with the data received from other data sources. Building management platform 102 can collect data directly from external systems or devices or via a network 104 (e.g., a WAN, the Internet, a cellular network, etc.). Building management platform 102 can process and transform collected data to generate timeseries data and entity data. Several features of building management platform 102 are described in more detail below.

Building HVAC Systems and Building Management Systems

Figure 2:
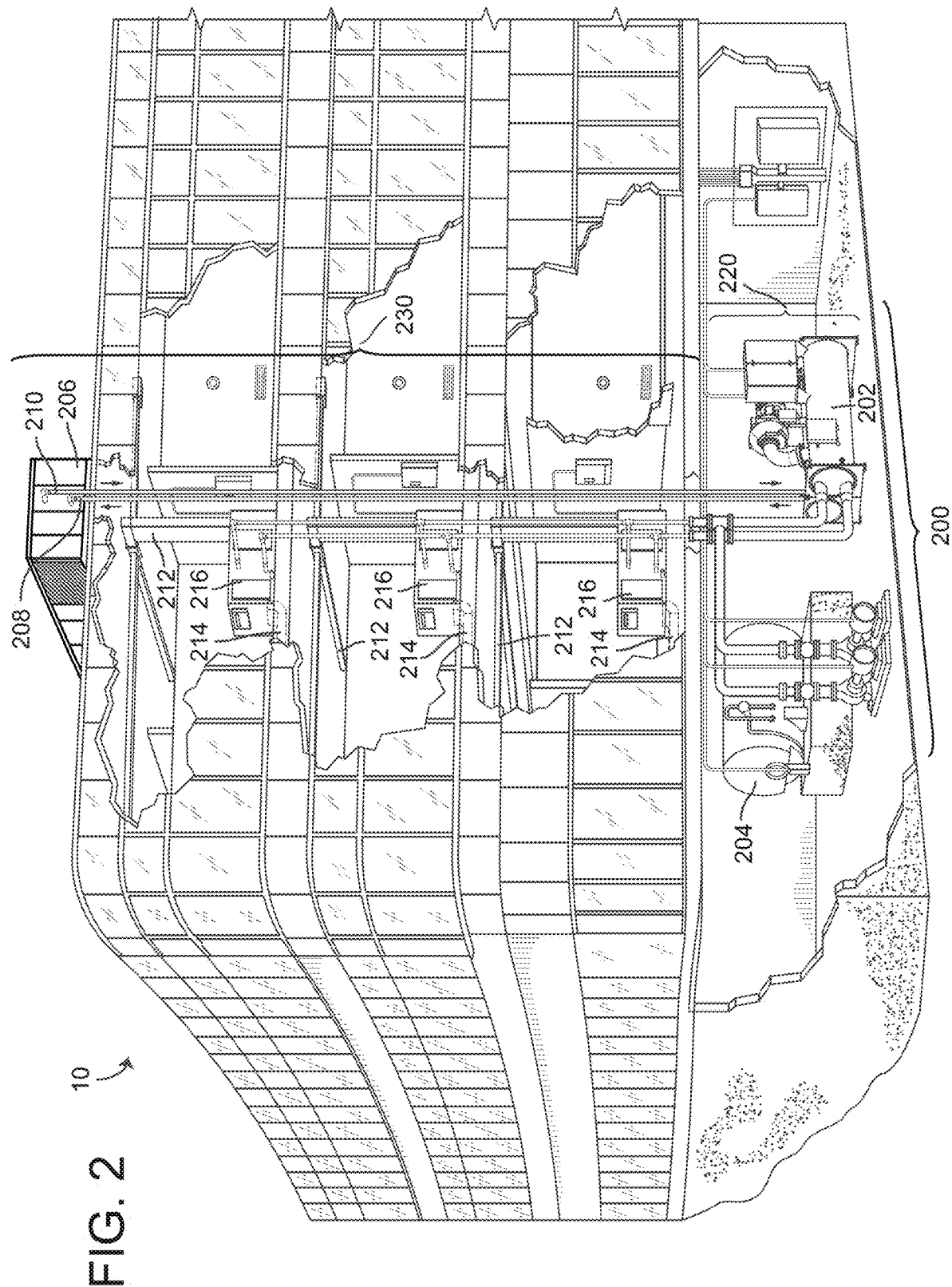
FIG. 2 is a perspective view of a smart building, according to an exemplary embodiment.
Figure 3:
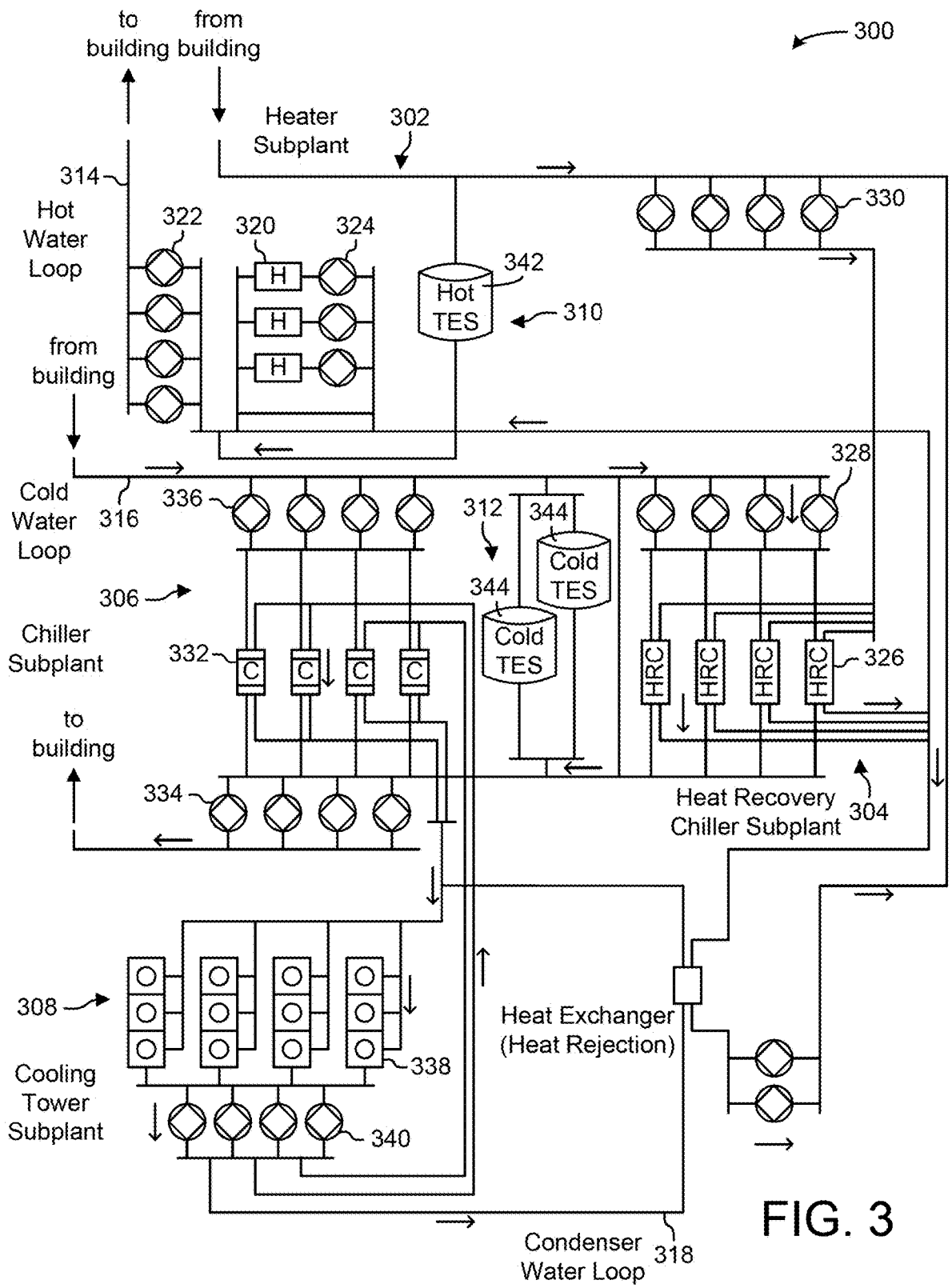
FIG. 3 is a block diagram of a waterside system, according to an exemplary embodiment.
Figure 4:
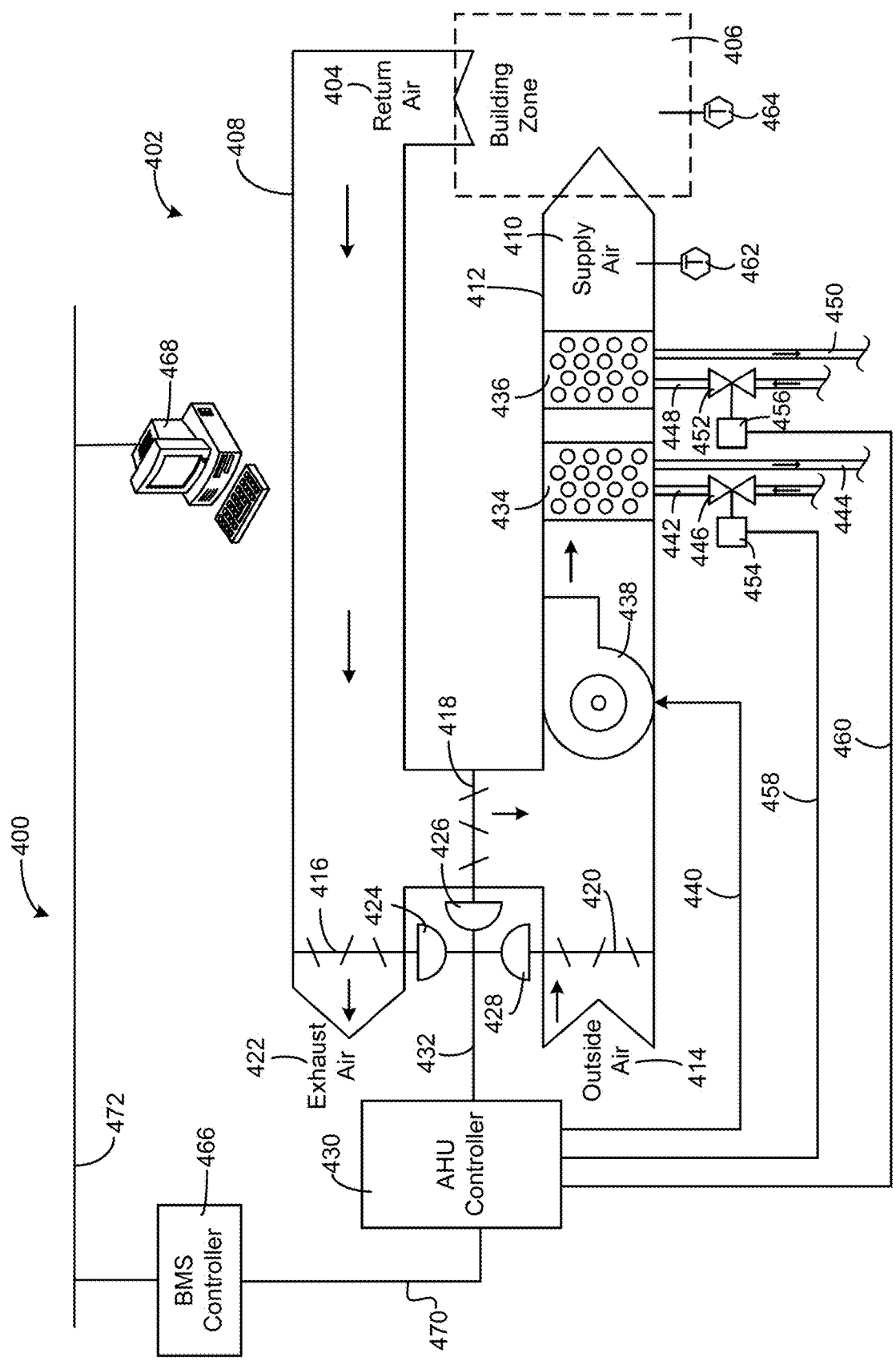
FIG. 4 is a block diagram of an airside system, according to an exemplary embodiment.
Figure 5:
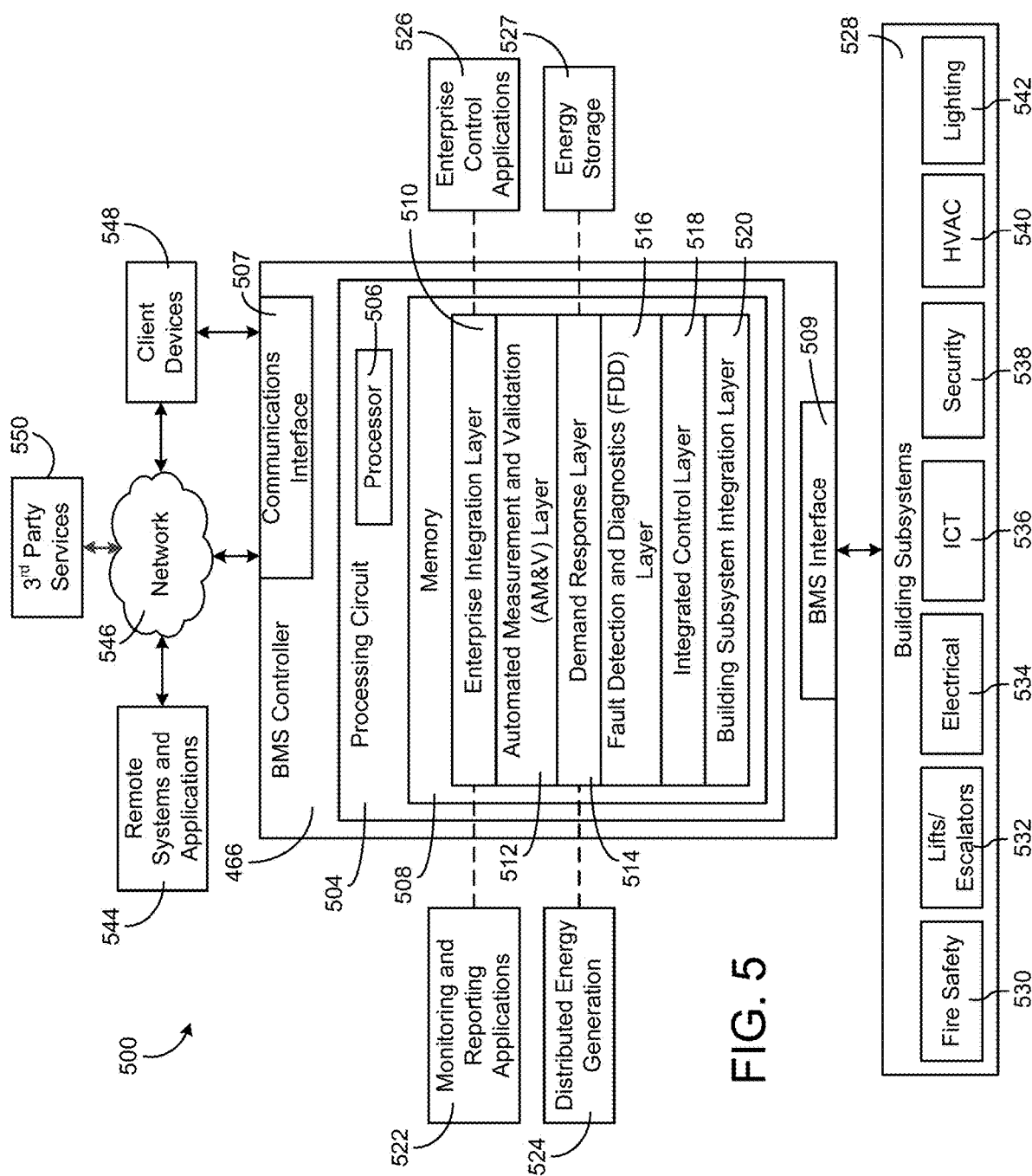
FIG. 5 is a block diagram of a building management system, according to an exemplary embodiment.

Referring now to FIGS. 2-5, several building management systems (BMS) and HVAC systems in which the systems and methods of the present disclosure can be implemented are shown, according to some embodiments. In brief overview, FIG. 2 shows a building 10 equipped with, for example, a HVAC system 200. Building 10 may be any of the buildings 210, 220, 230, and 140 as shown in FIG. 1, or may be any other suitable building that is communicatively connected to building management platform 102. FIG. 3 is a block diagram of a waterside system 300 which can be used to serve building 10. FIG. 4 is a block diagram of an airside system 400 which can be used to serve building 10. FIG. 5 is a block diagram of a building management system (BMS) which can be used to monitor and control building 10.

Building and HVAC System

Referring particularly to FIG. 2, a perspective view of a smart building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and any other system that is capable of managing building functions or devices, or any combination thereof. Further, each of the systems may include sensors and other devices (e.g., IoT devices) for the proper operation, maintenance, monitoring, and the like of the respective systems.

The BMS that serves building 10 includes a HVAC system 200. HVAC system 200 can include HVAC devices (e.g., heaters, chillers, air handling units, pumps, fans, thermal energy storage, etc.) configured to provide heating, cooling, ventilation, or other services for building 10. For example, HVAC system 200 is shown to include a waterside system 220 and an airside system 230. Waterside system 220 may provide a heated or chilled fluid to an air handling unit of airside system 230. Airside system 230 may use the heated or chilled fluid to heat or cool an airflow provided to building 10. An exemplary waterside system and airside system which can be used in HVAC system 200 are described in greater detail with reference to FIGS. 3 and 4.

HVAC system 200 is shown to include a chiller 202, a boiler 204, and a rooftop air handling unit (AHU) 206. Waterside system 220 may use boiler 204 and chiller 202 to heat or cool a working fluid (e.g., water, glycol, etc.) and may circulate the working fluid to AHU 206. In various embodiments, the HVAC devices of waterside system 220 can be located in or around building 10 (as shown in FIG. 2) or at an offsite location such as a central plant (e.g., a chiller plant, a steam plant, a heat plant, etc.). The working fluid can be heated in boiler 204 or cooled in chiller 202, depending on whether heating or cooling is required in building 10. Boiler 204 may add heat to the circulated fluid, for example, by burning a combustible material (e.g., natural gas) or using an electric heating element. Chiller 202 may place the circulated fluid in a heat exchange relationship with another fluid (e.g., a refrigerant) in a heat exchanger (e.g., an evaporator) to absorb heat from the circulated fluid. The working fluid from chiller 202 and/or boiler 204 can be transported to AHU 206 via piping 208.

AHU 206 may place the working fluid in a heat exchange relationship with an airflow passing through AHU 206 (e.g., via one or more stages of cooling coils and/or heating coils). The airflow can be, for example, outside air, return air from within building 10, or a combination of both. AHU 206 may transfer heat between the airflow and the working fluid to provide heating or cooling for the airflow. For example, AHU 206 can include one or more fans or blowers configured to pass the airflow over or through a heat exchanger containing the working fluid. The working fluid may then return to chiller 202 or boiler 204 via piping 210.

Airside system 230 may deliver the airflow supplied by AHU 206 (i.e., the supply airflow) to building 10 via air supply ducts 212 and may provide return air from building 10 to AHU 206 via air return ducts 214. In some embodiments, airside system 230 includes multiple variable air volume (VAV) units 216. For example, airside system 230 is shown to include a separate VAV unit 216 on each floor or zone of building 10. VAV units 216 can include dampers or other flow control elements that can be operated to control an amount of the supply airflow provided to individual zones of building 10. In other embodiments, airside system 230 delivers the supply airflow into one or more zones of building 10 (e.g., via supply ducts 212) without using intermediate VAV units 216 or other flow control elements. AHU 206 can include various sensors (e.g., temperature sensors, pressure sensors, etc.) configured to measure attributes of the supply airflow. AHU 206 may receive input from sensors located within AHU 206 and/or within the building zone and may adjust the flow rate, temperature, or other attributes of the supply airflow through AHU 206 to achieve setpoint conditions for the building zone.

Waterside System

Referring now to FIG. 3, a block diagram of a waterside system 300 is shown, according to some embodiments. In various embodiments, waterside system 300 may supplement or replace waterside system 220 in HVAC system 200 or can be implemented separate from HVAC system 200. When implemented in HVAC system 200, waterside system 300 can include a subset of the HVAC devices in HVAC system 200 (e.g., boiler 204, chiller 202, pumps, valves, etc.) and may operate to supply a heated or chilled fluid to AHU 206. The HVAC devices of waterside system 300 can be located within building 10 (e.g., as components of waterside system 220) or at an offsite location such as a central plant.

In FIG. 3, waterside system 300 is shown as a central plant having subplants 302-312. Subplants 302-312 are shown to include a heater subplant 302, a heat recovery chiller subplant 304, a chiller subplant 306, a cooling tower subplant 308, a hot thermal energy storage (TES) subplant 310, and a cold thermal energy storage (TES) subplant 312. Subplants 302-312 consume resources (e.g., water, natural gas, electricity, etc.) from utilities to serve thermal energy loads (e.g., hot water, cold water, heating, cooling, etc.) of a building or campus. For example, heater subplant 302 can be configured to heat water in a hot water loop 314 that circulates the hot water between heater subplant 302 and building 10. Chiller subplant 306 can be configured to chill water in a cold water loop 316 that circulates the cold water between chiller subplant 306 and building 10. Heat recovery chiller subplant 304 can be configured to transfer heat from cold water loop 316 to hot water loop 314 to provide additional heating for the hot water and additional cooling for the cold water. Condenser water loop 318 may absorb heat from the cold water in chiller subplant 306 and reject the absorbed heat in cooling tower subplant 308 or transfer the absorbed heat to hot water loop 314. Hot TES subplant 310 and cold TES subplant 312 may store hot and cold thermal energy, respectively, for subsequent use.

Hot water loop 314 and cold water loop 316 may deliver the heated and/or chilled water to air handlers located on the rooftop of building 10 (e.g., AHU 206) or to individual floors or zones of building 10 (e.g., VAV units 216). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 302-312 to receive further heating or cooling.

Although subplants 302-312 are shown and described as heating and cooling water for circulation to a building, it is understood that any other type of working fluid (e.g., glycol, $CO_2$, etc.) can be used in place of or in addition to water to serve thermal energy loads. In other embodiments, subplants 302-312 may provide heating and/or cooling directly to the building or campus without requiring an intermediate heat transfer fluid. These and other variations to waterside system 300 are within the teachings of the present disclosure.

Each of subplants 302-312 can include a variety of equipment configured to facilitate the functions of the subplant. For example, heater subplant 302 is shown to include heating elements 320 (e.g., boilers, electric heaters, etc.) configured to add heat to the hot water in hot water loop 314. Heater subplant 302 is also shown to include several pumps 322 and 324 configured to circulate the hot water in hot water loop 314 and to control the flow rate of the hot water through individual heating elements 320. Chiller subplant 306 is shown to include chillers 332 configured to remove heat from the cold water in cold water loop 316. Chiller subplant 306 is also shown to include several pumps 334 and 336 configured to circulate the cold water in cold water loop 316 and to control the flow rate of the cold water through individual chillers 332.

Heat recovery chiller subplant 304 is shown to include heat recovery heat exchangers 326 (e.g., refrigeration circuits) configured to transfer heat from cold water loop 316 to hot water loop 314. Heat recovery chiller subplant 304 is also shown to include several pumps 328 and 330 configured to circulate the hot water and/or cold water through heat recovery heat exchangers 326 and to control the flow rate of the water through individual heat recovery heat exchangers 326. Cooling tower subplant 308 is shown to include cooling towers 338 configured to remove heat from the condenser water in condenser water loop 318. Cooling tower subplant 308 is also shown to include several pumps 340 configured to circulate the condenser water in condenser water loop 318 and to control the flow rate of the condenser water through individual cooling towers 338.

Hot TES subplant 310 is shown to include a hot TES tank 342 configured to store the hot water for later use. Hot TES subplant 310 may also include one or more pumps or valves configured to control the flow rate of the hot water into or out of hot TES tank 342. Cold TES subplant 312 is shown to include cold TES tanks 344 configured to store the cold water for later use. Cold TES subplant 312 may also include one or more pumps or valves configured to control the flow rate of the cold water into or out of cold TES tanks 344.

In some embodiments, one or more of the pumps in waterside system 300 (e.g., pumps 322, 324, 328, 330, 334, 336, and/or 340) or pipelines in waterside system 300 include an isolation valve associated therewith. Isolation valves can be integrated with the pumps or positioned upstream or downstream of the pumps to control the fluid flows in waterside system 300. In various embodiments, waterside system 300 can include more, fewer, or different types of devices and/or subplants based on the particular configuration of waterside system 300 and the types of loads served by waterside system 300.

Airside System

Referring now to FIG. 4, a block diagram of an airside system 400 is shown, according to some embodiments. In various embodiments, airside system 400 may supplement or replace airside system 230 in HVAC system 200 or can be implemented separate from HVAC system 200. When implemented in HVAC system 200, airside system 400 can include a subset of the HVAC devices in HVAC system 200 (e.g., AHU 206, VAV units 216, ducts 212-214, fans, dampers, etc.) and can be located in or around building 10. Airside system 400 may operate to heat or cool an airflow provided to building 10 using a heated or chilled fluid provided by waterside system 300.

In FIG. 4, airside system 400 is shown to include an economizer-type air handling unit (AHU) 402. Economizer-type AHUs vary the amount of outside air and return air used by the air handling unit for heating or cooling. For example, AHU 402 may receive return air 404 from building zone 406 via return air duct 408 and may deliver supply air 410 to building zone 406 via supply air duct 412. In some embodiments, AHU 402 is a rooftop unit located on the roof of building 10 (e.g., AHU 206 as shown in FIG. 2) or otherwise positioned to receive both return air 404 and outside air 414. AHU 402 can be configured to operate exhaust air damper 416, mixing damper 418, and outside air damper 420 to control an amount of outside air 414 and return air 404 that combine to form supply air 410. Any return air 404 that does not pass through mixing damper 418 can be exhausted from AHU 402 through exhaust damper 416 as exhaust air 422.

Each of dampers 416-420 can be operated by an actuator. For example, exhaust air damper 416 can be operated by actuator 424, mixing damper 418 can be operated by actuator 426, and outside air damper 420 can be operated by actuator 428. Actuators 424-428 may communicate with an AHU controller 430 via a communications link 432. Actuators 424-428 may receive control signals from AHU controller 430 and may provide feedback signals to AHU controller 430. Feedback signals can include, for example, an indication of a current actuator or damper position, an amount of torque or force exerted by the actuator, diagnostic information (e.g., results of diagnostic tests performed by actuators 424-428), status information, commissioning information, configuration settings, calibration data, and/or other types of information or data that can be collected, stored, or used by actuators 424-428. AHU controller 430 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 424-428.

Still referring to FIG. 4, AHU 304 is shown to include a cooling coil 434, a heating coil 436, and a fan 438 positioned within supply air duct 412. Fan 438 can be configured to force supply air 410 through cooling coil 434 and/or heating coil 436 and provide supply air 410 to building zone 406. AHU controller 430 may communicate with fan 438 via communications link 440 to control a flow rate of supply air 410. In some embodiments, AHU controller 430 controls an amount of heating or cooling applied to supply air 410 by modulating a speed of fan 438.

Cooling coil 434 may receive a chilled fluid from waterside system 300 (e.g., from cold water loop 316) via piping 442 and may return the chilled fluid to waterside system 300 via piping 444. Valve 446 can be positioned along piping 442 or piping 444 to control a flow rate of the chilled fluid through cooling coil 434. In some embodiments, cooling coil 434 includes multiple stages of cooling coils that can be independently activated and deactivated (e.g., by AHU controller 430, by BMS controller 466, etc.) to modulate an amount of cooling applied to supply air 410.

Heating coil 436 may receive a heated fluid from waterside system 300 (e.g., from hot water loop 314) via piping 448 and may return the heated fluid to waterside system 300 via piping 450. Valve 452 can be positioned along piping 448 or piping 450 to control a flow rate of the heated fluid through heating coil 436. In some embodiments, heating coil 436 includes multiple stages of heating coils that can be independently activated and deactivated (e.g., by AHU controller 430, by BMS controller 466, etc.) to modulate an amount of heating applied to supply air 410.

Each of valves 446 and 452 can be controlled by an actuator. For example, valve 446 can be controlled by actuator 454 and valve 452 can be controlled by actuator 456. Actuators 454-456 may communicate with AHU controller 430 via communications links 458-460. Actuators 454-456 may receive control signals from AHU controller 430 and may provide feedback signals to controller 430. In some embodiments, AHU controller 430 receives a measurement of the supply air temperature from a temperature sensor 462 positioned in supply air duct 412 (e.g., downstream of cooling coil 434 and/or heating coil 436). AHU controller 430 may also receive a measurement of the temperature of building zone 406 from a temperature sensor 464 located in building zone 406.

In some embodiments, AHU controller 430 operates valves 446 and 452 via actuators 454-456 to modulate an amount of heating or cooling provided to supply air 410 (e.g., to achieve a setpoint temperature for supply air 410 or to maintain the temperature of supply air 410 within a setpoint temperature range). The positions of valves 446 and 452 affect the amount of heating or cooling provided to supply air 410 by cooling coil 434 or heating coil 436 and may correlate with the amount of energy consumed to achieve a desired supply air temperature. AHU controller 430 may control the temperature of supply air 410 and/or building zone 406 by activating or deactivating coils 434-436, adjusting a speed of fan 438, or a combination of both.

Still referring to FIG. 4, airside system 400 is shown to include a building management system (BMS) controller 466 and a client device 468. BMS controller 466 can include one or more computer systems (e.g., servers, supervisory controllers, subsystem controllers, etc.) that serve as system level controllers, application or data servers, head nodes, or master controllers for airside system 400, waterside system 300, HVAC system 200, and/or other controllable systems that serve building 10. BMS controller 466 may communicate with multiple downstream building systems or subsystems (e.g., HVAC system 200, a security system, a lighting system, waterside system 300, etc.) via a communications link 470 according to like or disparate protocols (e.g., LON, BACnet, etc.). In various embodiments, AHU controller 430 and BMS controller 466 can be separate (as shown in FIG. 4) or integrated. In an integrated implementation, AHU controller 430 can be a software module configured for execution by a processor of BMS controller 466.

In some embodiments, AHU controller 430 receives information from BMS controller 466 (e.g., commands, setpoints, operating boundaries, etc.) and provides information to BMS controller 466 (e.g., temperature measurements, valve or actuator positions, operating statuses, diagnostics, etc.). For example, AHU controller 430 may provide BMS controller 466 with temperature measurements from temperature sensors 462-464, equipment on/off states, equipment operating capacities, and/or any other information that can be used by BMS controller 466 to monitor or control a variable state or condition within building zone 406.

Client device 468 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 200, its subsystems, and/or devices. Client device 468 can be a computer workstation, a client terminal, a remote or local interface, or any other type of user interface device. Client device 468 can be a stationary terminal or a mobile device. For example, client device 468 can be a desktop computer, a computer server with a user interface, a laptop computer, a tablet, a smartphone, a PDA, or any other type of mobile or non-mobile device. Client device 468 may communicate with BMS controller 466 and/or AHU controller 430 via communications link 472.

Building Management System

Referring now to FIG. 5, a block diagram of a building management system (BMS) 500 is shown, according to some embodiments. BMS 500 can be implemented in building 10 to automatically monitor and control various building functions. BMS 500 is shown to include BMS controller 466 and building subsystems 528. Building subsystems 528 are shown to include a building electrical subsystem 534, an information communication technology (ICT) subsystem 536, a security subsystem 538, a HVAC subsystem 540, a lighting subsystem 542, a lift/escalators subsystem 532, and a fire safety subsystem 530. In various embodiments, building subsystems 528 can include fewer, additional, or alternative subsystems. For example, building subsystems 528 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 528 include waterside system 300 and/or airside system 400, as described with reference to FIGS. 3-4.

Each of building subsystems 528 can include any number of devices (e.g., IoT devices), sensors, controllers, and connections for completing its individual functions and control activities. HVAC subsystem 540 can include many of the same components as HVAC system 200, as described with reference to FIGS. 2-4. For example, HVAC subsystem 540 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 542 can include any number of light fixtures, ballasts, lighting sensors, dimmers, or other devices configured to controllably adjust the amount of light provided to a building space. Security subsystem 538 can include occupancy sensors, video surveillance cameras, digital video recorders, video processing servers, intrusion detection devices, access control devices and servers, or other security-related devices.

Still referring to FIG. 5, BMS controller 466 is shown to include a communications interface 507 and a BMS interface 509. Interface 507 may facilitate communications between BMS controller 466 and external applications (e.g., monitoring and reporting applications 522, enterprise control applications 526, remote systems and applications 544, applications residing on client devices 548, 3$^{rd}$ party services 550, etc.) for allowing user control, monitoring, and adjustment to BMS controller 466 and/or subsystems 528. Interface 507 may also facilitate communications between BMS controller 466 and client devices 548. BMS interface 509 may facilitate communications between BMS controller 466 and building subsystems 528 (e.g., HVAC, lighting security, lifts, power distribution, business, etc.).

Interfaces 507, 509 can be or include wired or wireless communications interfaces (e.g., jacks, antennas, transmitters, receivers, transceivers, wire terminals, etc.) for conducting data communications with building subsystems 528 or other external systems or devices. In various embodiments, communications via interfaces 507, 509 can be direct (e.g., local wired or wireless communications) or via a communications network 546 (e.g., a WAN, the Internet, a cellular network, etc.). For example, interfaces 507, 509 can include an Ethernet card and port for sending and receiving data via an Ethernet-based communications link or network. In another example, interfaces 507, 509 can include a Wi-Fi transceiver for communicating via a wireless communications network. In another example, one or both of interfaces 507, 509 can include cellular or mobile phone communications transceivers. In one embodiment, communications interface 507 is a power line communications interface and BMS interface 509 is an Ethernet interface. In other embodiments, both communications interface 507 and BMS interface 509 are Ethernet interfaces or are the same Ethernet interface.

Still referring to FIG. 5, BMS controller 466 is shown to include a processing circuit 504 including a processor 506 and memory 508. Processing circuit 504 can be communicably connected to BMS interface 509 and/or communications interface 507 such that processing circuit 504 and the various components thereof can send and receive data via interfaces 507, 509. Processor 506 can be implemented as a general purpose processor, an application specific integrated circuit (ASIC), one or more field programmable gate arrays (FPGAs), a group of processing components, or other suitable electronic processing components.

Memory 508 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 508 can be or include volatile memory or non-volatile memory. Memory 508 can include database components, object code components, script components, or any other type of information structure for supporting the various activities and information structures described in the present application. According to some embodiments, memory 508 is communicably connected to processor 506 via processing circuit 504 and includes computer code for executing (e.g., by processing circuit 504 and/or processor 506) one or more processes described herein.

In some embodiments, BMS controller 466 is implemented within a single computer (e.g., one server, one housing, etc.). In various other embodiments BMS controller 466 can be distributed across multiple servers or computers (e.g., that can exist in distributed locations). Further, while FIG. 4 shows applications 522 and 526 as existing outside of BMS controller 466, in some embodiments, applications 522 and 526 can be hosted within BMS controller 466 (e.g., within memory 508).

Still referring to FIG. 5, memory 508 is shown to include an enterprise integration layer 510, an automated measurement and validation (AM&V) layer 512, a demand response (DR) layer 514, a fault detection and diagnostics (FDD) layer 516, an integrated control layer 518, and a building subsystem integration later 520. Layers 510-520 can be configured to receive inputs from building subsystems 528 and other data sources, determine improved and/or optimal control actions for building subsystems 528 based on the inputs, generate control signals based on the improved and/or optimal control actions, and provide the generated control signals to building subsystems 528. The following paragraphs describe some of the general functions performed by each of layers 510-520 in BMS 500.

Enterprise integration layer 510 can be configured to serve clients or local applications with information and services to support a variety of enterprise-level applications. For example, enterprise control applications 526 can be configured to provide subsystem-spanning control to a graphical user interface (GUI) or to any number of enterprise-level business applications (e.g., accounting systems, user identification systems, etc.). Enterprise control applications 526 may also or alternatively be configured to provide configuration GUIs for configuring BMS controller 466. In yet other embodiments, enterprise control applications 526 can work with layers 510-520 to improve and/or optimize building performance (e.g., efficiency, energy use, comfort, or safety) based on inputs received at interface 507 and/or BMS interface 509.

Building subsystem integration layer 520 can be configured to manage communications between BMS controller 466 and building subsystems 528. For example, building subsystem integration layer 520 may receive sensor data and input signals from building subsystems 528 and provide output data and control signals to building subsystems 528. Building subsystem integration layer 520 may also be configured to manage communications between building subsystems 528. Building subsystem integration layer 520 translates communications (e.g., sensor data, input signals, output signals, etc.) across multi-vendor/multi-protocol systems.

Demand response layer 514 can be configured to determine (e.g., optimize) resource usage (e.g., electricity use, natural gas use, water use, etc.) and/or the monetary cost of such resource usage to satisfy the demand of building 10. The resource usage determination can be based on time-of-use prices, curtailment signals, energy availability, or other data received from utility providers, distributed energy generation systems 524, energy storage 527 (e.g., hot TES 342, cold TES 344, etc.), or from other sources. Demand response layer 514 may receive inputs from other layers of BMS controller 466 (e.g., building subsystem integration layer 520, integrated control layer 518, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 514 includes control logic for responding to the data and signals it receives. These responses can include communicating with the control algorithms in integrated control layer 518, changing control strategies, changing setpoints, or activating/deactivating building equipment or subsystems in a controlled manner. Demand response layer 514 may also include control logic configured to determine when to utilize stored energy. For example, demand response layer 514 may determine to begin using energy from energy storage 527 just prior to the beginning of a peak use hour.

In some embodiments, demand response layer 514 includes a control module configured to actively initiate control actions (e.g., automatically changing setpoints) which reduce (e.g., minimize) energy costs based on one or more inputs representative of or based on demand (e.g., price, a curtailment signal, a demand level, etc.). In some embodiments, demand response layer 514 uses equipment models to determine a improved and/or optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 514 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 518 can be configured to use the data input or output of building subsystem integration layer 520 and/or demand response later 514 to make control decisions. Due to the subsystem integration provided by building subsystem integration layer 520, integrated control layer 518 can integrate control activities of the subsystems 528 such that the subsystems 528 behave as a single integrated super system. In some embodiments, integrated control layer 518 includes control logic that uses inputs and outputs from building subsystems to provide greater comfort and energy savings relative to the comfort and energy savings that separate subsystems could provide alone. For example, integrated control layer 518 can be configured to use an input from a first subsystem to make an energy-saving control decision for a second subsystem. Results of these decisions can be communicated back to building subsystem integration layer 520.

Integrated control layer 518 is shown to be logically below demand response layer 514. Integrated control layer 518 can be configured to enhance the effectiveness of demand response layer 514 by enabling building subsystems 528 and their respective control loops to be controlled in coordination with demand response layer 514. This configuration may advantageously reduce disruptive demand response behavior relative to conventional systems. For example, integrated control layer 518 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 518 can be configured to provide feedback to demand response layer 514 so that demand response layer 514 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 518 is also logically below fault detection and diagnostics layer 516 and automated measurement and validation layer 512. Integrated control layer 518 can be configured to provide calculated inputs (e.g., aggregations) to these higher levels based on outputs from more than one building subsystem.

Automated measurement and validation (AM&V) layer 512 can be configured to verify that control strategies commanded by integrated control layer 518 or demand response layer 514 are working properly (e.g., using data aggregated by AM&V layer 512, integrated control layer 518, building subsystem integration layer 520, FDD layer 516, or otherwise). The calculations made by AM&V layer 512 can be based on building system energy models and/or equipment models for individual BMS devices or subsystems. For example, AM&V layer 512 may compare a model-predicted output with an actual output from building subsystems 528 to determine an accuracy of the model.

Fault detection and diagnostics (FDD) layer 516 can be configured to provide on-going fault detection for building subsystems 528, building subsystem devices (i.e., building equipment), and control algorithms used by demand response layer 514 and integrated control layer 518. FDD layer 516 may receive data inputs from integrated control layer 518, directly from one or more building subsystems or devices, or from another data source. FDD layer 516 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 516 can be configured to output a specific identification of the faulty component or cause of the fault (e.g., loose damper linkage) using detailed subsystem inputs available at building subsystem integration layer 520. In other exemplary embodiments, FDD layer 516 is configured to provide "fault" events to integrated control layer 518 which executes control strategies and policies in response to the received fault events. According to some embodiments, FDD layer 516 (or a policy executed by an integrated control engine or business rules engine) may shut-down systems or direct control activities around faulty devices or systems to reduce energy waste, extend equipment life, or assure proper control response.

FDD layer 516 can be configured to store or access a variety of different system data stores (or data points for live data). FDD layer 516 may use some content of the data stores to identify faults at the equipment level (e.g., specific chiller, specific AHU, specific terminal unit, etc.) and other content to identify faults at component or subsystem levels. For example, building subsystems 528 may generate temporal (i.e., time-series) data indicating the performance of BMS 500 and the various components thereof. The data generated by building subsystems 528 can include measured or calculated values that exhibit statistical characteristics and provide information about how the corresponding system or process (e.g., a temperature control process, a flow control process, etc.) is performing in terms of error from its setpoint. These processes can be examined by FDD layer 516 to expose when the system begins to degrade in performance and alert a user to repair the fault before it becomes more severe.

Building Management System with Cloud Building Management Platform

Figure 6:
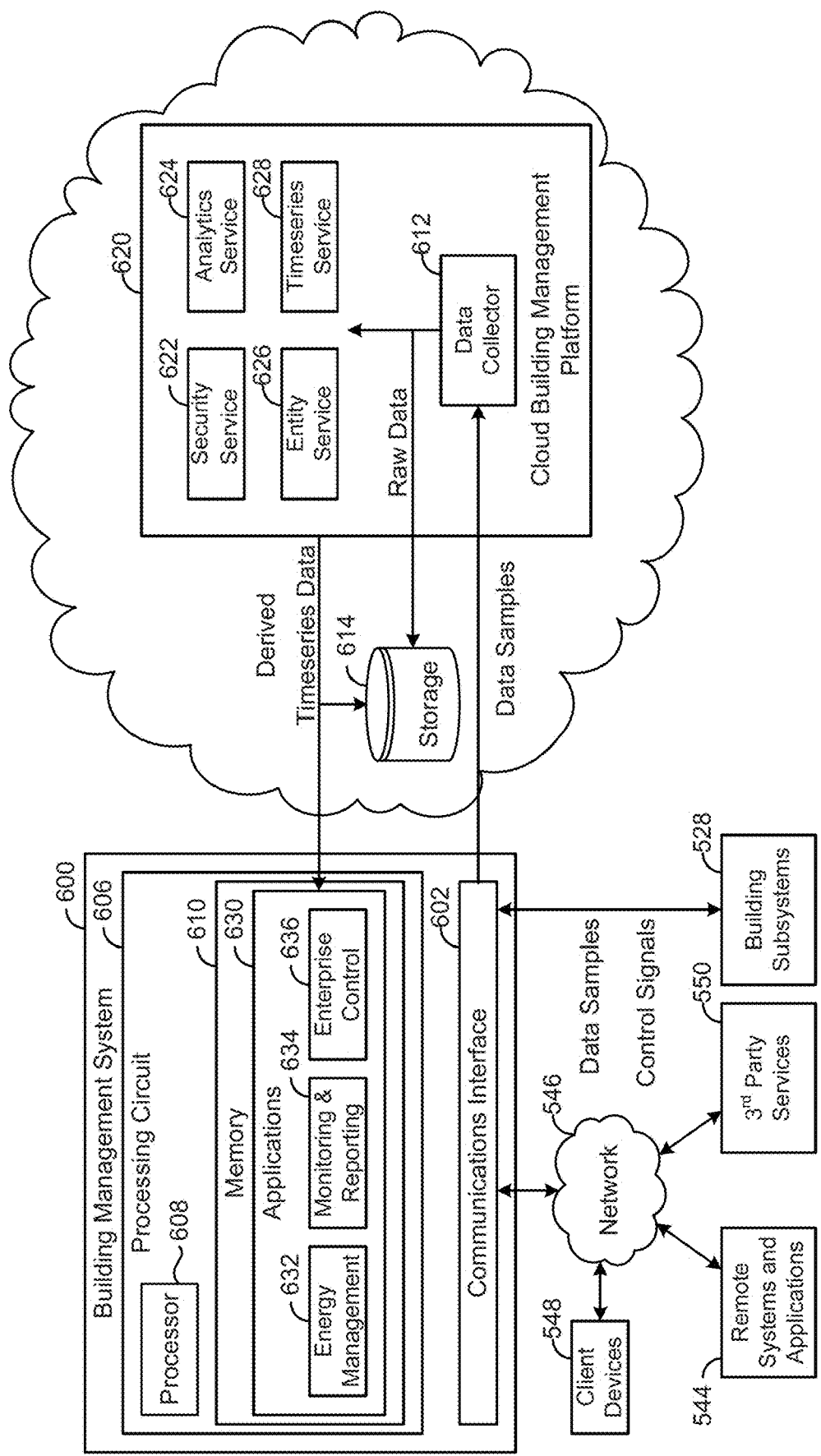
FIG. 6 is a block diagram of another building management system including a timeseries service and an entity service, according to an exemplary embodiment.

Referring now to FIG. 6, a block diagram of another building management system (BMS) 600 is shown, according to some embodiments. BMS 600 can be configured to collect data samples from client devices 548, remote systems and applications 544, $3^{rd}$ party services 550, and/or building subsystems 528, and provide the data samples to Cloud building management platform 620 to generate raw timeseries data, derived timeseries data, and/or entity data from the data samples. In some embodiments, Cloud building management platform 620 may supplement or replace building management platform 102 shown in FIG. 1 or can be implemented separate from building management platform 102. Cloud building management platform 620 can process and transform the data samples to generate derived timeseries data. Throughout this disclosure, the term "derived timeseries data" is used to describe the result or output of a transformation or other timeseries processing operation performed by various services of the building management platform 620 (e.g., data aggregation, data cleansing, virtual point calculation, etc.). The term "entity data" is used to describe the attributes of various smart entities (e.g., IoT systems, devices, components, sensors, and the like) and the relationships between the smart entities. The derived timeseries data can be provided to various applications 630 and/or stored in storage 614 (e.g., as materialized views of the raw timeseries data). In some embodiments, Cloud building management platform 620 separates data collection; data storage, retrieval, and analysis; and data visualization into three different layers. This allows Cloud building management platform 620 to support a variety of applications 630 that use the derived timeseries data and allows new applications 630 to reuse the existing infrastructure provided by Cloud building management platform 620.

It should be noted that the components of BMS 600 and/or Cloud building management platform 620 can be integrated within a single device (e.g., a supervisory controller, a BMS controller, etc.) or distributed across multiple separate systems or devices. In other embodiments, some or all of the components of BMS 600 and/or Cloud building management platform 620 can be implemented as part of a cloud-based computing system configured to receive and process data from one or more building management systems. In other embodiments, some or all of the components of BMS 600 and/or Cloud building management platform 620 can be components of a subsystem level controller (e.g., a HVAC controller), a subplant controller, a device controller (e.g., AHU controller 330, a chiller controller, etc.), a field controller, a computer workstation, a client device, or any other system or device that receives and processes data from building systems and equipment.

BMS 600 (or cloud building management platform 620) can include many of the same components as BMS 500 (e.g., processing circuit 504, processor 506, and/or memory 508), as described with reference to FIG. 5. For example, BMS 600 is shown to include a communications interface 602 (including the BMS interface 509 and the communications interface 507 from FIG. 5). Interface 602 can include wired or wireless communications interfaces (e.g., jacks, antennas, transmitters, receivers, transceivers, wire terminals, etc.) for conducting data communications with client devices 548, remote systems and applications 544, 3$^{rd}$ party services 550, building subsystems 528 or other external systems or devices. Communications conducted via interface 602 can be direct (e.g., local wired or wireless communications) or via a communications network 546 (e.g., a WAN, the Internet, a cellular network, etc.).

Communications interface 602 can facilitate communications between BMS 600, Cloud building management platform services 620, building subsystems 528, client devices 548 and external applications (e.g., remote systems and applications 544 and 3$^{rd}$ party services 550) for allowing user control, monitoring, and adjustment to BMS 600. BMS 600 can be configured to communicate with building subsystems 528 using any of a variety of building automation systems protocols (e.g., BACnet, Modbus, ADX, etc.). In some embodiments, BMS 600 receives data samples from building subsystems 528 and provides control signals to building subsystems 528 via interface 602. In some embodiments, BMS 600 receives data samples from the 3$^{rd}$ party services 550, such as, for example, weather data from a weather service, news data from a news service, documents and other document-related data from a document service, media (e.g., video, images, audio, social media, etc.) from a media service, and/or the like, via interface 602 (e.g., via APIs or any suitable interface).

Building subsystems 528 can include building electrical subsystem 534, information communication technology (ICT) subsystem 536, security subsystem 538, HVAC subsystem 540, lighting subsystem 542, lift/escalators subsystem 532, and/or fire safety subsystem 530, as described with reference to FIG. 5. In various embodiments, building subsystems 528 can include fewer, additional, or alternative subsystems. For example, building subsystems 528 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 528 include waterside system 300 and/or airside system 400, as described with reference to FIGS. 3-4. Each of building subsystems 528 can include any number of devices, controllers, and connections for completing its individual functions and control activities. Building subsystems 528 can include building equipment (e.g., sensors, air handling units, chillers, pumps, valves, etc.) configured to monitor and control a building condition such as temperature, humidity, airflow, etc.

Still referring to FIG. 6, BMS 600 is shown to include a processing circuit 606 including a processor 608 and memory 610. Cloud building management platform 620 may include one or more processing circuits including one or more processors and memory. Each of the processor can be a general purpose or specific purpose processor, an application specific integrated circuit (ASIC), one or more field programmable gate arrays (FPGAs), a group of processing components, or other suitable processing components. Each of the processors is configured to execute computer code or instructions stored in memory or received from other computer readable media (e.g., CDROM, network storage, a remote server, etc.).

Memory can include one or more devices (e.g., memory units, memory devices, storage devices, etc.) for storing data and/or computer code for completing and/or facilitating the various processes described in the present disclosure. Memory can include random access memory (RAM), read-only memory (ROM), hard drive storage, temporary storage, non-volatile memory, flash memory, optical memory, or any other suitable memory for storing software objects and/or computer instructions. Memory can include database components, object code components, script components, or any other type of information structure for supporting the various activities and information structures described in the present disclosure. Memory can be communicably connected to the processors via the processing circuits and can include computer code for executing (e.g., by processor 508) one or more processes described herein.

Still referring to FIG. 6, Cloud building management platform 620 is shown to include a data collector 612. Data collector 612 is shown receiving data samples from 3$^{rd}$ party services 550 and building subsystems 528 via interface 602. However, the present disclosure is not limited thereto, and the data collector 612 may receive the data samples directly from the 3$^{rd}$ party service 550 or the building subsystems 528 (e.g., via network 546 or via any suitable method). In some embodiments, the data samples include data values for various data points. The data values can be measured and/or calculated values, depending on the type of data point. For example, a data point received from a temperature sensor can include a measured data value indicating a temperature measured by the temperature sensor. A data point received from a chiller controller can include a calculated data value indicating a calculated efficiency of the chiller. A data sample received from a 3$^{rd}$ party weather service can include both a measured data value (e.g., current temperature) and a calculated data value (e.g., forecast temperature). Data collector 612 can receive data samples from multiple different devices (e.g., IoT devices, sensors, etc.) within building subsystems 528, and from multiple different 3$^{rd}$ party services (e.g., weather data from a weather service, news data from a news service, etc.) of the 3$^{rd}$ party services 550.

The data samples can include one or more attributes that describe or characterize the corresponding data points. For example, the data samples can include a name attribute defining a point name or ID (e.g., "B1F4R2.T-Z"), a device attribute indicating a type of device from which the data samples is received (e.g., temperature sensor, humidity sensor, chiller, etc.), a unit attribute defining a unit of measure associated with the data value (e.g., ° F., ° C., kPA, etc.), and/or any other attribute that describes the corresponding data point or provides contextual information regarding the data point. The types of attributes included in each data point can depend on the communications protocol used to send the data samples to BMS 600 and/or Cloud building management platform 620. For example, data samples received via the ADX protocol or BACnet protocol can include a variety of descriptive attributes along with the data value, whereas data samples received via the Modbus protocol may include a lesser number of attributes (e.g., only the data value without any corresponding attributes).

In some embodiments, each data sample is received with a timestamp indicating a time at which the corresponding data value was measured or calculated. In other embodiments, data collector 612 adds timestamps to the data samples based on the times at which the data samples are received. Data collector 612 can generate raw timeseries data for each of the data points for which data samples are received. Each timeseries can include a series of data values for the same data point and a timestamp for each of the data values. For example, a timeseries for a data point provided by a temperature sensor can include a series of temperature values measured by the temperature sensor and the corresponding times at which the temperature values were measured. An example of a timeseries which can be generated by data collector 612 is as follows:

[<key, timestamp$_1$, value$_1$>, <key, timestamp$_2$, value$_2$>, <key, timestamp$_3$, value$_3$>]

where key is an identifier of the source of the raw data samples (e.g., timeseries ID, sensor ID, device ID, etc.), timestamp identifies the time at which the ith sample was collected, and value r indicates the value of the ith sample.

Data collector 612 can add timestamps to the data samples or modify existing timestamps such that each data sample includes a local timestamp. Each local timestamp indicates the local time at which the corresponding data sample was measured or collected and can include an offset relative to universal time. The local timestamp indicates the local time at the location the data point was measured at the time of measurement. The offset indicates the difference between the local time and a universal time (e.g., the time at the international date line). For example, a data sample collected in a time zone that is six hours behind universal time can include a local timestamp (e.g., Timestamp=2016-03-18T14:10:02) and an offset indicating that the local timestamp is six hours behind universal time (e.g., Offset=−6:00). The offset can be adjusted (e.g., +1:00 or −1:00) depending on whether the time zone is in daylight savings time when the data sample is measured or collected.

The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs. For example, the offset can be subtracted from the local timestamp to generate a universal time value that corresponds to the local timestamp without referencing an external database and without requiring any other information.

In some embodiments, data collector 612 organizes the raw timeseries data. Data collector 612 can identify a system or device associated with each of the data points. For example, data collector 612 can associate a data point with a temperature sensor, an air handler, a chiller, or any other type of system or device. In some embodiments, a data entity may be created for the data point, in which case, the data collector 612 (e.g., via entity service) can associate the data point with the data entity. In various embodiments, data collector uses the name of the data point, a range of values of the data point, statistical characteristics of the data point, or other attributes of the data point to identify a particular system or device associated with the data point. Data collector 612 can then determine how that system or device relates to the other systems or devices in the building site from entity data. For example, data collector 612 can determine that the identified system or device is part of a larger system (e.g., a HVAC system) or serves a particular space (e.g., a particular building, a room or zone of the building, etc.) from the entity data. In some embodiments, data collector 612 uses or retrieves an entity graph (e.g., via entity service 626) when organizing the timeseries data.

Data collector 612 can provide the raw timeseries data to the services of Cloud building management platform 620 and/or store the raw timeseries data in storage 614. Storage 614 may be internal storage or external storage. For example, storage 614 can be internal storage with relation to Cloud building management platform 620 and/or BMS 600, and/or may include a remote database, cloud-based data hosting, or other remote data storage. Storage 614 can be configured to store the raw timeseries data obtained by data collector 612, the derived timeseries data generated by Cloud building management platform 620, and/or directed acyclic graphs (DAGs) used by Cloud building management platform 620 to process the timeseries data.

Still referring to FIG. 5, Cloud building management platform 620 can receive the raw timeseries data from data collector 612 and/or retrieve the raw timeseries data from storage 614. Cloud building management platform 620 can include a variety of services configured to analyze, process, and transform the raw timeseries data. For example, Cloud building management platform 620 is shown to include a security service 622, an analytics service 624, an entity service 626, and a timeseries service 628. Security service 622 can assign security attributes to the raw timeseries data to ensure that the timeseries data are only accessible to authorized individuals, systems, or applications. Security service 622 may include a messaging layer to exchange secure messages with the entity service 626. In some embodiment, security service 622 may provide permission data to entity service 626 so that entity service 626 can determine the types of entity data that can be accessed by a particular entity or device. Entity service 626 can assign entity information (or entity data) to the timeseries data to associate data points with a particular system, device, or space. Timeseries service 628 and analytics service 624 can apply various transformations, operations, or other functions to the raw timeseries data to generate derived timeseries data.

In some embodiments, timeseries service 628 aggregates predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by timeseries service 628 provide an efficient mechanism for applications 630 to query the timeseries data. For example, applications 630 can construct visualizations of the timeseries data (e.g., charts, graphs, etc.) using the pre-aggregated data rollups instead of the raw timeseries data. This allows applications 630 to simply retrieve and present the pre-aggregated data rollups without requiring applications 630 to perform an aggregation in response to the query. Since the data rollups are pre-aggregated, applications 630 can present the data rollups quickly and efficiently without requiring additional processing at query time to generate aggregated timeseries values.

In some embodiments, timeseries service 628 calculates virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, timeseries service 628 can calculate a virtual data point (pointID$_3$) by adding two or more actual data points (pointID$_1$ and pointID$_2$) (e.g., pointID$_3$=pointID$_1$+pointID$_2$). As another example, timeseries service 628 can calculate an enthalpy data point (pointID$_4$) based on a measured temperature data point (pointID$_5$) and a measured pressure data point (pointID$_6$) (e.g., pointID$_4$=enthalpy(pointID$_5$, pointID$_6$)). The virtual data points can be stored as derived timeseries data.

Applications 630 can access and use the virtual data points in the same manner as the actual data points. Applications 630 may not need to know whether a data point is an actual data point or a virtual data point since both types of data points can be stored as derived timeseries data and can be handled in the same manner by applications 630. In some embodiments, the derived timeseries are stored with attributes designating each data point as either a virtual data point or an actual data point. Such attributes allow applications 630 to identify whether a given timeseries represents a virtual data point or an actual data point, even though both types of data points can be handled in the same manner by applications 630. These and other features of timeseries service 628 are described in greater detail with reference to FIG. 9.

In some embodiments, analytics service 624 analyzes the raw timeseries data and/or the derived timeseries data to detect faults. Analytics service 624 can apply a set of fault detection rules to the timeseries data to determine whether a fault is detected at each interval of the timeseries. Fault detections can be stored as derived timeseries data. For example, analytics service 624 can generate a new fault detection timeseries with data values that indicate whether a fault was detected at each interval of the timeseries. The fault detection timeseries can be stored as derived timeseries data along with the raw timeseries data in storage 614.

In some embodiments, analytics service 624 analyzes the raw timeseries data and/or the derived timeseries data with the entity data to generate alerts or warnings, analyze risks, and determine threats. For example, analytics service 624 can apply probabilistic machine learning methods to model risks associated with an asset. An asset may be any resource or entity type, such as, for example, a person, building, space, system, equipment, device, sensor, and the like. Analytics service 624 can generate a risk score associated with an asset based on model parameters. The model parameters can be automatically updated based on feedback on the accuracy of the risk predictions. For example, the feedback may be explicit (e.g., based on questionnaires, disposition of alerts, and the like) or implicit (e.g., analyzing user actions on each threat or alert to estimate the importance of a particular event, and the like). The risk score may be stored as derived timeseries. For example, analytics service 624 (e.g., via timeseries service 628) can generate a risk score timeseries with data values indicating the risk score at each interval of the timeseries. The risk score timeseries can be stored as derived timeseries data along with the raw timeseries data in storage 614. The risk scores can then be retrieved, for example, by a Risk Dashboard from the timeseries service 628.

Still referring to FIG. 6, BMS 600 is shown to include several applications 630 including an energy management application 632, monitoring and reporting applications 634, and enterprise control applications 636. Although only a few applications 630 are shown, it is contemplated that applications 630 can include any of a variety of suitable applications configured to use the raw or derived timeseries generated by Cloud building management platform 620. In some embodiments, applications 630 exist as a separate layer of BMS 600 (e.g., a part of Cloud building management platform 620 and/or data collector 612). In other embodiments, applications 630 can exist as remote applications that run on remote systems or devices (e.g., remote systems and applications 544, client devices 548, and/or the like).

Applications 630 can use the derived timeseries data to perform a variety data visualization, monitoring, and/or control activities. For example, energy management application 632 and monitoring and reporting application 634 can use the derived timeseries data to generate user interfaces (e.g., charts, graphs, etc.) that present the derived timeseries data to a user. In some embodiments, the user interfaces present the raw timeseries data and the derived data rollups in a single chart or graph. For example, a dropdown selector can be provided to allow a user to select the raw timeseries data or any of the data rollups for a given data point.

Enterprise control application 636 can use the derived timeseries data to perform various control activities. For example, enterprise control application 636 can use the derived timeseries data as input to a control algorithm (e.g., a state-based algorithm, an extremum seeking control (ESC) algorithm, a proportional-integral (PI) control algorithm, a proportional-integral-derivative (PID) control algorithm, a model predictive control (MPC) algorithm, a feedback control algorithm, etc.) to generate control signals for building subsystems 528. In some embodiments, building subsystems 528 use the control signals to operate building equipment. Operating the building equipment can affect the measured or calculated values of the data samples provided to BMS 600 and/or Cloud building management platform 620. Accordingly, enterprise control application 636 can use the derived timeseries data as feedback to control the systems and devices of building subsystems 528.

Cloud Building Management Platform Entity Service

Figure 7:
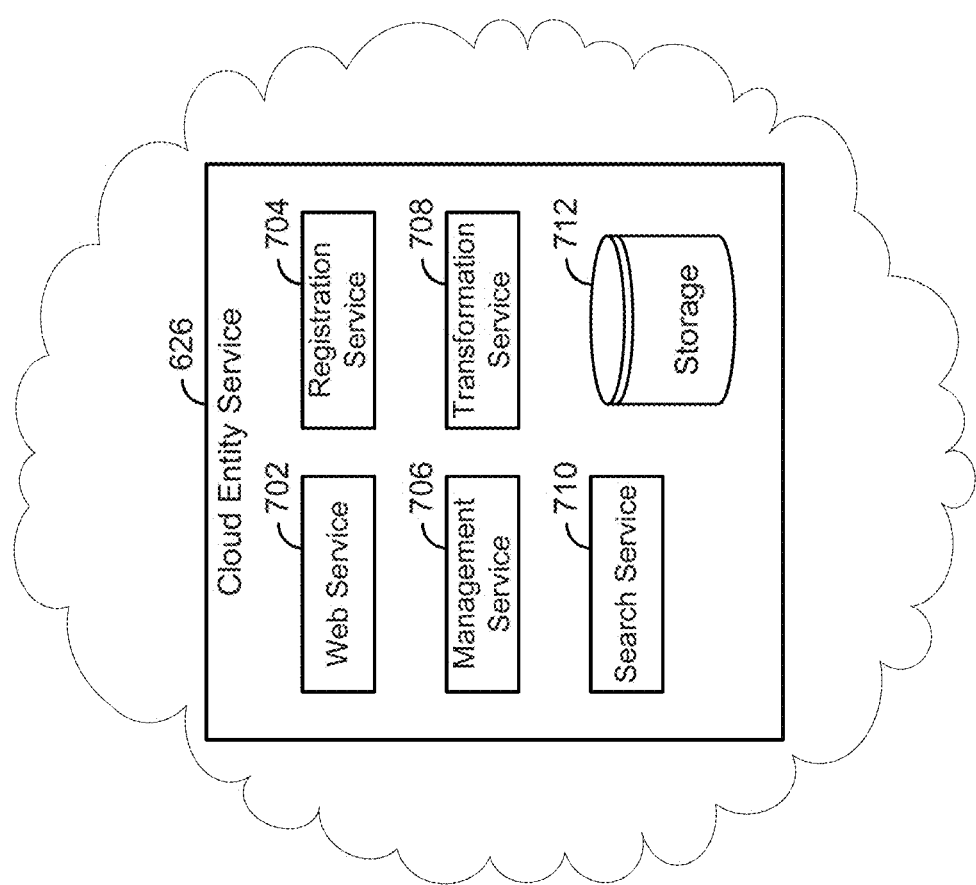
FIG. 7 is a block diagram illustrating the entity service of FIG. 6 in greater detail, according to an exemplary embodiment FIG. 8 in an example entity graph of entity data, according to an exemplary embodiment.

Referring now to FIG. 7, a block diagram illustrating entity service 626 in greater detail is shown, according to some embodiments. Entity service 626 registers and manages various buildings (e.g., 110-140), spaces, persons, subsystems (e.g., 428), devices (e.g., 112-146), and other entities in the Cloud building management platform 620. According to various embodiments, an entity may be any person, place, or physical object, hereafter referred to as an object entity. Further, an entity may be any event, data point, or record structure, hereinafter referred to as data entity. In addition, an entity may define a relationship between entities, hereinafter referred to as a relational entity.

In some embodiments, an object entity may be defined as having at least three types of attributes. For example, an object entity may have a static attribute, a dynamic attribute, and a behavioral attribute. The static attribute may include any unique identifier of the object entity or characteristic of the object entity that either does not change over time or changes infrequently (e.g., a device ID, a person's name or social security number, a place's address or room number, and the like). The dynamic attribute may include a property of the object entity that changes over time (e.g., location, age, measurement, data point, and the like). In some embodiments, the dynamic attribute of an object entity may be linked to a data entity. In this case, the dynamic attribute of the object entity may simply refer to a location (e.g., data/network address) or static attribute (e.g., identifier) of the linked data entity, which may store the data (e.g., the value or information) of the dynamic attribute. Accordingly, in some such embodiments, when a new data point (e.g., timeseries data) is received for the object entity, only the linked data entity may be updated, while the object entity remains unchanged. Therefore, resources that would have been expended to update the object entity may be reduced.

However, the present disclosure is not limited thereto. For example, in some embodiments, there may also be some data that is updated (e.g., during predetermined intervals) in the dynamic attribute of the object entity itself. For example, the linked data entity may be configured to be updated each time a new data point is received, whereas the corresponding dynamic attribute of the object entity may be configured to be updated less often (e.g., at predetermined intervals less than the intervals during which the new data points are received). In some implementations, the dynamic attribute of the object entity may include both a link to the data entity and either a portion of the data from the data entity or data derived from the data of the data entity. For example, in an embodiment in which periodic temperature readings are received from a thermostat, an object entity corresponding to the thermostat could include the last temperature reading and a link to a data entity that stores a series of the last ten temperature readings received from the thermostat.

The behavioral attribute may define a function of the object entity, for example, based on inputs, capabilities, and/or permissions. For example, behavioral attributes may define the types of inputs that the object entity is configured to accept, how the object entity is expected to respond under certain conditions, the types of functions that the object entity is capable of performing, and the like. As a non-limiting example, if the object entity represents a person, the behavioral attribute of the person may be his/her job title or job duties, user permissions to access certain systems or locations, expected location or behavior given a time of day, tendencies or preferences based on connected activity data received by entity service 626 (e.g., social media activity), and the like. As another non-limiting example, if the object entity represents a device, the behavioral attributes may include the types of inputs that the device can receive, the types of outputs that the device can generate, the types of controls that the device is capable of, the types of software or versions that the device currently has, known responses of the device to certain types of input (e.g., behavior of the device defined by its programming), and the like.

In some embodiments, the data entity may be defined as having at least a static attribute and a dynamic attribute. The static attribute of the data entity may include a unique identifier or description of the data entity. For example, if the data entity is linked to a dynamic attribute of an object entity, the static attribute of the data entity may include an identifier that is used to link to the dynamic attribute of the object entity. In some embodiments, the dynamic attribute of the data entity represents the data for the dynamic attribute of the linked object entity. In some embodiments, the dynamic attribute of the data entity may represent some other data that is derived, analyzed, inferred, calculated, or determined based on data from data sources.

In some embodiments, the relational entity may be defined as having at least a static attribute. The static attribute of the relational entity may semantically define the type of relationship between two or more entities. For example, in a non-limiting embodiment, a relational entity for a relationship that semantically defines that Entity A has a part of Entity B, or that Entity B is a part of Entity A may include:

hasPart{Entity A, Entity B} where the static attribute hasPart defines what the relationship is of the listed entities, and the order of the listed entities or data field of the relational entity specifies which entity is the part of the other (e.g., Entity A→hasPart→Entity B).

In various embodiments, the relational entity is an object-oriented construct with predefined fields that define the relationship between two or more entities, regardless of the type of entities. For example, Cloud building management platform 620 can provide a rich set of pre-built entity models with standardized relational entities that can be used to describe how any two or more entities are semantically related, as well as how data is exchanged and/or processed between the entities. Accordingly, a global change to a definition or relationship of a relational entity at the system level can be effected at the object level, without having to manually change the entity relationships for each object or entity individually. Further, in some embodiments, a global change at the system level can be propagated through to third-party applications integrated with Cloud building management platform 620 such that the global change can be implemented across all of the third-party applications without requiring manual implementation of the change in each disparate application.

Figure 8:
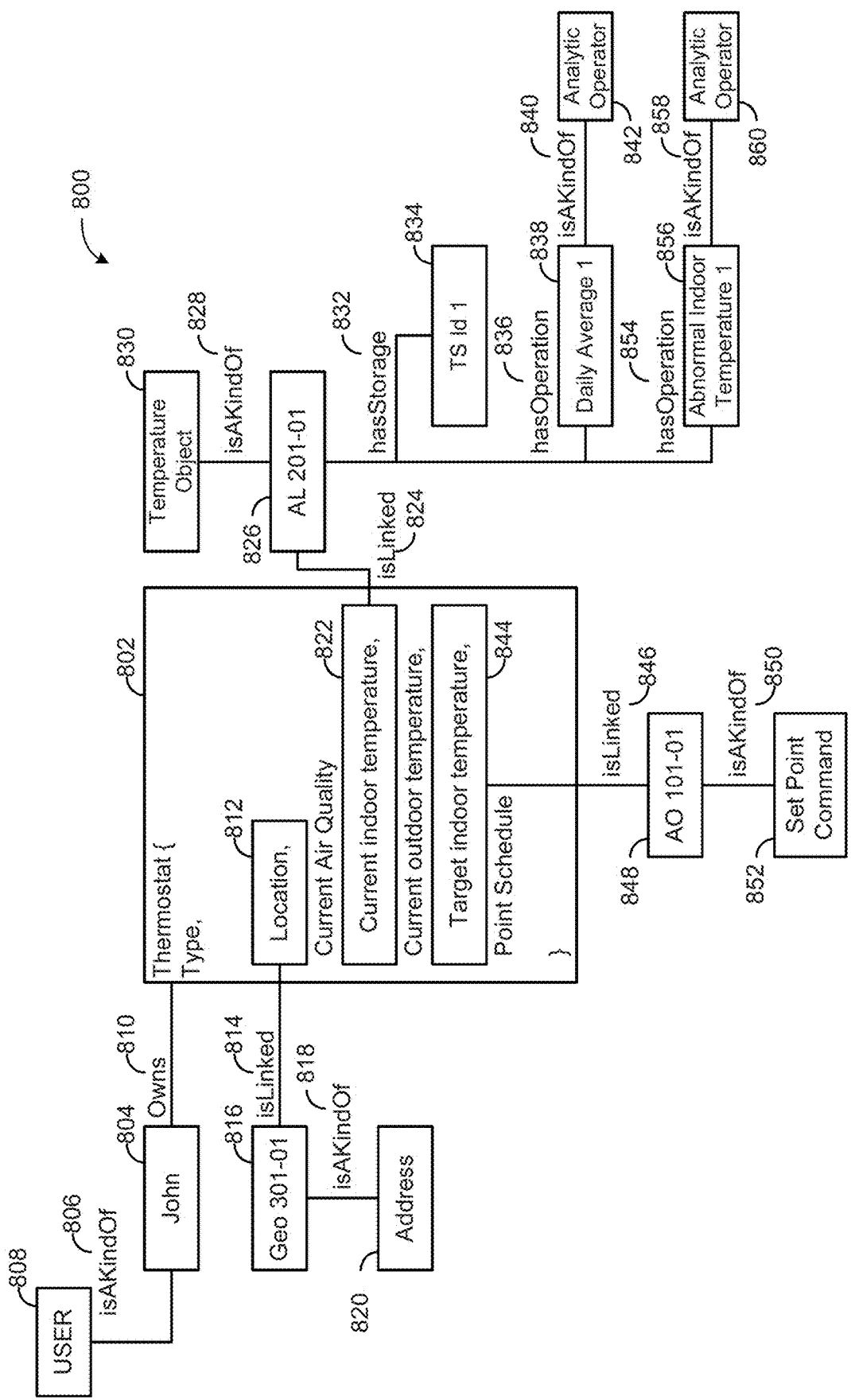

For example, referring to FIG. 8, an example entity graph of entity data is shown, according to some embodiments. The term "entity data" is used to describe the attributes of various entities and the relationships between the entities. For example, entity data may be represented in the form of an entity graph. In some embodiments, entity data includes any suitable predefined data models (e.g., as a table, JSON data, and/or the like), such as entity type or object, and further includes one or more relational entities that semantically define the relationships between the entities. The relational entities may help to semantically define, for example, hierarchical or directed relationships between the entities (e.g., entity X controls entity Y, entity A feeds entity B, entity 1 is located in entity 2, and the like). For example, an object entity (e.g., IoT device) may be represented by entity type or object, which generally describes how data corresponding to the entity will be structured and stored.

For example, an entity type (or object) "Thermostat" may be represented via the below schema:

```
Thermostat{
    Type,
    Model No,
    Device Name,
    Manufactured date,
    Serial number,
    MAC address,
    Location,
    Current air quality,
    Current indoor temperature,
    Current outdoor temperature,
    Target indoor temperature,
    Point schedule (e.g., BACnet schedule object)
}
``` where various attributes are static attributes (e.g., "Type," "Model Number," "Device Name," etc.), dynamic attributes (e.g., "Current air quality," "Current outdoor temperature," etc.), or behavioral attributes (e.g., "Target indoor temperature," etc.) for the object entity "thermostat." In a relational database, the object "Thermostat" is a table name, and the attributes represents column names.

An example of an object entity data model for a person named John Smith in a relational database may be represented by the below table:

| First Name | Last Name | Tel. No. | Age | Location | Job Title |
|---|---|---|---|---|---|
| John | Smith | (213)220-XXXX | 36 | Home | Engineer | where various attributes are static attributes (e.g., "First Name," "Last Name," etc.,), dynamic attributes (e.g., "Age," "Location," etc.), or behavioral attributes (e.g., "Engineer") for the object entity "John Smith."

An example data entity for the data point "Current indoor temperature" for the "Thermostat" owned by John Smith in a relational database may be represented by the below table:

| Present-Value | Description | Device_Type | Unit of measure |
|---|---|---|---|
| 68 | "Current indoor temperature of John's house" | Thermostat | Degrees-F. | where various attributes are static attributes (e.g., "Description" and "Device Type") and dynamic attributes (e.g., "Present-Value").

While structuring the entities via entity type or object may help to define the data representation of the entities, these data models do not provide information on how the entities relate to each other. For example, a BMS, building subsystem, or device may need data from a plurality of sources as well as information on how the sources relate to each other in order to provide a proper decision, action, or recommendation. Accordingly, in various embodiments, the entity data further includes the relational entities to semantically define the relationships between the entities, which may help to increase speeds in analyzing data, as well as provide ease of navigation and browsing.

For example, still referring to FIG. 8, an entity graph 800 for the Thermostat object entity 802 includes various class entities (e.g., User, Address, SetPoint Command, and Temperature Object), relational entities (e.g., isAKindOf, Owns, isLinked, hasStorage, and hasOperation), and data entities (AI 201-01, TS ID 1, Daily Average 1, Abnormal indoor temp 1, AO 101-1, and Geo 301-01). The relational entities describe the relationships between the various class, object, and data entities in a semantic and syntactic manner, so that an application or user viewing the entity graph 800 can quickly determine the relationships and data process flow of the Thermostat object entity 802, without having to resort to a data base analyst or engineer to create, index, and/or manage the entities (e.g., using SQL or NoSQL).

For example, the entity graph 800 shows that a person named John (object entity) 804 isAKindOf (relational entity) 806 User (class entity) 808. John 804 Owns (relational entity) 810 the Thermostat 802. The Thermostat 802 has a location attribute (dynamic attribute) 812 that isLinked (relational entity) 814 to Geo 301-01 (data entity) 816, which isAKindOf (relational entity) 818 an Address (class entity) 820. Accordingly, Geo 301-01 316 should have a data point corresponding to an address.

The Thermostat 802 further includes a "Current indoor temperature" attribute (dynamic attribute) 822 that isLinked (relational entity) 824 to AI 201-01 (data entity) 826. AI 201-01 826 isAKindOf (relational entity) 828 Temperature Object (class entity) 830. Thus, AI 201-01 826 should contain some sort of temperature related data. AI 201-01 826 hasStorage (relational entity) 832 at TS ID 1 (data entity) 834, which may be raw or derived timeseries data for the temperature readings. AI 201-01 826 hasOperation (relational entity) 836 of Daily Average 1 (data entity) 838, which isAKindOf (relational entity) 840 Analytic Operator (class entity) 842. Thus, Daily Average 1 results from an analytic operation that calculates the daily average of the indoor temperature. AI 201-01 826 further hasOperation (relational entity) 854 of Abnormal Indoor Temperature (data entity) 856, which isAKindOf (relational entity) 858 Analytic Operator (class entity) 860. Accordingly, Abnormal Indoor Temperature results from an analytic operation to determine an abnormal temperature (e.g., exceeds or falls below a threshold value).

In this example, the data entity AI 201-01 526 may be represented by the following data model:

```
point {
    name: "AI 201-01";
    type: "analog input";
    value: 72;
    unit: "Degree-F";
    source: "Temperature Sensor 1"
}
``` where "point" is an example of a data entity that may be created by Cloud building management platform 620 to hold the value for the linked "Current indoor temperature" 822 dynamic attribute of the Thermostat entity 802, and source is the sensor or device in the Thermostat device that provides the data to the linked "Current indoor temperature" 822 dynamic attribute.

The data entity TS Id 1 534 may be represented, for example, by the following data model:

```
timeseries {
    name: "TS Id 1";
    type: "Daily Average";
    values: "[68, 20666, 70, 69, 71];
    unit: "Degree-F";
    point: "AI 201-01";
    source: "Daily Average 1"
}
``` where the data entity Daily Average 1 838 represents a specific analytic operator used to create the data entity for the average daily timeseries TS Id 1 834 based on the values of the corresponding data entity for point AI 201-01 826. The relational entity hasOperation shows that the AI 201-01 data entity 826 is used as an input to the specific logic/math operation represented by Daily Average 1 838. TS Id 1 834 might also include an attribute that identifies the analytic operator Daily Average 1 838 as the source of the data samples in the timeseries.

Still referring to FIG. 8, the entity graph 800 for Thermostat 802 shows that the "Target indoor temperature" attribute (dynamic attribute) 844 isLinked (relational attribute) 846 to the data entity AO 101-01 (data entity) 848. AO 101-01 data entity 848 isAKindOf (relational attribute) 850 SetPoint Command (class entity) 852. Thus, the data in data entity AO 101-01 848 may be set via a command by the user or other entity, and may be used to control the Thermostat object entity 802. Accordingly, in various embodiments, entity graph 800 provides a user friendly view of the various relationships between the entities and data processing flow, which provides for ease of navigation, browsing, and analysis of data.

Referring again to FIG. 7, entity service 626 may transform raw data samples and/or raw timeseries data into data corresponding to entity data. For example, as discussed above with reference to FIG. 8, entity service 626 can create data entities that use and/or represent data points in the timeseries data. Entity service 626 includes a web service 702, a registration service 704, a management service 706, a transformation service 708, a search service 710, and storage 712. In some embodiments, storage 712 may be internal storage or external storage. For example, storage 712 may be storage 614 (see FIG. 6), internal storage with relation to entity service 626, and/or may include a remote database, cloud-based data hosting, or other remote data storage.

Web service 702 can be configured to interact with web-based applications to send entity data and/or receive raw data (e.g., data samples, timeseries data, and the like). For example, web service 702 can provide an interface (e.g., API, UI/UX, and the like) to manage (e.g., register, create, edit, delete, and/or update) an entity (e.g., class entity, object entity, data entity, relational entity, and/or the like). In some embodiments, web service 702 provides entity data to web-based applications. For example, if one or more of applications 630 are web-based applications, web service 702 can provide entity data to the web-based applications. In some embodiments, web service 702 receives raw data samples and/or raw timeseries data including device information from a web-based data collector, or a web-based security service to identify authorized entities and to exchange secured messages. For example, if data collector 612 is a web-based application, web service 702 can receive the raw data samples and/or timeseries data including a device attribute indicating a type of device (e.g., IoT device) from which the data samples and/or timeseries data are received from data collector 612. In some embodiments, web service 702 may message security service 622 to request authorization information and/or permission information of a particular user, building, BMS, building subsystem, device, application, or other entity. In some embodiments, web service 702 receives derived timeseries data from timeseries service 628, and/or may provide entity data to timeseries service 628. In some embodiments, the entity service 626 processes and transforms the collected data to generate the entity data.

The registration service 704 can perform registration of devices and entities. For example, registration service 704 can communicate with building subsystems 528 and client devices 548 (e.g., via web service 702) to register each entity (e.g., building, BMS, building subsystems, devices, and the like) with Cloud building management platform 620. In some embodiments, registration service 704 registers a particular building subsystem 528 (or the devices therein) with a specific user and/or a specific set of permissions and/or entitlements. For example, a user may register a device key and/or a device ID associated with the device via a web portal (e.g., web service 702). In some embodiments, the device ID and the device key may be unique to the device. The device ID may be a unique number associated with the device such as a unique alphanumeric string, a serial number of the device, and/or any other static identifier. In various embodiments, the device is provisioned by a manufacturer and/or any other entity. In various embodiments, the device key and/or device ID are saved to the device or building subsystem 528 based on whether the device includes a trusted platform module (TPM). If the device includes a TPM, the device or building subsystem 528 may store the device key and/or device ID according to the protocols of the TPM. If the device does not include a TPM, the device or building subsystem 528 may store the device key and/or device ID in a file and/or file field which may be stored in a secure storage location. Further, in some embodiments, the device ID may be stored with BIOS software of the device. For example, a serial number of BIOS software may become and/or may be updated with the device ID.

In various embodiments, the device key and/or the device ID are uploaded to registration service 704 (e.g., an IoT hub such as AZURE® IoT Hub). In some embodiments, registration service 704 is configured to store the device key and the device ID in secure permanent storage and/or may be stored by security service 622 (e.g., by a security API). In some embodiments, a manufacturer and/or any other individual may register the device key and the device ID with registration service 704 (e.g., via web service 702). In various embodiments, the device key and the device ID are linked to a particular profile associated with the building subsystem 528 or device and/or a particular user profile (e.g., a particular user). In this regard, a device (or building subsystem 528) can be associated with a particular user. In various embodiments, the device key and the device ID make up the profile for device. The profile may be registered as a device that has been manufactured and/or provisioned but has not yet been purchased by an end user.

In various embodiments, registration service 704 adds and/or updates a device in an building hub device registry. In various embodiments, registration service 704 may determine if the device is already registered, can set various authentication values (e.g., device ID, device key), and can update the building hub device registry. In a similar manner, registration service 704 can update a document database with the various device registration information.

In some embodiments, registration service 704 can be configured to create a virtual representation (e.g., "digital twins" or "shadow records") of each object entity (e.g., person, room, building subsystem, device, and the like) in the building within Cloud building management platform 620. In some embodiments, the virtual representations are smart entities that include attributes defining or characterizing the corresponding object and are associated to the corresponding object entity via relational entities defining the relationship of the object and the smart entity representation thereof. In some embodiments, the virtual representations maintain shadow copies of the object entities with versioning information so that entity service 626 can store not only the most recent update of an attribute (e.g., a dynamic attribute) associated with the object, but records of previous states of the attributes (e.g., dynamic attributes) and/or entities. For example, the shadow record may be created as a type of data entity that is related to a linked data entity corresponding to the dynamic attribute of the object entity (e.g., the person, room, building subsystem, device, and the like). For example, the shadow entity may be associated with the linked data entity via a relational entity (e.g., isLinked, hasStorage, hasOperation, and the like). In this case, the shadow entity may be used to determine additional analytics for the data point of the dynamic attribute. For example, the shadow entity may be used to determine an average value, an expected value, or an abnormal value of the data point from the dynamic attribute.

Management service 706 may create, modify, or update various attributes, data entities, and/or relational entities of the objects managed by entity service 626 for each entity rather than per class or type of entity. This allows for separate processing/analytics for each individual entity rather than only to a class or type of entity. Some attributes (or data entities) may correspond to, for example, the most recent value of a data point provided to BMS 600 or Cloud building management platform 620 via the raw data samples and/or timeseries data. For example, the "Current indoor temperature" dynamic attribute of the "Thermostat" object entity 802 in the example discussed above may be the most recent value of indoor temperature provided by the Thermostat device. Management service 706 can use the relational entities of the entity data for Thermostat to determine where to update the data of the attribute.

For example, Management service 706 may determine that a data entity (e.g., AI 201-01) is linked to the "Current indoor temperature" dynamic attribute of Thermostat via an isLinked relational entity. In this case, Management service 706 may automatically update the attribute data in the linked data entity. Further, if a linked data entity does not exist, Management service 706 can create a data entity (e.g., AI 201-01) and an instance of the isLinked relational entity 824 to store and link the "Current indoor temperature" dynamic attribute of Thermostat therein. Accordingly, processing/analytics for Thermostat 802 may be automated. As another example, a "most recent view" attribute (or linked data entity) of a webpage object entity may indicate the most recent time at which the webpage was viewed. Management service 706 can use the entity data from a related click tracking system object entity or web server object entity to determine when the most recent view occurred and can automatically update the "most recent view" attribute (or linked data entity) of the webpage entity accordingly.

Other data entities and/or attributes may be created and/or updated as a result of an analytic, transformation, calculation, or other processing operation based on the raw data and/or entity data. For example, Management service 706 can use the relational entities in entity data to identify a related access control device (e.g., a card reader, a keypad, etc.) at the entrance/exit of a building object entity. Management service 706 can use raw data received from the identified access control device to track the number of occupants entering and exiting the building object entity (e.g., via related card entities used by the occupants to enter and exit the building). Management service 706 can update a "number of occupants" attribute (or corresponding data entity) of the building object each time a person enters or exits the building using a related card entity, such that the "number of occupants" attribute (or data entity) reflects the current number of occupants within the building object. As another example, a "total revenue" attribute associated with a product line object may be the summation of all the revenue generated from related point of sales entities. Management service 706 can use the raw data received from the related point of sales entities to determine when a sale of the product occurs, and can identify the amount of revenue generated by the sales. Management service 706 can then update the "total revenue" attribute (or related data entity) of the product line object by adding the most recent sales revenue from each of the related point of sales entities to the previous value of the attribute.

In some embodiments, management service 706 may use derived timeseries data generated from timeseries service 628 to update or create a data entity (e.g., Daily Average 1) that uses or stores the data points in the derived timeseries data. For example, the derived timeseries data may include a virtual data point corresponding to the daily average steps calculated by timeseries service 628, and management service 706 may update the data entity or entities that store or use the data corresponding to the virtual data point as determined via the relational entities. In some embodiments, if a data entity corresponding to the virtual data point does not exist, management service 706 may automatically create a corresponding data entity and one or more relational entities that describe the relationship between the corresponding data entity and other entities.

In some embodiments, management service 706 uses entity data and/or raw data from multiple different data sources to update the attributes (or corresponding data entities) of various object entities. For example, an object entity representing a person (e.g., a person's cellular device or other related object entity) may include a "risk" attribute that quantifies the person's level of risk attributable to various physical, environmental, or other conditions. Management service 706 can use relational entities of the person object entity to identify a related card device and/or a related card reader from a related building object entity (e.g., the building in which the person works) to determine the physical location of the person at any given time. Management service 706 can determine from raw data (e.g., time that the card device was scanned by the card reader) or derived timeseries data (e.g., average time of arrival) whether the person object is located in the building or may be in transit to the building. Management service 706 can associate weather data from a weather service in the region in which the building object entity is located with the building object entity, and analytics service 624 can generate a risk score for the possibility that any severe weather is approaching the person's location based on the associated weather data, building entity, and person entity. Similarly, management service 706 can associate building data from related building entities with the building object entity, and analytics service 624 can determine whether the building in which the person is located is experiencing any emergency conditions (e.g., fire, building lockdown, etc.) or environmental hazards (e.g., detected air contaminants, pollutants, extreme temperatures, etc.) that could increase the person's level of risk. Management service 706 can provide these and other types of data to analytics service 624 as inputs to a risk function that calculates the value of the person object's "risk" attribute and can update the person object (or related device entity of the person object) accordingly.

In some embodiments, management service 706 can be configured to synchronize configuration settings, parameters, and other device-specific or object-specific information between the entities and Cloud building management platform 620. In some embodiments, the synchronization occurs asynchronously. Management service 706 can be configured to manage device properties dynamically. The device properties, configuration settings, parameters, and other device-specific information can be synchronized between the smart entities created by and stored within Cloud building management platform 620.

In some embodiments, management service 706 is configured to manage a manifest for each of the building subsystems 528 (or devices therein). The manifest may include a set of relationships between the building subsystems 528 and various entities. Further, the manifest may indicate a set of entitlements for the building subsystems 528 and/or entitlements of the various entities and/or other entities. The set of entitlements may allow a BMS 600, building subsystem 528 and/or a user to perform certain actions within the building or (e.g., control, configure, monitor, and/or the like).

Still referring to FIG. 7, transformation service 708 can provide data virtualization, and can transform various predefined standard data models for entities in a same class or type to have the same entity data structure, regardless of the object, device, or Thing that the entity represents. For example, each object entity under an object class may include a location attribute, regardless of whether or not the location attribute is used or even generated. Thus, if an application is later developed requiring that each object entity includes a location attribute, manual mapping of heterogeneous data of different entities in the same class may be avoided. Accordingly, interoperability and scalability of applications may be improved.

In some embodiments, transformation service 708 can provide entity matching, cleansing, and correlation so that a unified view of the entity data including the entity related information (e.g., relational entities) can be provided. Transformation service 708 can support semantic and syntactic relationship description in the form of standardized relational entities between the various entities. This may simplify machine learning because the relational entities themselves provide all the relationship description between the other entities. Accordingly, the rich set of pre-built entity models and standardized relational entities may provide for rapid application development and data analytics.

Still referring to FIG. 7, the search service 710 provides a unified view of product related information in the form of the entity graph, which correlates entity relationships (via relational entities) among multiple data sources (e.g., CRM, ERP, MRP and the like). In some embodiments, the search service 710 is based on a schema-less and graph based indexing architecture. The search service 710 facilitates simple queries without having to search multiple levels of the hierarchical tree of the entity graph. For example, search service 710 can return results based on searching of entity type, individual entities, attributes, or even relational entities without requiring other levels or entities of the hierarchy to be searched.

Timeseries Data Platform Service

Figure 9:
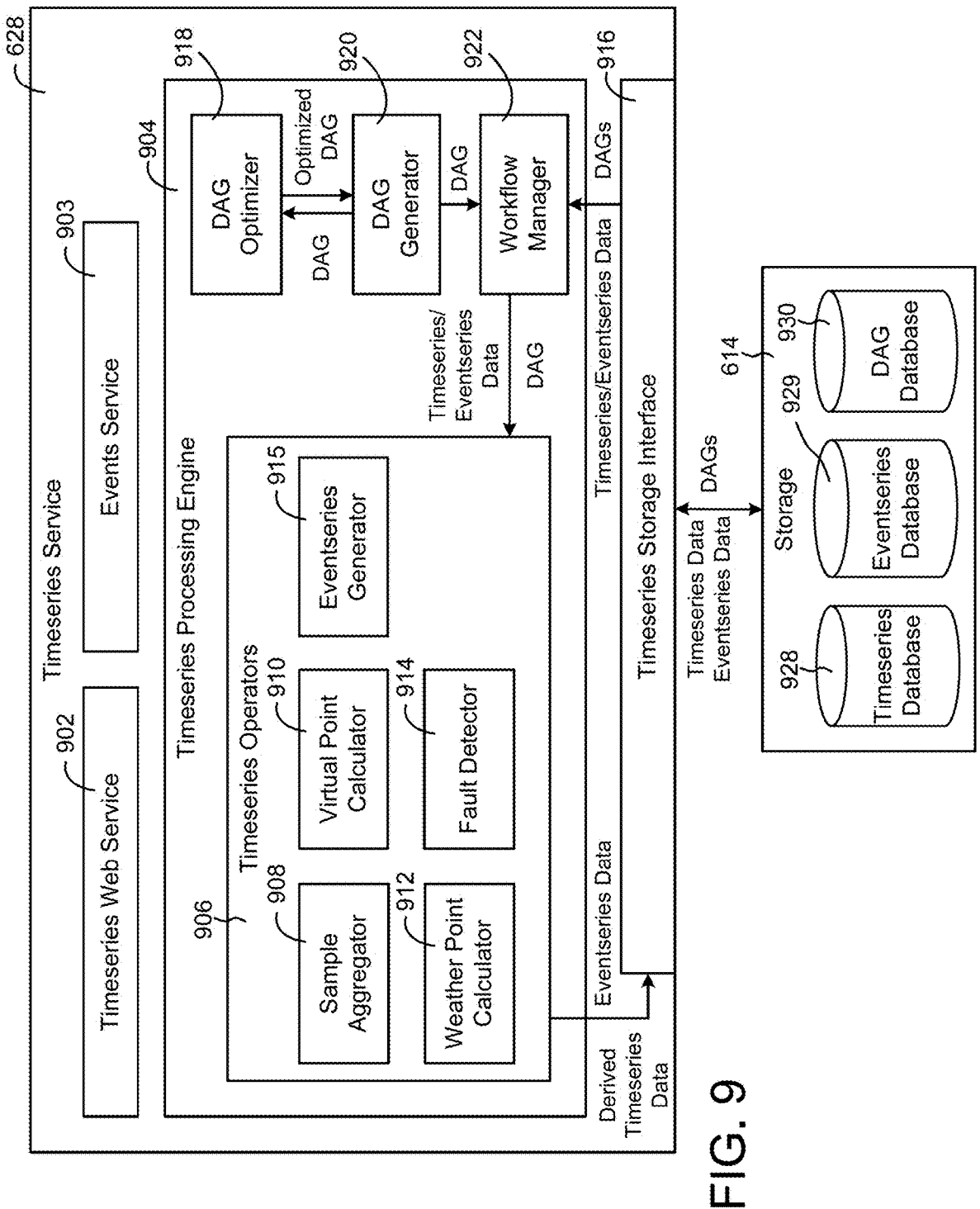
FIG. 9 is a block diagram illustrating the timeseries service of FIG. 6 in greater detail, according to an exemplary embodiment.

Referring now to FIG. 9, a block diagram illustrating timeseries service 628 in greater detail is shown, according to some embodiments. Timeseries service 628 is shown to include a timeseries web service 902, an events service 903, a timeseries processing engine 904, and a timeseries storage interface 916. Timeseries web service 902 can be configured to interact with web-based applications to send and/or receive timeseries data. In some embodiments, timeseries web service 902 provides timeseries data to web-based applications. For example, if one or more of applications 630 are web-based applications, timeseries web service 902 can provide derived timeseries data and/or raw timeseries data to the web-based applications. In some embodiments, timeseries web service 902 receives raw timeseries data from a web-based data collector. For example, if data collector 612 is a web-based application, timeseries web service 902 can receive raw data samples or raw timeseries data from data collector 612. In some embodiments, timeseries web service 902 and entity service web service 702 may be integrated as parts of the same web service.

Timeseries storage interface 916 can be configured to store and read samples of various timeseries (e.g., raw timeseries data and derived timeseries data) and eventseries (described in greater detail below). Timeseries storage interface 916 can interact with storage 614. For example, timeseries storage interface 916 can retrieve timeseries data from a timeseries database 928 within storage 614. In some embodiments, timeseries storage interface 916 reads samples from a specified start time or start position in the timeseries to a specified stop time or a stop position in the timeseries. Similarly, timeseries storage interface 916 can retrieve eventseries data from an eventseries database 929 within storage 614. Timeseries storage interface 916 can also store timeseries data in timeseries database 928 and can store eventseries data in eventseries database 929. Advantageously, timeseries storage interface 916 provides a consistent interface which enables logical data independence.

In some embodiments, timeseries storage interface 916 stores timeseries as lists of data samples, organized by time. For example, timeseries storage interface 916 can store timeseries in the following format:

[<key, timestamp$_1$, value$_1$>, <key, timestamp$_2$, value$_2$>, <key, timestamp$_3$, value$_3$>]

where key is an identifier of the source of the data samples (e.g., timeseries ID, sensor ID, device ID, etc.), timestamp$_i$ identifies a time associated with the ith sample, and value$_i$ indicates the value of the ith sample.

In some embodiments, timeseries storage interface 916 stores eventseries as lists of events having a start time, an end time, and a state. For example, timeseries storage interface 916 can store eventseries in the following format:

[<eventID$_1$, start_timestamp$_1$, end_timestamp$_1$, state$_1$>, . . . , <eventID$_N$, start_timestamp$_N$, end_timestamp$_N$, state$_N$>]

where eventID$_i$ is an identifier of the ith event, start_timestamp$_i$ is the time at which the ith event started, end_timestamp$_i$ is the time at which the ith event ended, state describes a state or condition associated with the ith event (e.g., cold, hot, warm, etc.), and N is the total number of events in the eventseries.

In some embodiments, timeseries storage interface 916 stores timeseries and eventseries in a tabular format. Timeseries storage interface 916 can store timeseries and eventseries in various tables having a column for each attribute of the timeseries/eventseries samples (e.g., key, timestamp, value). The timeseries tables can be stored in timeseries database 928, whereas the eventseries tables can be stored in eventseries database 929. In some embodiments, timeseries storage interface 916 caches older data to storage 614 but stores newer data in RAM. This may improve read performance when the newer data are requested for processing.

In some embodiments, timeseries storage interface 916 omits one or more of the attributes when storing the timeseries samples. For example, timeseries storage interface 916 may not need to repeatedly store the key or timeseries ID for each sample in the timeseries. In some embodiments, timeseries storage interface 916 omits timestamps from one or more of the samples. If samples of a particular timeseries have timestamps at regular intervals (e.g., one sample each minute), timeseries storage interface 916 can organize the samples by timestamps and store the values of the samples in a row. The timestamp of the first sample can be stored along with the interval between the timestamps. Timeseries storage interface 916 can determine the timestamp of any sample in the row based on the timestamp of the first sample and the position of the sample in the row.

In some embodiments, timeseries storage interface 916 stores one or more samples with an attribute indicating a change in value relative to the previous sample value. The change in value can replace the actual value of the sample when the sample is stored in timeseries database 928. This allows timeseries storage interface 916 to use fewer bits when storing samples and their corresponding values. Timeseries storage interface 916 can determine the value of any sample based on the value of the first sample and the change in value of each successive sample.

In some embodiments, timeseries storage interface 916 invokes entity service 626 to create data entities in which samples of timeseries data and/or eventseries data can be stored. The data entities can include JSON objects or other types of data objects to store one or more timeseries samples and/or eventseries samples. Timeseries storage interface 916 can be configured to add samples to the data entities and read samples from the data entities. For example, timeseries storage interface 916 can receive a set of samples from data collector 612, entity service 626, timeseries web service 902, events service 903, and/or timeseries processing engine 904. Timeseries storage interface 916 can add the set of samples to a data entity by sending the samples to entity service 626 to be stored in the data entity, for example, or may directly interface with the data entity to add/modify the sample to the data entity.

Timeseries storage interface 916 can use data entities when reading samples from storage 614. For example, timeseries storage interface 916 can retrieve a set of samples from storage 614 or from entity service 626, and add the samples to a data entity (e.g., directly or via entity service 626). In some embodiments, the set of samples include all samples within a specified time period (e.g., samples with timestamps in the specified time period) or eventseries samples having a specified state. Timeseries storage interface 916 can provide the samples in the data entity to timeseries web service 902, events service 903, timeseries processing engine 904, applications 630, and/or other components configured to use the timeseries/eventseries samples.

Still referring to FIG. 9, timeseries processing engine 904 is shown to include several timeseries operators 906. Timeseries operators 906 can be configured to apply various operations, transformations, or functions to one or more input timeseries to generate output timeseries and/or eventseries. The input timeseries can include raw timeseries data and/or derived timeseries data. Timeseries operators 906 can be configured to calculate aggregate values, averages, or apply other mathematical operations to the input timeseries. In some embodiments, timeseries operators 906 generate virtual point timeseries by combining two or more input timeseries (e.g., adding the timeseries together), creating multiple output timeseries from a single input timeseries, or applying mathematical operations to the input timeseries. In some embodiments, timeseries operators 906 perform data cleansing operations or deduplication operations on an input timeseries. In some embodiments, timeseries operators 906 use the input timeseries to generate eventseries based on the values of the timeseries samples. The output timeseries can be stored as derived timeseries data in storage 614 as one or more timeseries data entities. Similarly, the eventseries can be stored as eventseries data entities in storage 614.

In some embodiments, timeseries operators 906 do not change or replace the raw timeseries data, but rather generate various "views" of the raw timeseries data (e.g., as separate data entities) with corresponding relational entities defining the relationships between the raw timeseries data entity and the various views data entities. The views can be queried in the same manner as the raw timeseries data. For example, samples can be read from the raw timeseries data entity, transformed to create the view entity, and then provided as an output. Because the transformations used to create the views can be computationally expensive, the views can be stored as "materialized view" data entities in timeseries database 928. Instances of relational entities can be created to define the relationship between the raw timeseries data entity and the materialize view data entities. These materialized views are referred to as derived data timeseries throughout the present disclosure.

Timeseries operators 906 can be configured to run at query time (e.g., when a request for derived data timeseries is received) or prior to query time (e.g., when new raw data samples are received, in response to a defined event or trigger, etc.). This flexibility allows timeseries operators 906 to perform some or all of their operations ahead of time and/or in response to a request for specific derived data timeseries. For example, timeseries operators 906 can be configured to pre-process one or more timeseries that are read frequently to ensure that the timeseries are updated whenever new data samples are received, and the preprocessed timeseries may be stored in a corresponding data entity for retrieval. However, timeseries operators 906 can be configured to wait until query time to process one or more timeseries that are read infrequently to avoid performing unnecessary processing operations.

In some embodiments, timeseries operators 906 are triggered in a particular sequence defined by a directed acyclic graph (DAG). The DAG may define a workflow or sequence of operations or transformations to apply to one or more input timeseries. For example, the DAG for a raw data timeseries may include a data cleansing operation, an aggregation operation, and a summation operation (e.g., adding two raw data timeseries to create a virtual point timeseries). The DAGs can be stored in a DAG database 930 within storage 614, or internally within timeseries processing engine 904. DAGs can be retrieved by workflow manager 922 and used to determine how and when to process incoming data samples. Exemplary systems and methods for creating and using DAGs are described in greater detail below.

Timeseries operators 906 can perform aggregations for dashboards, cleansing operations, logical operations for rules and fault detection, machine learning predictions or classifications, call out to external services, or any of a variety of other operations which can be applied to timeseries data. The operations performed by timeseries operators 906 are not limited to timeseries data. Timeseries operators 906 can also operate on event data or function as a billing engine for a consumption or tariff-based billing system. Timeseries operators 906 are shown to include a sample aggregator 908, a virtual point calculator 910, a weather point calculator 912, a fault detector 914, and an eventseries generator 915.

Still referring to FIG. 9, timeseries processing engine 904 is shown to include a DAG optimizer 918. DAG optimizer 918 can be configured to combine multiple DAGs or multiple steps of a DAG to improve the efficiency of the operations performed by timeseries operators 906. For example, suppose that a DAG has one functional block which adds "Timeseries A" and "Timeseries B" to create "Timeseries C" (i.e., A+B=C) and another functional block which adds "Timeseries C" and "Timeseries D" to create "Timeseries E" (i.e., C+D=E). DAG optimizer 918 can combine these two functional blocks into a single functional block which computes "Timeseries E" directly from "Timeseries A," "Timeseries B," and "Timeseries D" (i.e., E=A+B+D). Alternatively, both "Timeseries C" and "Timeseries E" can be computed in the same functional block to reduce the number of independent operations required to process the DAG.

In some embodiments, DAG optimizer 918 combines DAGs or steps of a DAG in response to a determination that multiple DAGs or steps of a DAG will use similar or shared inputs (e.g., one or more of the same input timeseries). This allows the inputs to be retrieved and loaded once rather than performing two separate operations that both load the same inputs. In some embodiments, DAG optimizer 918 schedules timeseries operators 906 to nodes where data is resident in memory in order to further reduce the amount of data required to be loaded from the timeseries database 928.

Timeseries processing engine 904 is shown to include a directed acyclic graph (DAG) generator 920. DAG generator 920 can be configured to generate one or more DAGs for each raw data timeseries. Each DAG may define a workflow or sequence of operations which can be performed by timeseries operators 906 on the raw data timeseries. When new samples of the raw data timeseries are received, workflow manager 922 can retrieve the corresponding DAG and use the DAG to determine how the raw data timeseries should be processed. In some embodiments, the DAGs are declarative views which represent the sequence of operations applied to each raw data timeseries. The DAGs may be designed for timeseries rather than structured query language (SQL).

In some embodiments, DAGs apply over windows of time. For example, the timeseries processing operations defined by a DAG may include a data aggregation operation that aggregates a plurality of raw data samples having timestamps within a given time window. The start time and end time of the time window may be defined by the DAG and the timeseries to which the DAG is applied. The DAG may define the duration of the time window over which the data aggregation operation will be performed. For example, the DAG may define the aggregation operation as an hourly aggregation (i.e., to produce an hourly data rollup timeseries), a daily aggregation (i.e., to produce a daily data rollup timeseries), a weekly aggregation (i.e., to produce a weekly data rollup timeseries), or any other aggregation duration. The position of the time window (e.g., a specific day, a specific week, etc.) over which the aggregation is performed may be defined by the timestamps of the data samples of timeseries provided as an input to the DAG.

In operation, sample aggregator 908 can use the DAG to identify the duration of the time window (e.g., an hour, a day, a week, etc.) over which the data aggregation operation will be performed. Sample aggregator 908 can use the timestamps of the data samples in the timeseries provided as an input to the DAG to identify the location of the time window (i.e., the start time and the end time). Sample aggregator 908 can set the start time and end time of the time window such that the time window has the identified duration and includes the timestamps of the data samples. In some embodiments, the time windows are fixed, having predefined start times and end times (e.g., the beginning and end of each hour, day, week, etc.). In other embodiments, the time windows may be sliding time windows, having start times and end times that depend on the timestamps of the data samples in the input timeseries.

Figure 10:
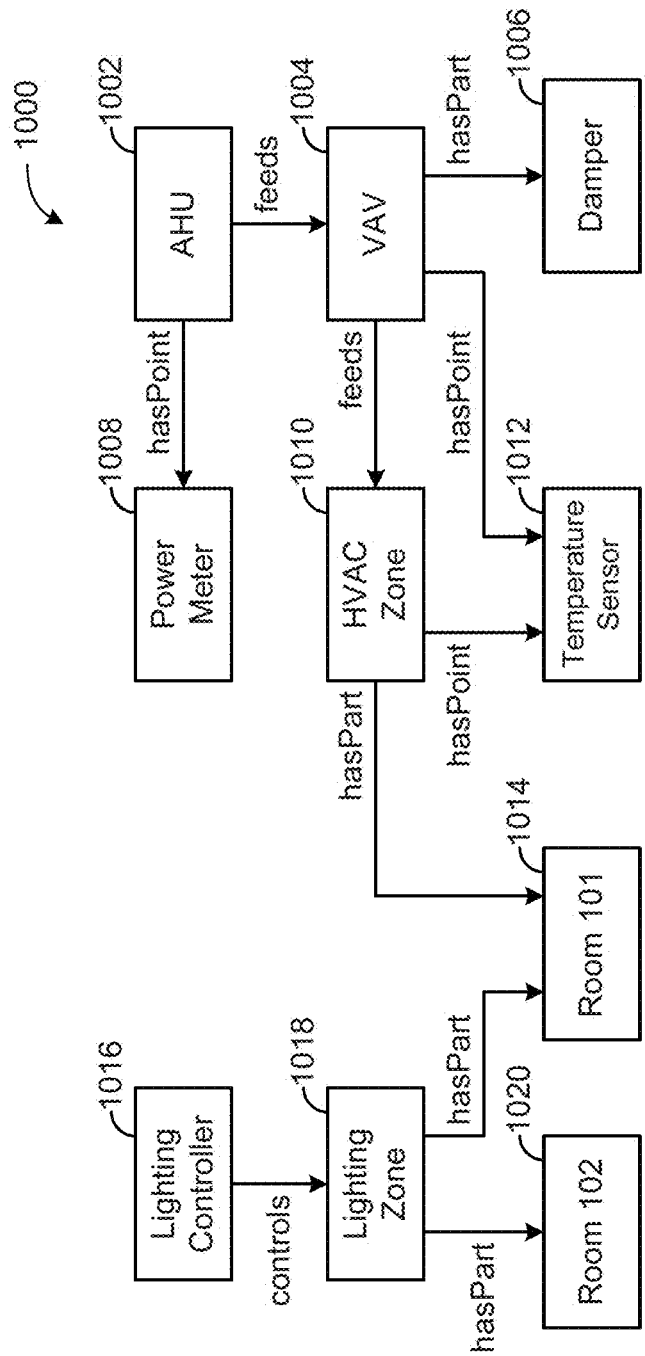
FIG. 10 is an example entity graph of entity data, according to an exemplary embodiment.

FIG. 10 is an example entity graph of entity data according to an embodiment of the present disclosure. The example of FIG. 10 assumes that an HVAC fault detection application has detected an abnormal temperature measurement with respect to Temperature Sensor 1012. However, Temperature Sensor 1012 itself may be operating properly, but may rely on various factors, conditions, and other systems and devices to measure the temperature properly. Accordingly, for example, the HVAC fault detection application may need to know the room 1014 in which the Temperature Sensor 1012 is located, the corresponding temperature setpoint, the status of the VAV 1004 that supplies conditioned air to the room 1014, the status of the AHU 1002 that feeds the VAV 1004, the status of the vents in the HVAC zone 1010, etc., in order to pin point the cause of the abnormal measurement. Thus, the HVAC fault detection application may require additional information from various related subsystems and devices (e.g., entity objects), as well as the zones and rooms (e.g., entity objects) that the subsystems and devices are configured to serve, to properly determine or infer the cause of the abnormal measurement.

Referring to FIG. 10, entity graph 1000 shows the relationship between Temperature Sensor 1012 and related entities via relational entities (e.g., feeds, hasPoint, hasPart, Controls, etc.). For example, entity graph 1000 shows that Temperature Sensor 1012 provides temperature readings (e.g., hasPoint) to the VAV 1004 and the HVAC Zone 1010. An AHU 1002 provides (e.g., feeds) the VAV 1004 with chilled and/or heated air. The AHU 1002 receives/provides power readings (e.g., hasPoint) from/to a Power Meter 1008. The VAV 1004 provides (e.g., feeds) air to HVAC Zone 1010 using (e.g., hasPart) a Damper 1006. The HVAC Zone 1010 provides the air to Room 1014. Further, Rooms 1014 and 1020 are located in (e.g., hasPart) Lighting Zone 1018, which is controlled (e.g., controls) by Lighting Controller 1016.

Accordingly, in the example of FIG. 10, in response to receiving the faulty measurement from Temperature Sensor 1012, the HVAC fault detection application and/or analytics service 624 can determine from the entity graph that the fault could be caused by some malfunction in one or more of the other related entities, and not necessarily a malfunction of the Temperature Sensor 1012. Thus, the HVAC fault detection application and/or the analytics service 624 can further investigate into the other related entities to determine or infer the most likely cause of the fault.

Identity Management

Figure 11:
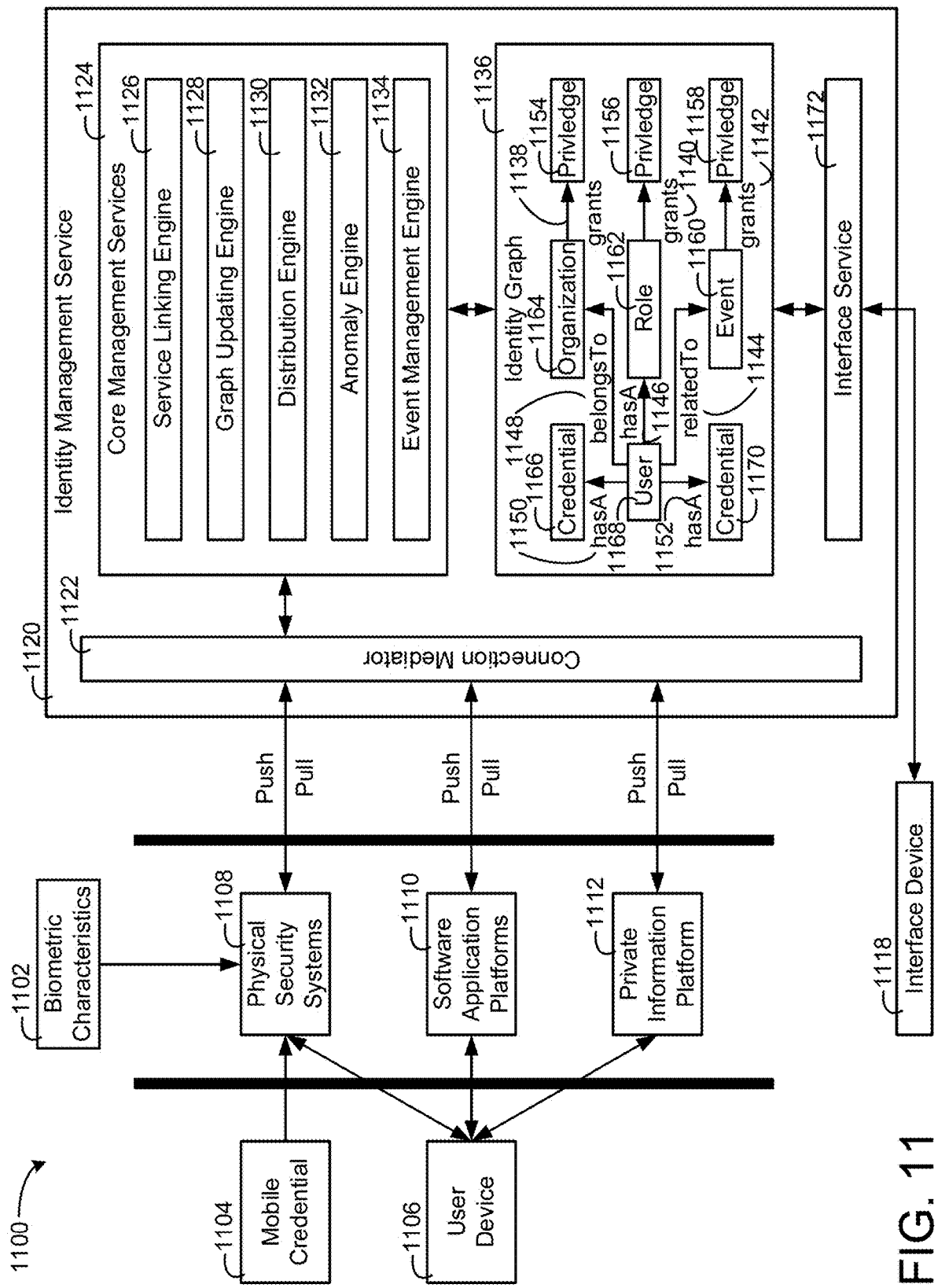
FIG. 11 is a block diagram of security systems and an identity management service, according to an exemplary embodiment.

Referring now to FIG. 11, a system 1100 including security systems and an identity management service 1120 is shown, according to an exemplary embodiment. In FIG. 11, the security systems include a physical security system 1108 (e.g., a surveillance system, a frictionless access system, a biometric access system, a parking lot security system, etc.), software application platforms 1110 (e.g., human resources, billing systems, an employee database, etc.) and a private information platform 1112 (e.g., a document platform, a file storage platform, a private data server, etc.). The systems of FIG. 11 can be similar to, or integrated with, the systems described in U.S. Provisional Patent Application No. 62/794,032 filed Jan. 18, 2019, the entirety of which is incorporated by reference herein. The identity management service 1120 can be implemented on one or more processing circuits (processors) and as instructions stored on one or more memory devices. The identity management service 1120 can be a component of the building management system 600 and/or on the cloud building management platform 620.

The credentials (e.g., either mobile credentials of the mobile credential 1104 or the user device 1106, biometric characteristics 1102, passwords, login usernames, email addresses, etc.) used by a user to access the security systems can be managed by the identity management service 1120. For example, information indicative of credentials can be pushed by the security system to the identity management service 1120. Furthermore, indications of credentials can be pushed from the identity management service 1120 to the security systems. In some embodiments, the security systems can pull credential information from the identity management service 1120.

The identity management service 1120 can include a connection mediator 1122. The connection mediator 1122 can manage communications between the identity management service 1120 and the security systems. Furthermore, the connection mediator 1122 can facilitate communication between core management services 1124 of the identity management service 1120 and the security systems.

The core management services 1124 can include a service linking engine 1126, a graph updating engine 1128, a distribution engine 1130, an anomaly engine 1132, and an event management engine 1134. The service linking engine 1126 can be configured to link particular security systems and/or services with the identity management service 1120, e.g., configure a connection between the identity management service 1120 and the physical security system 1108. The graph updating engine 1128 can be configured to receive credentials, access privileges, and/or any other information from the security systems and update an identity graph 1136 of the identity management service 1120 based on the received information. The distribution engine 1130 can push updates in credentials and/or access privileges of the identity graph 1136 to the security systems. The anomaly engine 1132 can analyze nodes or relationships of the identity graph to determine whether an anomaly exits and raise and alarm in response to a determination that the anomaly exists. The event management engine 1134 can facilitate creating and removing events from the identity graph 1136. Events may be time based entities, e.g., a meeting, a network security issue, etc.

The core management services 1124 can be configured to manage credentials and/or access privileges based on the identity graph 1136. The identity graph 1136 can provide a contextual description of users, systems, roles, events, organizations, and/or privileges. The identity graph 1136 can be a graph database of edges 1138-1152 and nodes 1154-1172. The nodes 1154-1172 can represent entities of a building while the edges 1138-1152 can represent relationships between the entities. The identity graph 1136 includes a user node a two different credentials. Edges "hasA" 1146 relate the user node 1168 to the credentials 1170. The user has a "belongsTo" edge 1148 to an organization node 1164. The organization node 1164 has a "grants" edge 1138 to a privilege node 1154. Because the user belongs to the organization, the user may inherit the privilege of the organization.

The user is linked to a role node 1162 with a "hasA" edge 1146. The role node 1162 is linked to a privilege node 1156 through a "grants" edge 1140. Through the relationship to the role, the user may inherit the privilege. Furthermore, the user is linked to an event node 1160 through a "relatedTo" edge 1144. The event node 1160 is linked to a privilege node 1158 through a "grants" edge 1142. The user can inherit the privilege through the relationship to the event and the relationship between the event and the privilege.

Responsive to receiving a request to confirm or deny a privilege (e.g., an ability of a user, e.g., control a space, gain access to a space, login to an application, etc.) the services 1124 can query the identity graph 1136 to identify one or more nodes or edges linking a subject of the request (e.g., a user, device, system, space, group, organization, etc.) to the privilege. For example, the services 1124 could query the identity graph 1136 to identify a privilege node representing a privilege is connected by one or more edges to a particular user node of a user that the request is for. Similarly, the system could identify that the user has a privilege by identifying edges between the user to an organization, role, or event node which in turn has edges to specific privileges.

The identity management service 1120 includes an interface service 1172 configured to connect the identity management service 1120 with an interface device 1118. The interface device 1118 may be a cellphone, a laptop computer, a desktop computer and/or any other device including an input device (e.g., keyboard, mouse, touchscreen) and a display. The interface device 1118 can access the identity graph 1136 through the interface service and make updates to the identity graph 1136 through the interface service 1172.

Figure 12:
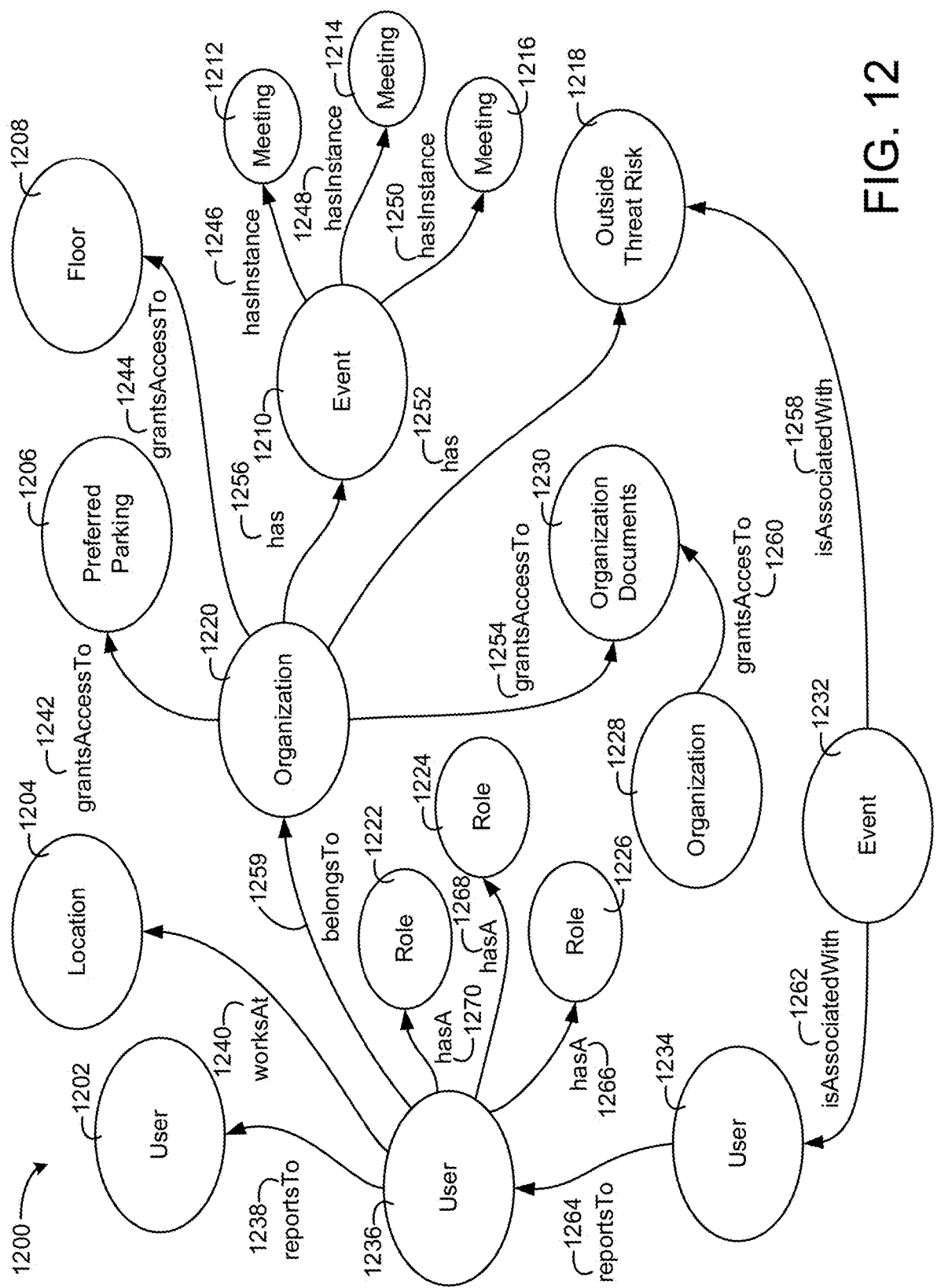
FIG. 12 is a block diagram of an identity graph that can be implemented by the identity management service of FIG. 11, according to an exemplary embodiment.

Referring now to FIG. 12, an identity graph 1200 that can be implemented by the identity management service 1120 of FIG. 11 is shown, according to an exemplary embodiment. The identity graph 1200 includes nodes 1202-1236 and edges 1238-1270. The identity graph 1200 includes a user node 1234 that "reportsTo" 1264 another user node 1236. The user node 1236 "worksAt" 1240 a location 1240. The user 1236 has multiple different roles 1222-1226 within an organization 1220 and has multiple "hasA" edges 1270, 1268, and 1266 to the different roles 1222-1226.

The user node 1236 "reportsTo" 1238 a user 1202. The user 1236 "belongsTo" 1259 an organization 1220. The organization 1220 "grantsAccessTo" 1242 preferred parking 1206, "grantsAccessTo" 1244 a floor 1208, and "grantsAccessTo" 1254 organization documents 1230. The organization 1220 "has" 1256 meeting events, event 1210. The meetings 1212-1216 may be scheduled individually or may be reoccurring meetings. The meetings 1212-1216 can be represented by particular instances of an event 1210 where a "hasInstance" 1246-1250 between an event node 1210 and each meeting instance can represent the particular occurrences of a meeting.

The organization 1220 may be vulnerable to an outside threat risk 1218 indicated by the "has" edge 1252 between the organization 1220 and the outside threat risk 1218. The outside threat risk 1218 could be a risk caused by an event, e.g., a network security breach, a stock price, an active shooter, etc. The event can be represented by the event node 1232 and related to the outside threat risk 1218 by the "isAssociatedWith" edge 1258. In some cases, the event 1232 can be related to a particular user, e.g., "isAssociatedWith" 1262 a particular user 1234. The event 1232 could be associated with the particular user if the user caused the event, is responsible for responding to the event, etc.

Figure 13:
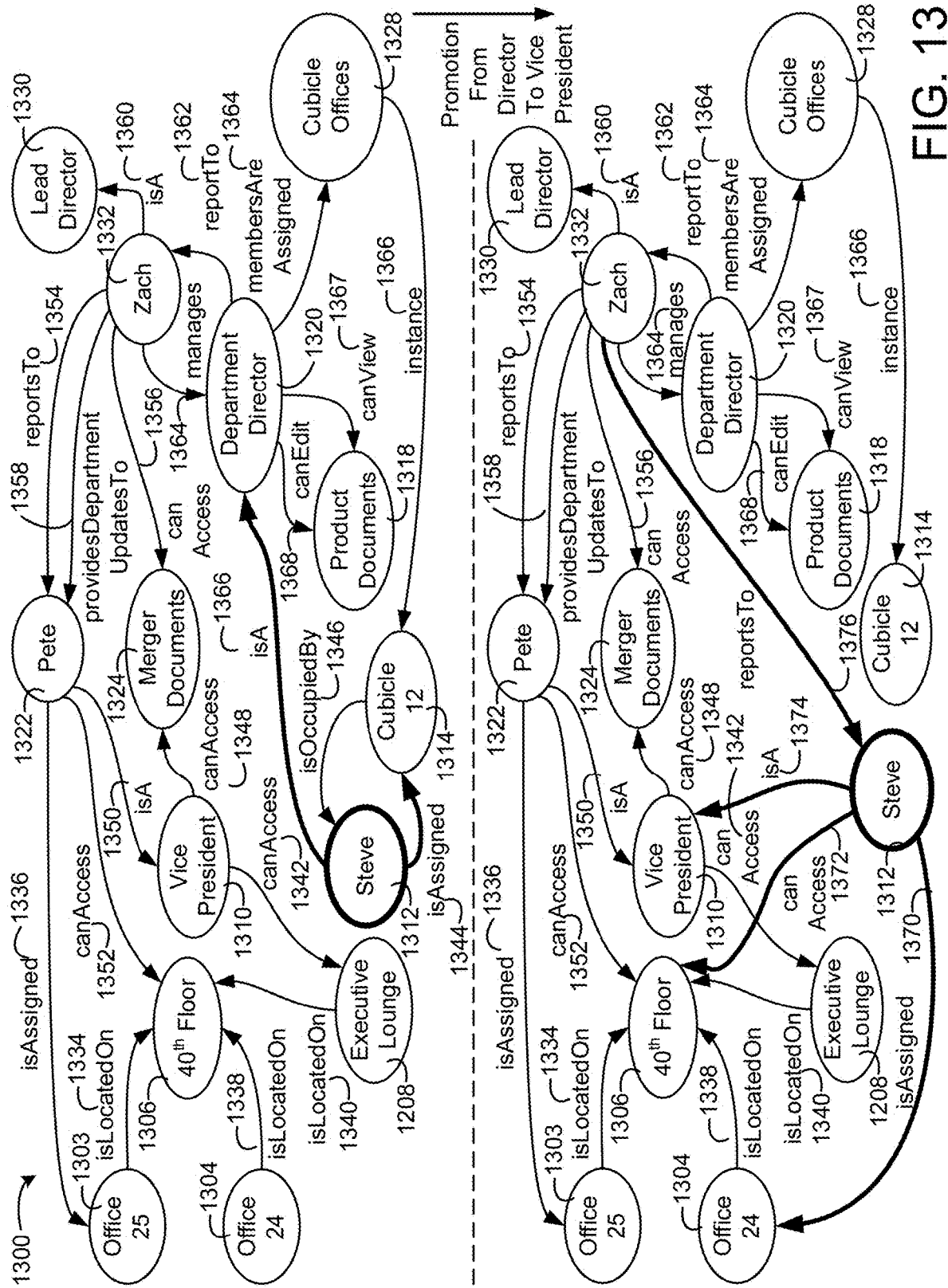
FIG. 13 is a block diagram of an identity graph being updated to track changes when an employee is promoted, according to an exemplary embodiment.

Referring now to FIG. 13, an identity graph being updated to track changes when an employee is promoted is shown, according to an exemplary embodiment. The graph 1300 includes nodes 1302-1332 and edges 1334-1376. The first version of the identity graph 1300 illustrates the graph before a user Steve 1312 is promoted. The second version of the identity graph 1300 illustrates the graph after the user Steve 1312 is promoted. The identity management service 1120 can be configured to receive an indication that Steve has been promoted and modify the identity graph 1300 to the second version of the identity graph 1300.

In the first version of the identity graph 1300, Steve 1312 is assigned to a cubicle 12 (node 1314) based on an "isAssigned" edge 1344 between Steve 1312 and the cubicle 12. Furthermore, the cubicle 12 is occupied by Steve 1312, indicated by the "isOccupiedBy" edge 1346 between the cubicle 12 node 1314 and Steve 1312. Steve 1312 is a department director 1320, indicated by the "isA" edge 1366 between Steve 1312 and the Department Director node 1320. The department director 1320 can both edit and view product documents 1318, indicated by the "canEdit" edge 1368 and the "canView" edge 1367 between the department director 1320 and the product documents 1318.

Users that are department directors are assigned cubicle offices 1328, indicated by the "membersAreAssigned" edge 1364 between the department director 1320 and a cubicle offices node 1328. One particular instance of the cubicle offices node 1328 is cubicle 12, indicated by the "instance" edge 1366 between the cubicle offices 1328 and cubicle 12.

A user, Zach 1332, is a lead director 1330 that manages the department directors. This is indicated by the "isA" edge 1360 between the Zach node 1332 and the lead director node 1330 and the "manages" edge 1364 between Zach 1332 and the department director node 1320. The department directors report to Zach 1332, indicated by the edge "reportTo" 1362 between the department director node 1320 and the Zach node 1332. Zach 1332 has access to merger documents 1324 detailing a merger between two entities. This is indicated by the "canAccess" edge 1356 from the Zach node 1332 to the merger documents node 1324. Furthermore, Zach 1332 reports to another user, Pete 1322, and provides department updates to Pete 1322. This is indicate by the "reportsTo" edge 1354 from the Zach node 1332 to the Pete node 1322 and the "providesDepartmentUpdatesTo" edge 1358 from the Zach node 1332 to the Pete node 1322.

The user Pete 1322 is a vice president 1310. This is indicated by an "isA" edge 1350 from the Pete node 1322 to the vice president node 1310. The vice president 1310 can also access the merger documents 1324, indicated by the "canAccess" edge 1348 from the vice president node 1310 to the merger documents node 1324. Because Pete 1322 is a vice president 1310 and the vice president 1310 can access the merger documents 1324, Pete 1322 can also access the merger documents 1324. Furthermore, the vice president 1310 can access an executive lounge 1208. This is indicated by the "canAccess" edge 1342 between the vice president node 1310 and the executive lounge node 1208. Because Pete 1322 is a vice president 1310 and the vice president 1310 can access the executive lounge 1208, Pete 1322 can access the executive lounge 1208.

The executive lounge, along with an office 24 and an office 25, are located on a $40^{th}$ floor of a building. This is indicated by the "isLocatedOn" edges 1334, 1338, and 1340 between the executive lounge node 1208, the office 24 node 1304, and the office 25 node 1303 and the $40^{th}$ floor node 1306. The user Pete 1322 is assigned to the office 25, indicated by the edge "isAssigned" 1336 between the Pete node 1322 and the office 25 node 1303.

When the user Steve 1312 is promoted from a department director 1320 to a vice president 1310, the identity management service can update the identity graph from the first version to the second version. The identity management service 1120 can delete the "isOccupiedBy" edge 1346 and the "isAssigned" edge 1344 between the Steve node 1312 and the cubicle 12 node 1314. The identity management service can add a "reportsTo" edge 1376 between the Zach node 1332 and the Steve node 1312. Before the promotion, Steve 1312 reported to Zach 1332. However, as part of the promotion, Steve 1312 is promoted above Zach 1332 and Zach 1332 reports to Steve 1312.

Furthermore, the identity management service 1120 adds an "isA" edge 1374 between the Steve node 1312 and the vice president node 1310 because Steve 1312 is promoted to vice president level. As part of the promotion to vice president 1310, Steve gains access to the merger documents 1324 through his promotion to vice president 1310. Steve 1312 is assigned the office 24 as part of his promotion, indicated by the "isAssigned" edge 1370 between the Steve node 1312 and the office 24 node 1304. Furthermore, because Steve 1312 is promoted to vice president 1310 and gains access to the executive lounge 1208 and is assigned the Office 24, both of which are located on the $40^{th}$ floor 1306, Steve 1312 also gains access to the 40th floor 1306. This is indicated by the "canAccess" edge 1372 added between the Steve node 1312 and the 40th floor node 1306.

Figure 14:
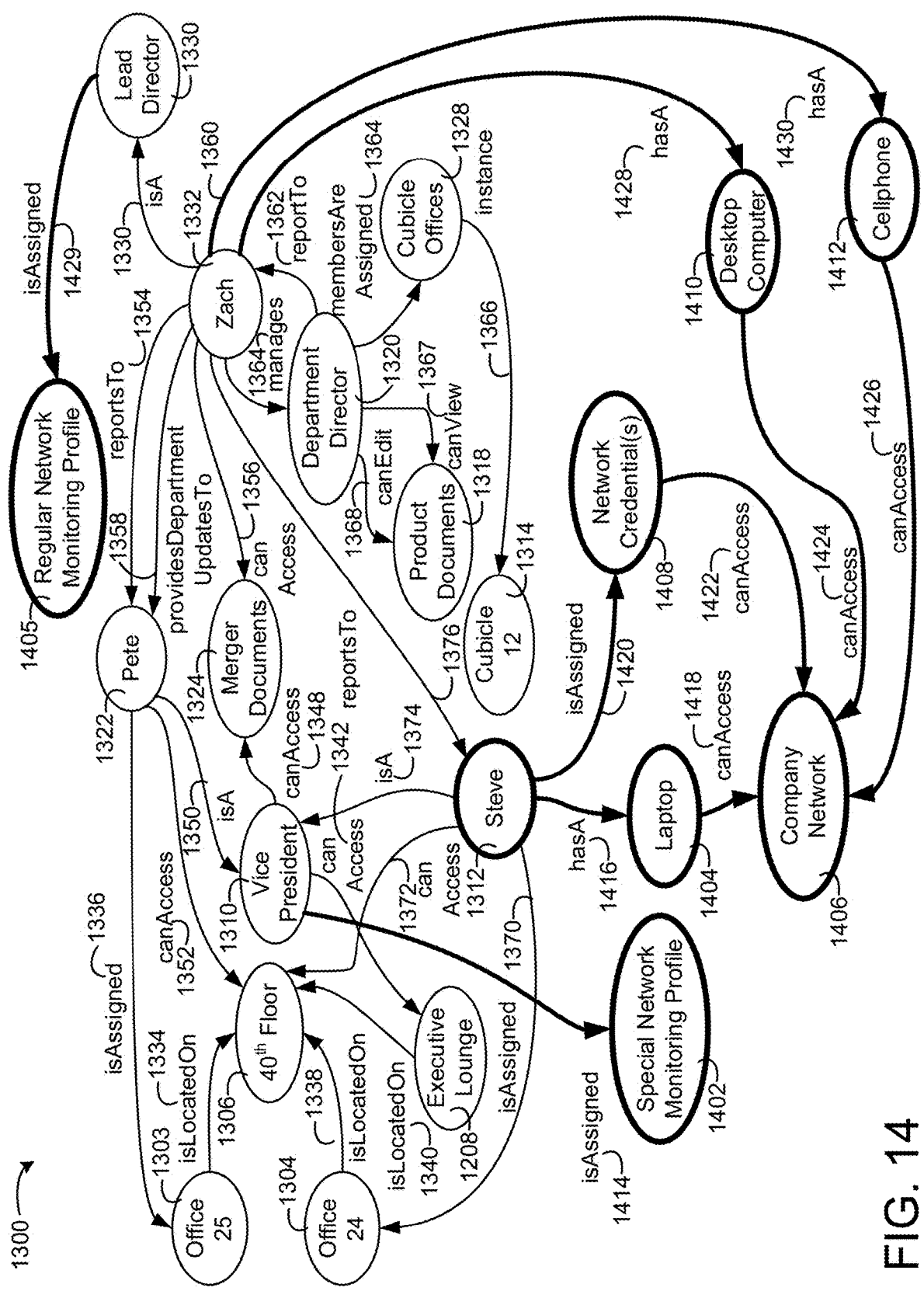
FIG. 14 is a block diagram of the identity graph of FIG. 13 where personal computer and network credentials are managed for the promoted employee, according to an exemplary embodiment.

Referring now to FIG. 14, the identity graph 1300 of FIG. 13 is shown where personal computer and network credentials are managed for Steve 1312 and Zach 1332 with nodes 1402-1412 and edges 1414-1430, according to an exemplary embodiment. Steve 1312 is associated with both a company laptop 1404 and network credentials 1408. The laptop 1404 is represented by a laptop node 1404 and its assignment to Steve 1312 is represented by the "hasA" edge 1416 from the Steve node 1312 and the laptop node 1404. Furthermore, the network credentials 1408 are represented by the network credentials node 1408 and their assignment to Steve 1312 is represented by the "isAssigned" edge 1420 from the Steve node 1312 to the network credentials node 1408.

The laptop 1404 and network credentials 1408 of Steve 1312 can be assigned access to a company network 1406, indicated by the "canAccess" edges 1418 and 1422 between the laptop node 1404 and the network credentials node 1408 and the company network 1406. Because Steve 1312 is a vice president 1310, Steve's devices and/or network activity can be provided special network monitoring 1402. This can be indicated through the "isAssigned" edge 1414 between the vice president node 1310 and the special network monitoring profile node 1402. The profile can be applied to Steve 1312 since Steve 1312 may have access to high value documents and his if the devices or credentials of Steve 1312 are compromised, immediate detection may be important.

The user Zach 1332 is assigned a desktop computer 1410 and a cellphone 1412. The assignments are represented by the "hasA" edges 1428 and 1430 from the Zach node 1332 to the desktop computer node 1410 and the cellphone node 1412. Both the desktop computer 1410 and the cellphone 1412 can access the company network 1406, indicated by the "canAccess" edges 1424 and 1426 between the desktop computer 1410 and the cellphone 1412 and the company network 1406 respectively. Zach 1332 is a lead director 1330 and may be assigned regular network monitoring. Zach 1332 may not be as high a target as Steve 1312 to hackers since Zach 1332 has a lower position. Furthermore, Zach 1332 may not have access to highly classified documents. Therefore, a regular network monitoring profile 1405 can be assigned the lead director 1330 (e.g., Zach 1332). This can be indicated through the edge "isAssigned" 1429 between the lead director node 1330 and the regular network monitoring profile 1405.

Figure 15:
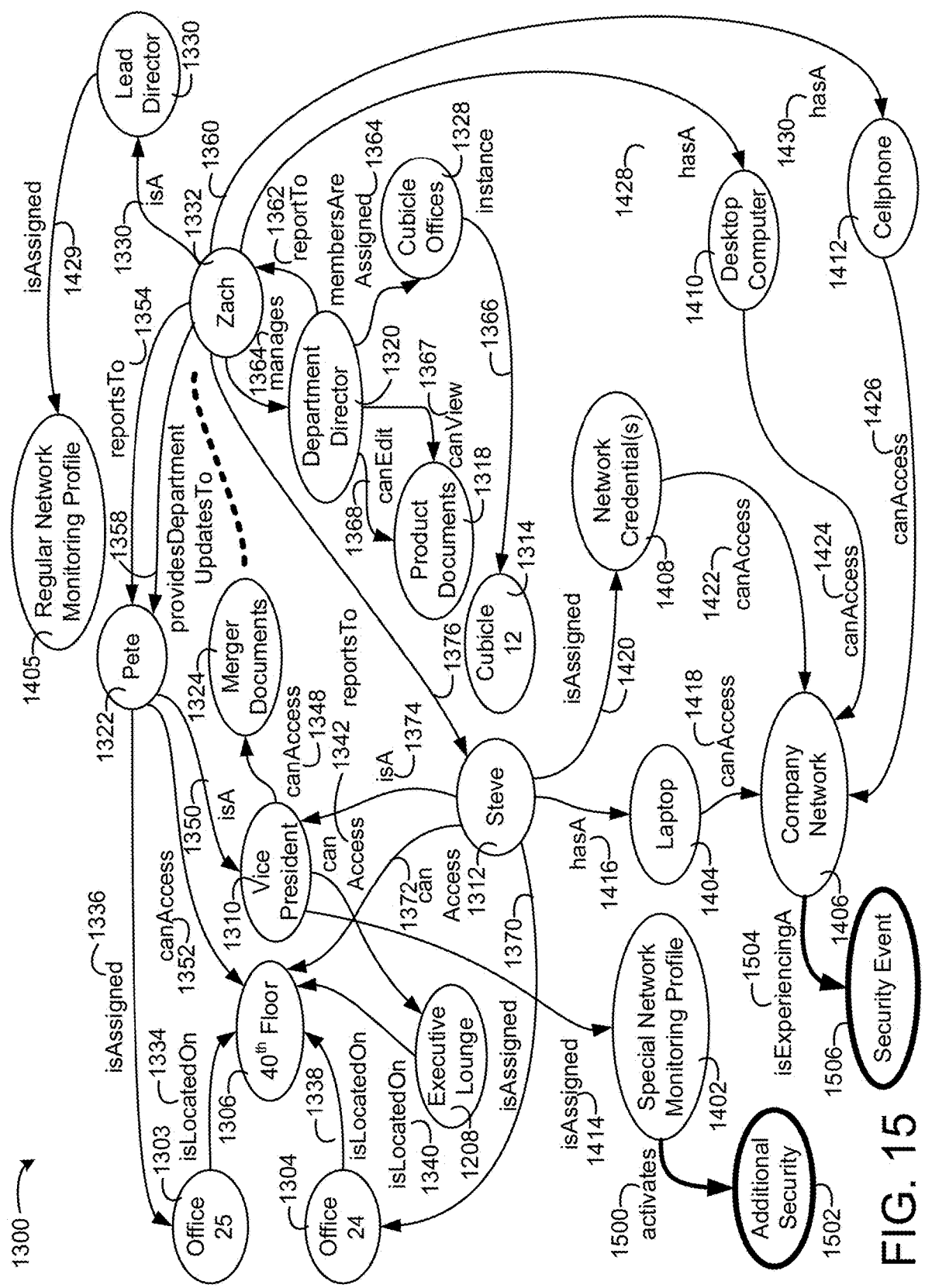
FIG. 15 is a block diagram of the identity graph of FIG. 14 where relationships and nodes are edited by the identity management service of FIG. 11 when a network security event occurs, according to an exemplary embodiment.

Referring now to FIG. 15, the identity graph 1300 of where relationships and nodes are edited by the identity management service 1120 of FIG. 11 when a network security event occurs, according to an exemplary embodiment. In FIG. 15, the identity management service 1120 updates the identity graph 1300 with a security event 1506. The company network 1406 experiences the security event 1506, indicated by the "isExperiencingA" edge 1504 between the company network 1406 and the security event 1506. In response to the company network 1406 experiencing the security event 1506, the identity management service 1120 can initiate additional security for the special network monitoring profile 1402, indicated by the additional security node 1502 and the "activates" edge 1500 between the special network monitoring profile 1402.

This enables Steve 1312 to continue accessing the merger documents 1324 but with additional security 1502. Because Zach 1332 does not have the special network monitoring profile 1402, his access to the merger documents 1324 can be removed. It may be important for Steve 1312 to access the merger documents 1324 and continue reviewing and/or editing the documents 1324. Therefore, rather than isolating the merger documents from Steve 1312, the additional security protocols can be implemented to verify that access by Steve 1312 to the documents 1318 is secure. However, Zach 1332 may not require access to the merger documents 1324 to complete his duties as a lead director and therefore rather than allocating network resources to implementing additional security for Zach 1332, Zach 1332 is isolated from accessing the merger documents 1324.

Figure 16:
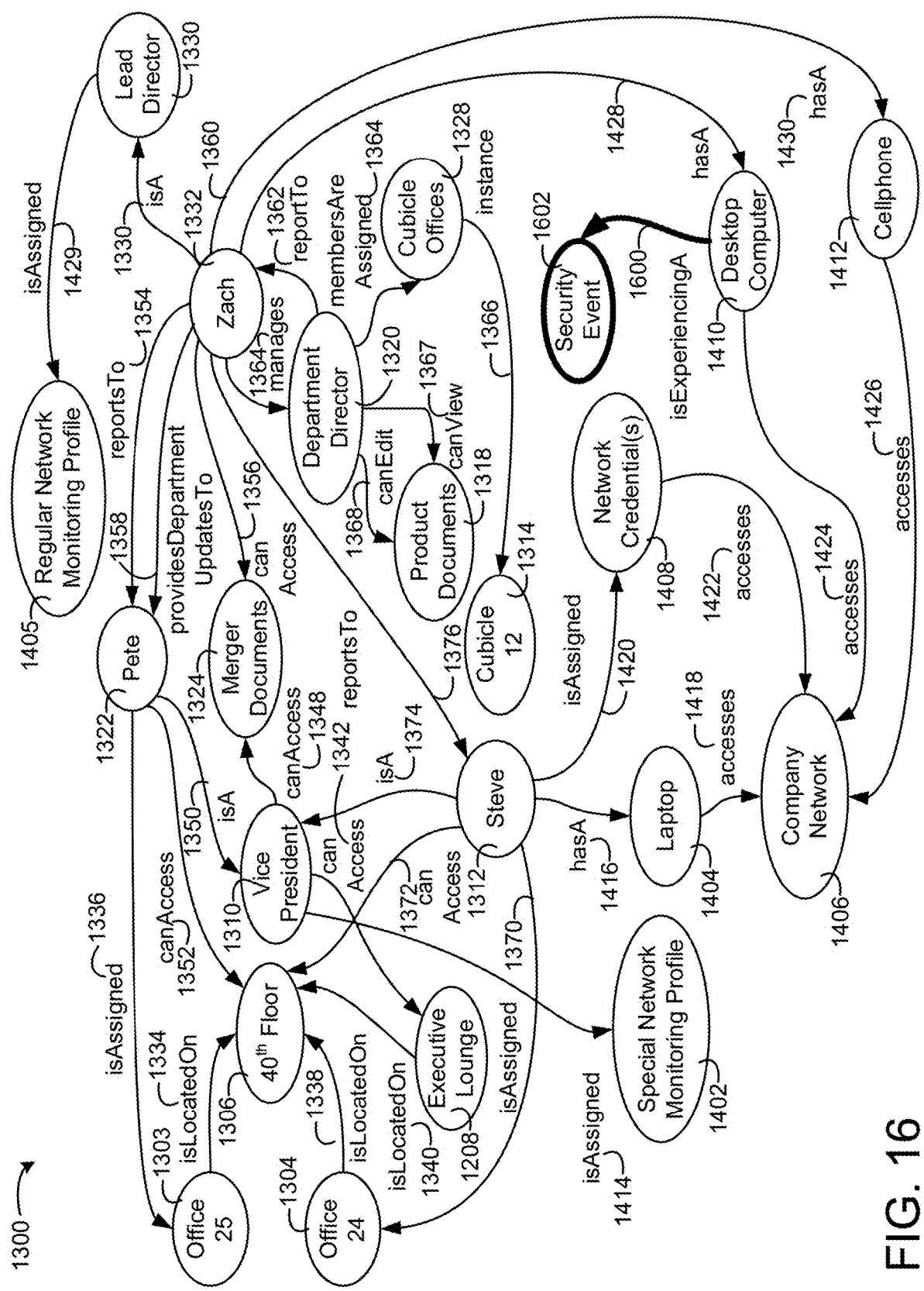
FIGS. 16-17 are block diagrams of the identity graph of FIG. 13 being managed when a particular computing device experiences a security event, according to an exemplary embodiment.
Figure 17:
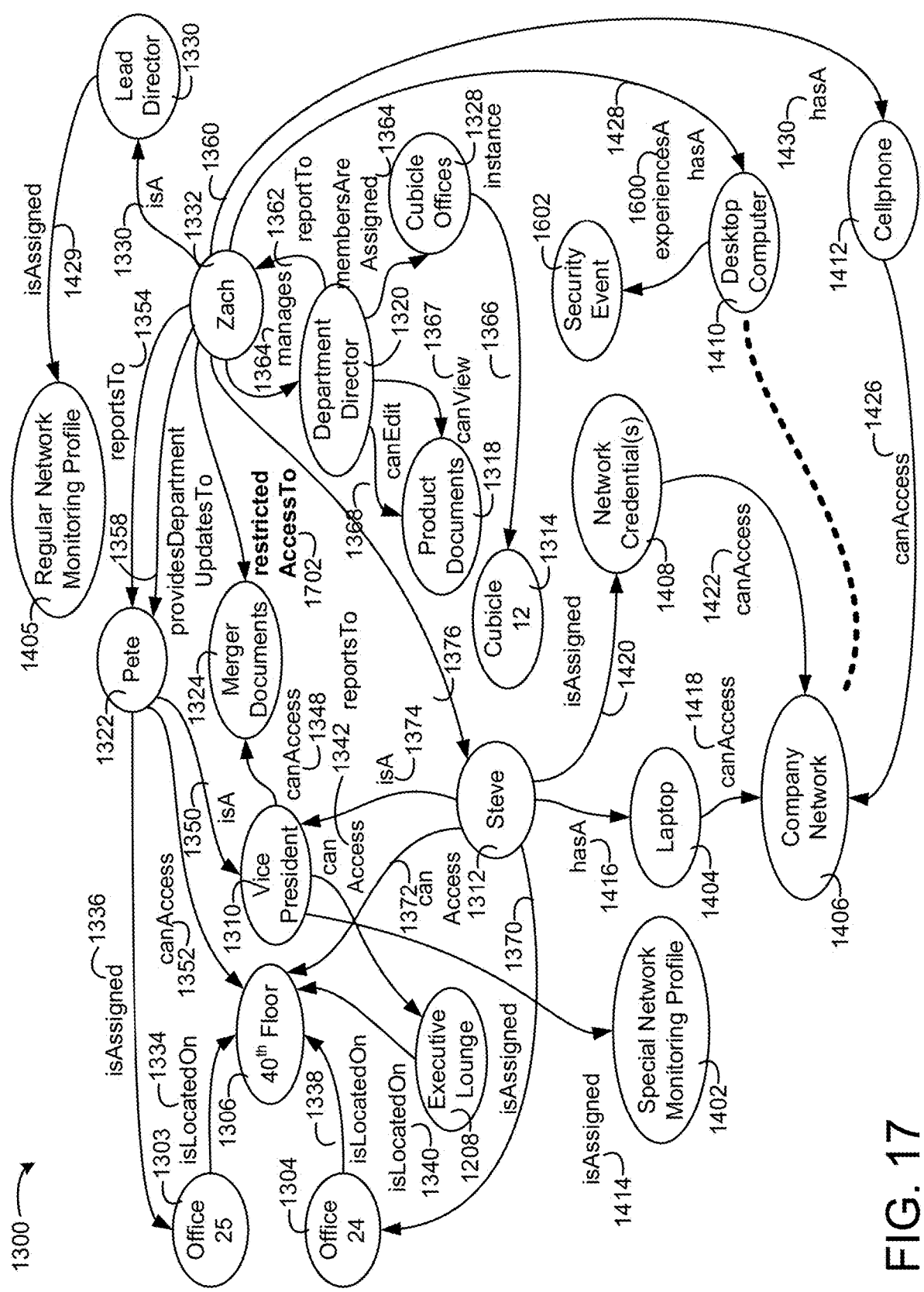

Referring now to FIGS. 16-17 are block diagrams of the identity graph 1300 of FIG. 13 being managed when a particular computing device experiences a security event 1602, according to an exemplary embodiment. In FIG. 16, the desktop computer 1410 of Zach 1332 experiences a security event 1602. The security event 1602 could be the desktop computer 1410 being infected with malware, a virus, and/or any other piece of unauthorized software. The identity management service 1120 can add the security event to the identity graph and add an "isExperiencingA" edge 1600 between the desktop computer 1410 and the security event 1602.

In FIG. 17, the identity graph 1300 is updated by the identity management service 1120 to isolate the desktop computer 1410 from the company network 1406. Because the desktop computer 1410 is experiencing the security event 1602, the desktop computer 1410 should be removed from the company network 1406 to stop an unauthorized user from gaining access to data on the company network 1406 and/or stop viruses, malware, or other unauthorized software from being distributed throughout the company network 1406 by the desktop computer 1410. The identity graph 1300 can delete the "accesses" edge 1424 between the desktop computer 1410 and the company network 1406, isolating the desktop computer 1410 from the company network 1406.

Figure 18:
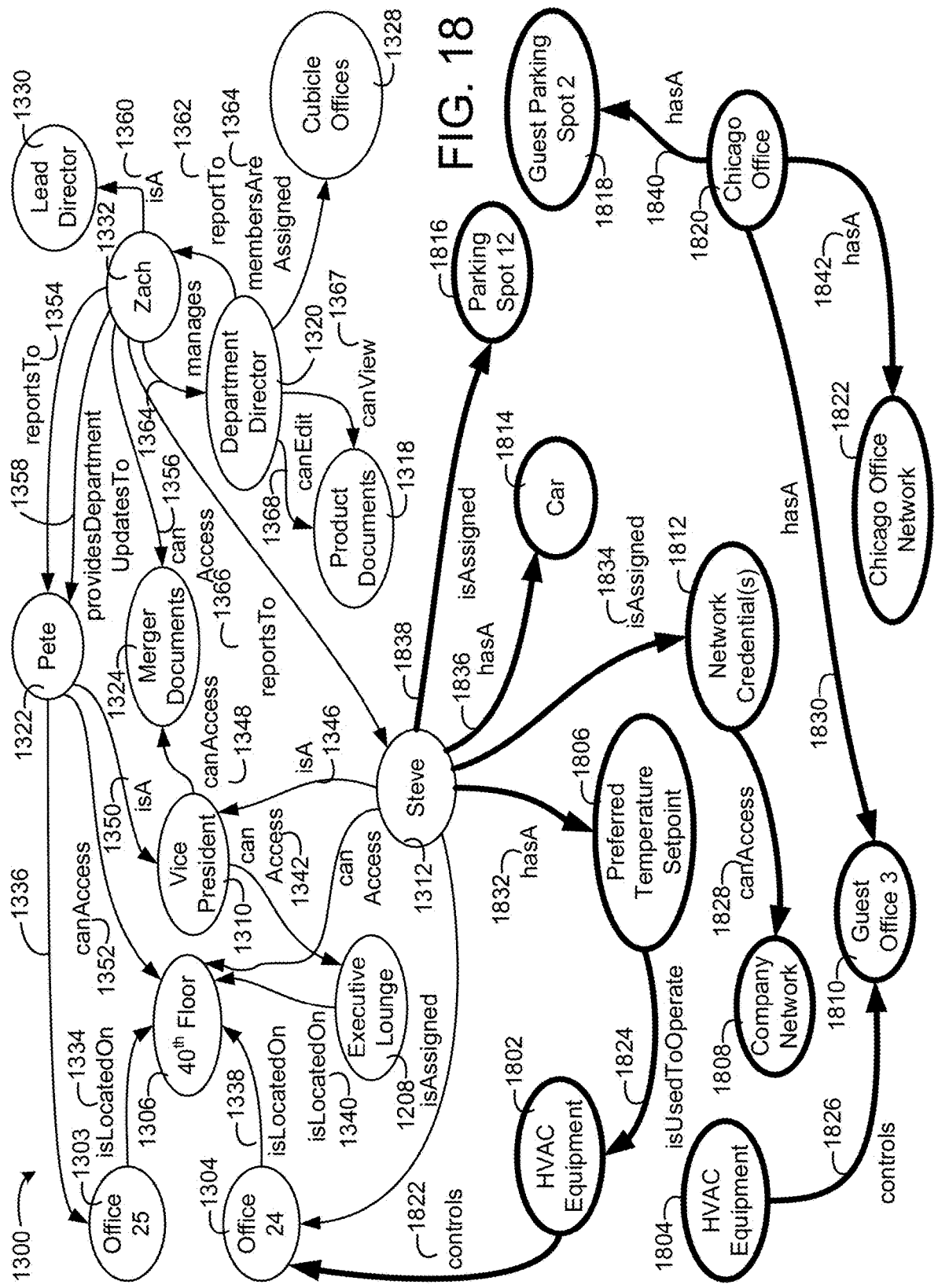
FIGS. 18-19 is a block diagram of the identity graph of FIG. 13 managed by the identity management service of FIG. 11 when a user visits an office, according to an exemplary embodiment.
Figure 19:
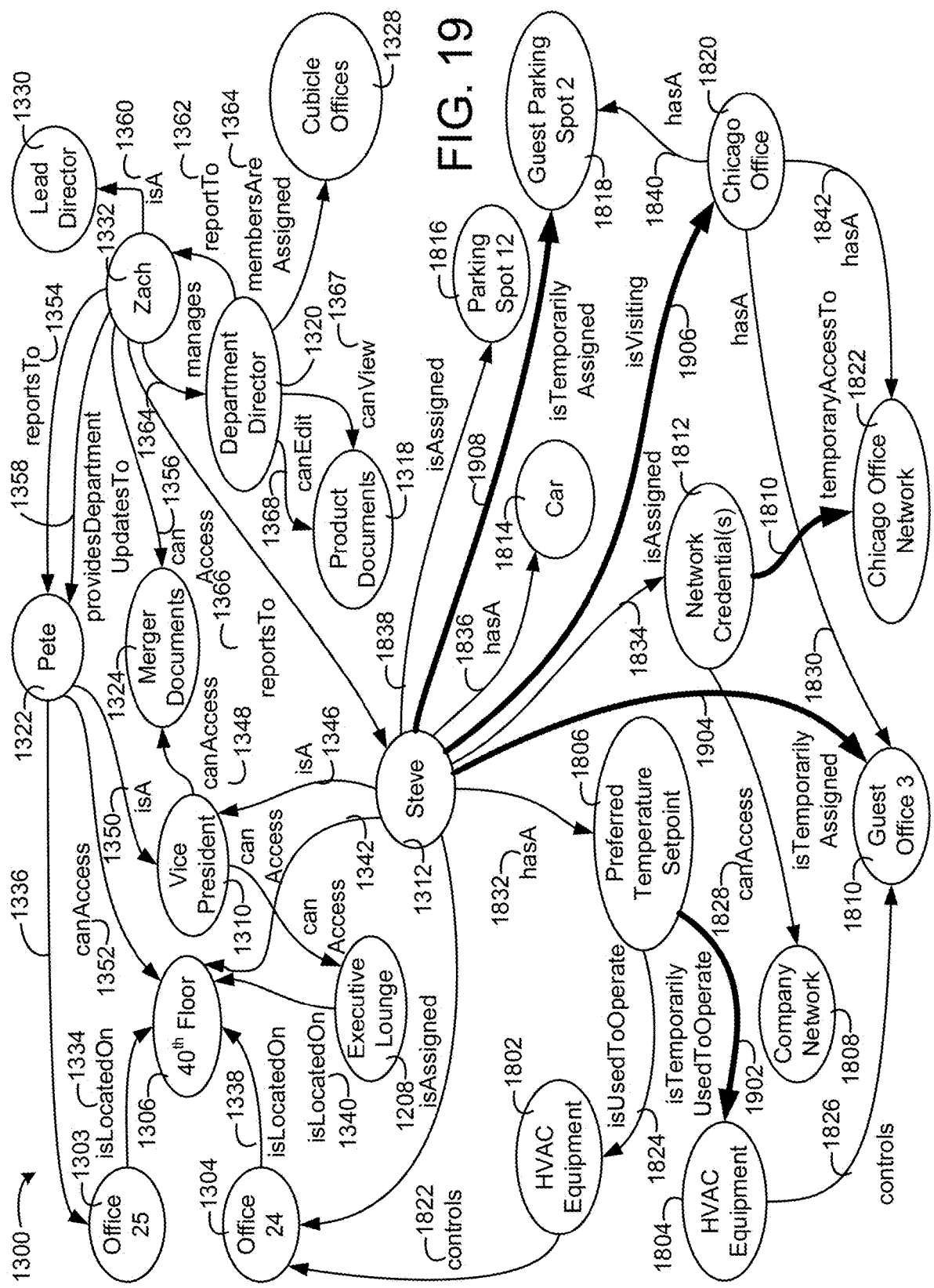

Referring now to FIGS. 18-19, the identity graph 1300 of FIG. 13 managed by the identity management service 1120 of FIG. 11 for a scenario where Steve 1312 visits an office, according to an exemplary embodiment. FIG. 18 represents the identity graph 1300 before the identity graph 1300 is updated by the identity management service 1120 and FIG. 19 represents the identity graph 1300 after the identity graph 1300 is updated. The identity management service 1120 updates the identity graph 1300 for a scenario where Steve 1312 visits another office.

Steve 1312 is assigned a parking spot 1816, the parking spot 12. This is indicated by the "isAssigned" edge 1838 between the Steve node 1312 and the parking spot 12 node 1816. Steve 1312 also owns a car 1814, represented by the "hasA" edge 1836 between the Steve node 1312 and the car node 1814. Steve 1312 further has a preferred temperature setpoint 1806, indicated by the "hasA" edge 1832 between the Steve node 1312 and the preferred temperature setpoint node 1806. The setpoint 1806 of Steve 1312 is used to operate HVAC equipment 1802 that control the office 1304 of Steve 1312, Office 24. This is indicated by the "isUsedToOperate" edge 1824 between the preferred temperature setpoint 1806 and the HVAC equipment 1802 and the "controls" edge 1822 between the HVAC equipment 1802 and the Office 24 node 1304.

Another office of the company associated with Steve may be a Chicago office represented by the Chicago Office node 1820. The Chicago office 1820 has a parking spot 1818 for guests, a guest parking spot 2 node 1818. A "hasA" edge 1840 between the Chicago office node 1820 and the guest parking spot 2 node 1818 indicates the relationship between the Chicago office 1820 and the guest parking spot 1818. The Chicago office 1820 further includes an office network 1822. This is indicated by the Chicago office network node 1822 and the edge "hasA" 1842 between the Chicago office node 1822 and the Chicago office network node 1820.

The Chicago office 1820 (a building or rented portion of a building) has multiple guest offices (personal offices). One office may be guest office 3 node 1810. A "hasA" edge 1830 from the Chicago office node 1820 and the guest office 3 node 1810 indicates that the guest office 3 is part of the Chicago office 1820. Furthermore, HVAC equipment 1804 of the Chicago office 1820 controls the temperature of the guest office 3, indicated by the "controls" edge 1826 from the HVAC equipment 1804 to the guest office 3.

In FIG. 19, when Steve 1312 is visiting the Chicago office 1822, the identity management service 1120 can add a "isVisiting" edge 1906 between the Steve node 1312 and the Chicago office node 1820. Furthermore, the identity management service 1120 can assign Steve 1312 to the guest parking spot 2, indicated by the identity management service 1120 adding the "isTemporarilyAssigned" edge 1908 between the Steve node 1312 and the guest parking spot 2 node 1818. Furthermore, the network credentials of Steve can be assigned temporary access to the Chicago office network 1822, indicated by the "temporaryAccessTo" edge 1810 between the network credentials node 1812 and the Chicago office network node 1822. The network credentials 1812 "canAccess" 1828 a company network 1808.

Furthermore, Steve 1312 is assigned the guest office 3 on a temporary basis, indicated by the "isTemporarilyAssigned" edge 1904 between the Steve node 1312 and the guest office 3 node 1810. Furthermore, the preferred temperature setpoint of Steve 1312 is temporarily used to control the HVAC equipment 1804 that controls the environmental condition of the guest office 3 to which Steve is temporarily assigned. This is indicated by the "isTemporarilyUsedToOperate" edge 1902 between the preferred temperature setpoint node 1806 and the HVAC equipment node 1804. The temporary edges can be added for a predefined period of time by the identity management service 1120 and then removed. The temporary edges can be assigned for the duration of the visit by Steve 1312 to the Chicago office 1820.

Figure 20:
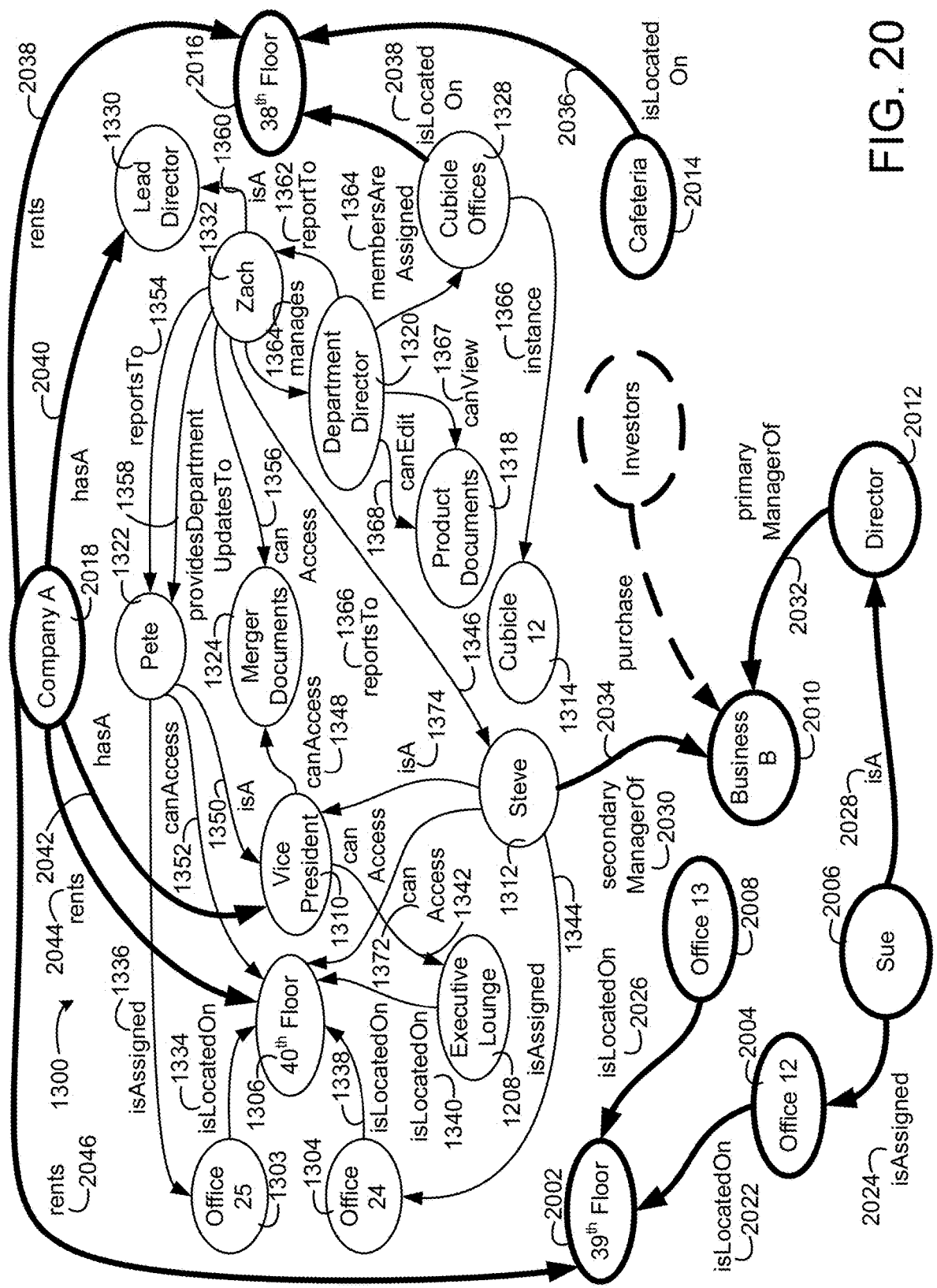
FIGS. 20-21 is a block diagram of the identity graph of FIG. 13 managed by the identity management service of FIG. 11 when a company undergoes a divestiture, according to an exemplary embodiment.
Figure 21:
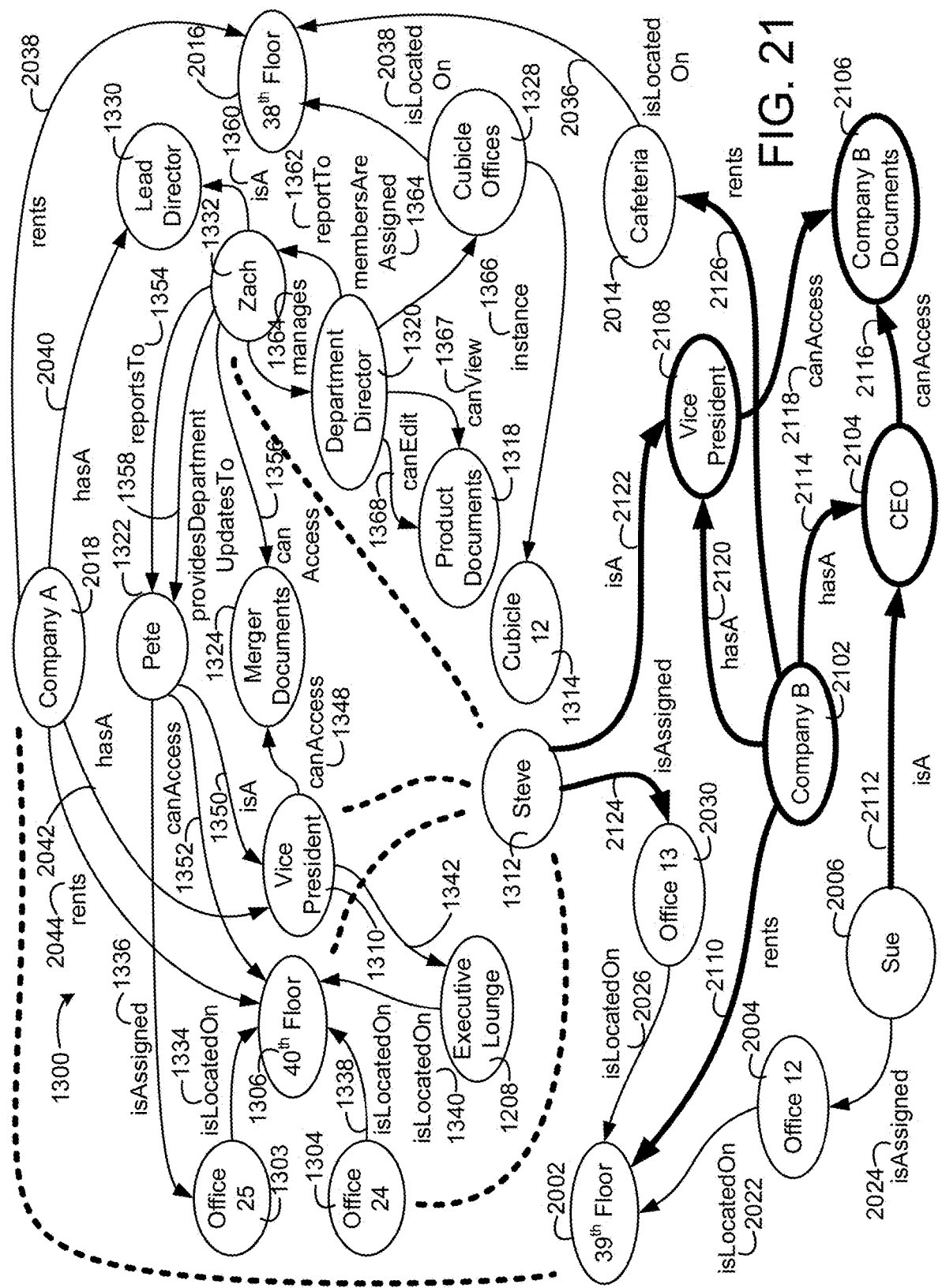

Referring now to FIGS. 20-21, the identity graph 1300 of FIG. 13 managed by the identity management service 1120 of FIG. 11 when a company undergoes a divestiture is shown, according to an exemplary embodiment. FIG. 20 represents the identity graph 1300 before the divestiture while the FIG. 21 represents the identity graph 1300 after the divestiture. The updates to the identity graph 1300 can be made by the identity management service 1120 in response to receiving an indication of the divestiture from another system.

In FIG. 20, a company A 2018 is shown to be the company under which Pete 1322, Steve 1312, and Zach 1332 are employed. The company A 2018 is linked to the vice president 1310 and lead director 1330 through "hasA" edges 2042 and 2040. Furthermore, the company A 2018 rents a number of floors of a building, the 38th floor 2016, the 39th floor 2002, and the 40th floor 1306. This is indicated by the "rents" edges 2046, 2044, and 2038. One business of the company A 2018 is business B 2010. Steve 1312 is the secondary manager of the business B 2010, indicated by the "secondaryManagerOf" edge 2034 between the Steve node 1312 and the business B node 2010. Sue 2006, another user, is the director of business B 2010, indicated by the "isA" edge 2028 between the Sue node 2006 and the director node 2012 and the "primaryManagerOf" edge 2032 between the director node 2012 and the business B node 2010.

Sue 2006 is assigned an office 12 by "isAssigned" edge 2024. The office 12 and another office 13 are both located on the 39th floor represented by the edges "isLocatedOn" 2022 between the offices 2004 and 2008 and the 39th floor 2002. Furthermore, a cafeteria 2014 is located on the 38th floor 2016 indicated by the "isLocatedOn" edge 2038 between the cafeteria node 2014 and the 38th floor node 2016. Investors, or another entity, may purchase business B 2010 causing the divestiture of business B 2010 from the company A 2018.

In response to the divestiture occurring, the identity management service 1120 can update the edges and/or nodes of the identity graph 2013, shown in FIG. 21. The business B 2010 can be updated to a company B 2102. The "rents" edge 2110 between company A 2018 and the 39th floor 2002 can be removed since this floor can be assigned to the company B 2102, i.e., the identity management service 1120 adds a "rents" edge 2110 between the company B 2102 and the 39th floor 2002. The identity management service 1120 removes the "isAssigned" edge 1344 between the Steve node 1312 and the office 24 node 1304 and the "canAccess" edge between the Steve node 1312 and the 40th floor node 1306. Since Steve 1312 is assigned to work for company B 2102 as part of the divestiture, Steve 1312 moves floors to floor 39, particularly to office 13. The identity management service 1120 adds an "isAssigned" edge 2124 between the Steve node 1312 and the office 13 node 2030.

Furthermore, the identity management service 1120 removes the "isA" edge 1374 between the Steve node 1312 and the vice president node 1310. This edge 1374 can be removed as Steve 1312 stops working for company A 2010 and becomes an employee of company B 2102 as part of the divestiture. The identity management service 1120 can add an "isA" edge 2122 between Steve 1312 and vice president node 2108 of the company B 2102. Furthermore, the "reportsTo" edge 1366 between the Zach node 1332 and the Steve node 1312 can be removed since Steve 1312 stops working for Company A 2018.

The company B 2102 can rent the cafeteria 2014 on the 38th floor 2016 and the entire 39th floor 2002. This can be indicated by the "rents" edges 2126 between the company B 2102 and the cafeteria node 2014 and the 39th floor node 2002. Furthermore, the company B 2102 can have a vice president 2108 and a CEO 2104, this can be indicated by the edges "hasA" 2114 between the company B node 2102 and the CEO node 2104 and the "hasA" edge 2120 between the company b node 2102 and the vice president node 2108. The CEO node 2104 "canAccess" 2116 company B documents 2106.

As part of the divestiture, Sue 2006 can be promoted to CEO 2104 of company B 2102. The identity management service 1120 can add a "isA" node 2112 between the Sue node 2006 and the CEO node 2104. Furthermore, documents 2106 for the company B 2102 can be represents as a company B documents node 2106. Both the CEO 2104 and the vice president 2108 can access the company B documents 2106, indicated by the "canAccess" edges 2118 between the vice president node 2108 and the company B documents 2106 and the CEO node 2104 and the company B 2106 documents respectively.

Figure 22:
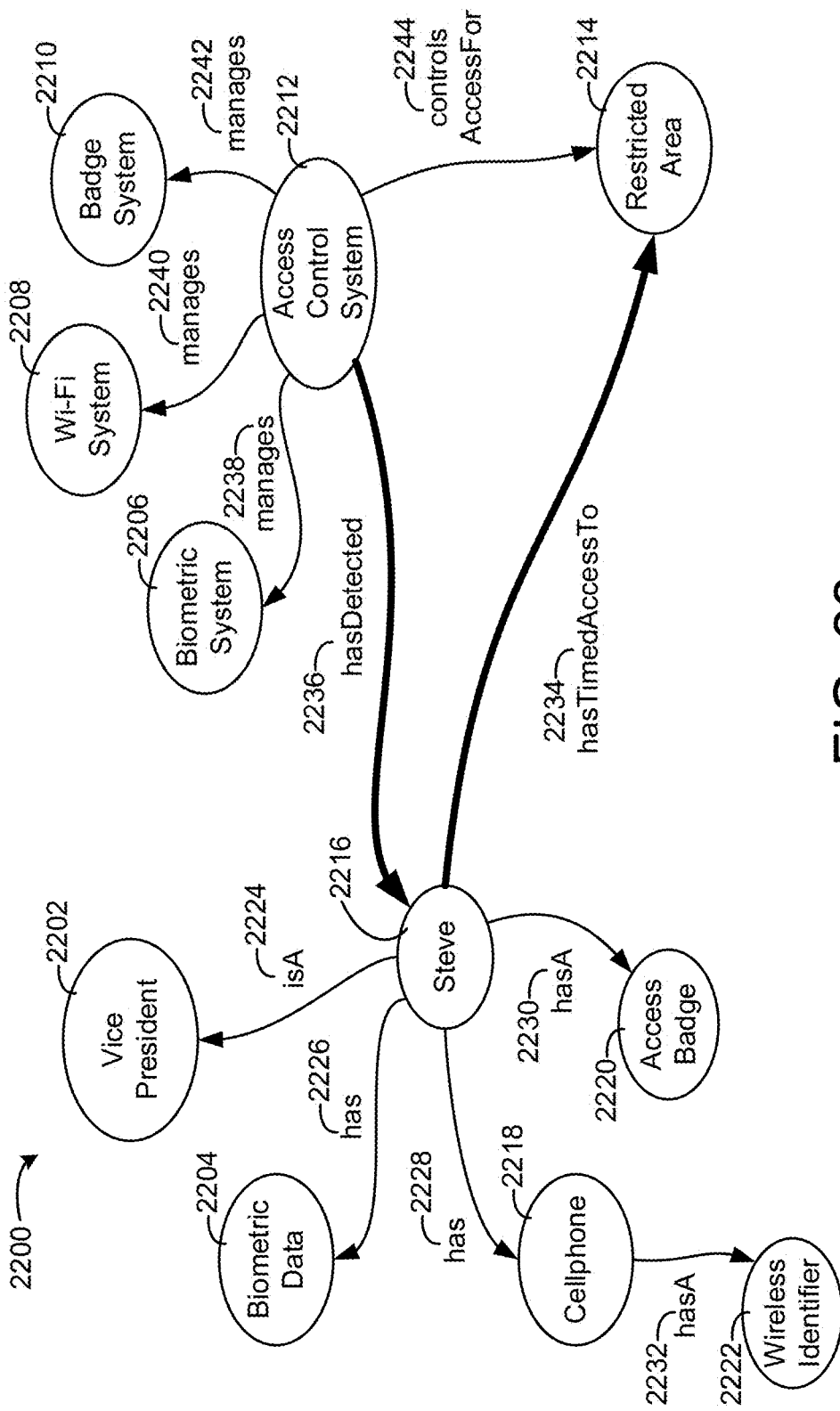
FIG. 22 is a block diagram of an identity graph managed by the identity management service of FIG. 11 when an access control system detects a user, according to an exemplary embodiment.

Referring now to FIG. 22, an identity graph 2200 managed by the identity management service 1120 of FIG. 11 when an access control system 2212 detects a user is shown, according to an exemplary embodiment. The identity graph 2200 includes a Steve node 2216 representing a particular user "Steve." The Steve node 2216 is linked to a role, Vice President, based on the "isA" edge 2224 between Steve 2216 and a Vice President node 2202. Biometric data for Steve is stored as another node 2204 and is related to Steve 2216 via a "has" edge 2226 between the Steve node 2216 and a biometric data node 2204.

Steve 2216 is also associated with a cellphone 2218 indicated by a "has" edge 2228 between the Steve node 2216 and a cellphone node 2218. The cellphone 2218 has a particular wireless identifier 2222, e.g., a number, code, character string, etc. that identifies the cellphone 2218. The wireless identifier 2222 is stored as a wireless identifier node 2222 and is related to the cellphone node 2218 with a "hasA" edge 2232 from the cellphone node 2218 to the wireless identifier node 2222. Furthermore, Steve 2216 also possesses an access badge 2220. A node for the access badge 2220 is related to the Steve node 2216 through a "hasA" edge 2230 between a Steve node 2216 and an access badge node 2220.

The identity graph 2200 further includes an access control system node 2212 representing an access control system. The access control system 2212 manages other access control subsystems, i.e., a biometric system 2206, a Wi-Fi system 2208, and a badge system 2210. The identity graph 2200 includes "manages" edges 2238-2242 between the access control system node 2212 and the biometric system node 2026, the Wi-Fi system node 2208, and the badge system node 2210. Steve 2216 can access a restricted area, represented by a restricted area node 2214, with his biometric data via the biometric system 2206, with his cellphone wireless identifier 2222 via the Wi-Fi system 2208, or his access badge 2220 via the badge system 2210. The restricted area node 2214 is linked to the access control system 2212 via a "controlsAccessFor" edge 2244 between the access controls system node 2212 and the restricted area node 2214.

Steve 2216 may not normally have access to the restricted area 2214. However, when Steve 2216 authenticates with the access control system 2212, Steve 2216 may be provided with temporary access to the restricted area 2214. The identity management service 1120 can, in response to receiving an indication that Steve 2216 has authenticated with the access control system 2212, generate a "hasDetected" edge 2236 between the access control system node 2212 and the Steve node 2216. Furthermore, the identity management service 1120 can add a "hasTimedAccessTo" edge 2234 between the Steve node 2216 and the restricted area node 2214.

Figure 23:
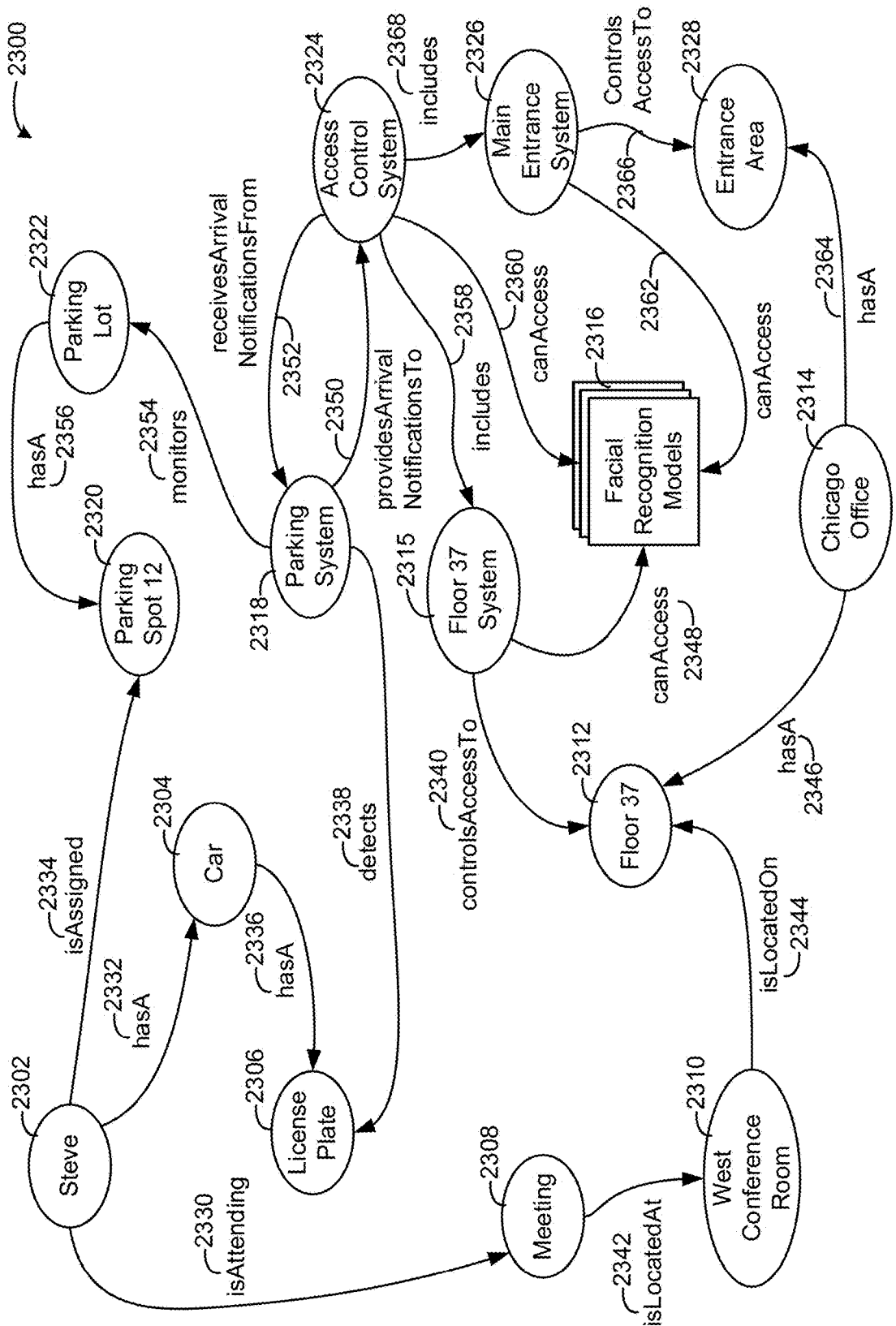
FIG. 23 is a block diagram of an identity graph where user contextual data, parking contextual data, and security system contextual data is integrated, according to an exemplary embodiment.

Referring now to FIG. 23, an identity graph 2300 where user contextual data, parking contextual data, and security system contextual data is integrated is shown, according to an exemplary embodiment. In the identity graph 2300 of FIG. 23, the integration between multiple different systems is shown, e.g., the integration between parking systems and access control systems. Furthermore, the integration of meetings is shown where the access control systems and parking systems operate based on where a user is expected and/or authorized to be, i.e., what meetings the user will be attending.

The identity graph 2300 includes a Steve node 2302 representing a user Steve. Furthermore, a particular meeting, represented by a meeting node 2308, is a meeting that Steve 2302 is scheduled to attend, represented by the "isAttending" edge 2330 between the Steve node 2302 and the meeting node 2308. The meeting 2308 is located in a west conference room 2310 on a floor 37, represented by the "isLocatedAt" edge 2342 between the meeting node 2308 and a west conference room node 2310 and an "isLocatedOn" edge 2344 between the west conference room node 2310 and the floor 37 node 2312. Both the floor 37 and an entrance area are part of a Chicago office 2314, indicated by a "hasA" edge 2346 between a Chicago office node 2314 and the floor 37 node 2312 and a "hasA" edge 2364 between the Chicago office node 2314 and an entrance area node 2328. The floor 37 system 2312 "controlsAccessTo" edge 2340 floor 37.

Furthermore, Steve 2302 "hasA" edge 2332 car 2304 with a particular license plate 2306. This is indicated by a "hasA" edge 2336 between the Steve node 2302 and a car node 2304 and a "hasA" edge 2366 between the car node 2304 and a license plate node 2306. Furthermore, Steve 2302 is associated a particular parking spot 12 for his car 2304. This is indicated by the "isAssigned" edge 2334 between the Steve node 2302 and a parking spot 12 node 2320. The parking spot 12 is a particular parking spot of a parking lot 2322, indicated by a "hasA" edge 2356 between a parking lot node 2322 and the parking spot 12 node 2320.

A parking system 2318 is configured to monitor and detect cars entering and/or exiting the parking lot 2322. A parking system node 2318 represents the parking system and its operations are represented by a "monitors" edge 2354 between the parking system node 2318 and the parking lot node 2322 and a "detects" edge 2338 between the parking system node 2318 and a license plate node 2306. Furthermore, the parking system node 2318 and an access control system 2324 of the Chicago system are integrated, indicated by a "receivesArrivalNotificationsFrom" edge 2352 between the access control system node 2324 and the parking system node 2318 and a "providesArrivalNotificationsTo" edge 2350 between the parking system 2318 an access control system node 2324. The access control system 2324 "includes" 2368 a main entrance system 2326.

The access control system 2324 and the parking system 2318 can communicate with each other, such that, when the car of Steve 2302 is detected by the parking system 2318, a notification can be pushed to the access control system 2324. The access control system 2324 may perform facial recognition to provide Steve 2302 with access to areas of the Chicago office 2314. The access control system 2324 can, based on the notification received from the parking system 2318, perform actions such as loading facial recognition models 2316 specific for Steve 2302 before Steve 2302 is detected by the access control system 2324. This allows the access control system 2324 to quickly process an image of Steve 2302 to provide Steve 2302 with access to the Chicago office 2314.

The access control system 2324 can access facial recognition models 2316 stored in a database, e.g., either within the identity graph 2300 or in a separate database. This is represented by the "canAccess" edge 2360 between the access control system node 2324 and the facial recognition models node 2316. Both the main entrance system 2326 and the floor 37 system 2315 can receive the facial recognition models 2316, particularly the facial recognition models for Steve 2302 when Steve 2302 is detected. This is represented by the "canAccess" edges 2362 between the main entrance system node 2326 and the facial recognition models 2316 and the "canAccess" edge 2348 between the floor 37 system node 2315 and the facial recognition models 2316.

Figure 24:
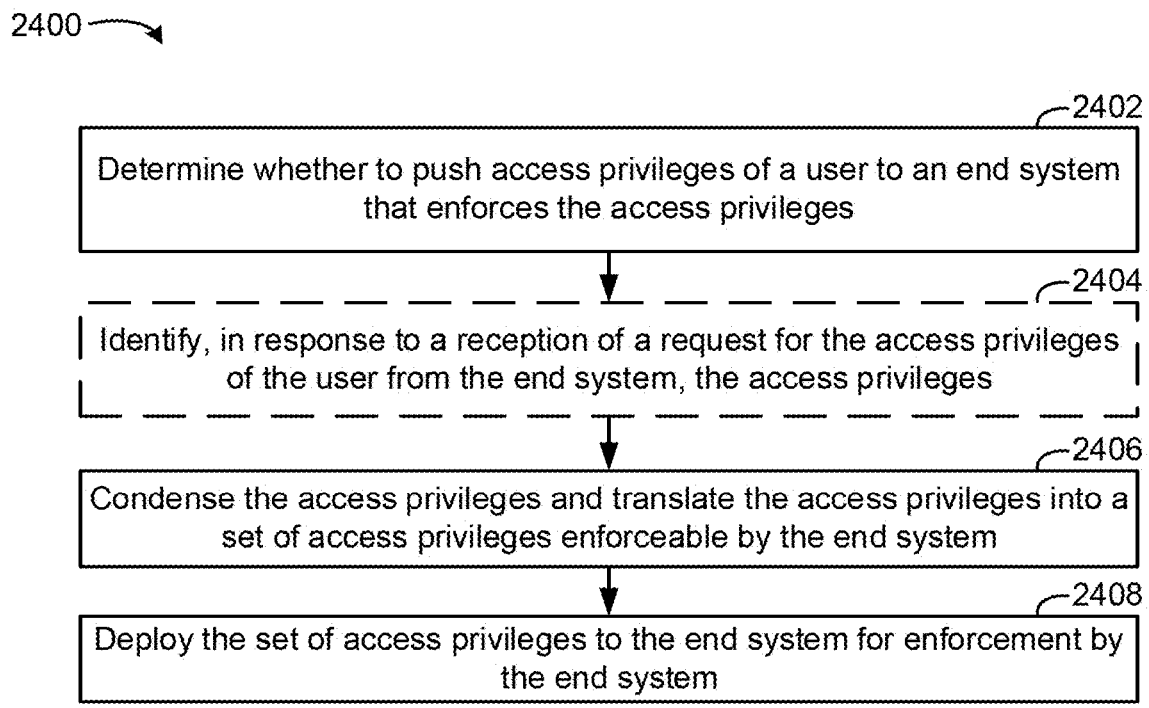
FIG. 24 is a flow chart of a process of deploying access credentials to an end system based on an identity graph, according to an exemplary embodiment.

Referring now to FIG. 24, a flow chart of a process 2400 of deploying access credentials to an end system (e.g., the physical security systems 1108, the software application platforms 1110, and the private information platform 1112) based on an identity graph is shown, according to an exemplary embodiment. The process of FIG. 24 can be performed by any of the computing devices or systems as described herein. For example, the process 2400 of FIG. 24 can be performed by the identity management service 1120.

In step 2402, the identity management service 1120 determines whether to push access privileges of a user to an end system that enforces the access privileges. The identity management service 1120 can, via an identity graph, e.g., the identity graphs described with reference to FIGS. 11-23, determine that access privileges have changed based on the contextual data of the identity graph, i.e., the nodes and/or edges of the identity graph. In step 2404, instead of, or in addition to the determination to push access privileges in the step 2402, the identity management service 1120 can receive a request for the access privileges of the user from the end system and identify, via the identity graph, the access privileges of the user.

With the access privileges of the user, in step 2406, the identity management service 1120 can condense the access privileges and translate the access privileges into a set of access privileges enforceable by the end system. This may include translating the access privileges of the identity graph into access privileges in a format for the end system, e.g., a ruleset, an access table, etc. In step 2408, the identity management service 1120 can deploy the set of access privileges to the end system for enforcement by the end system.

Figure 25:
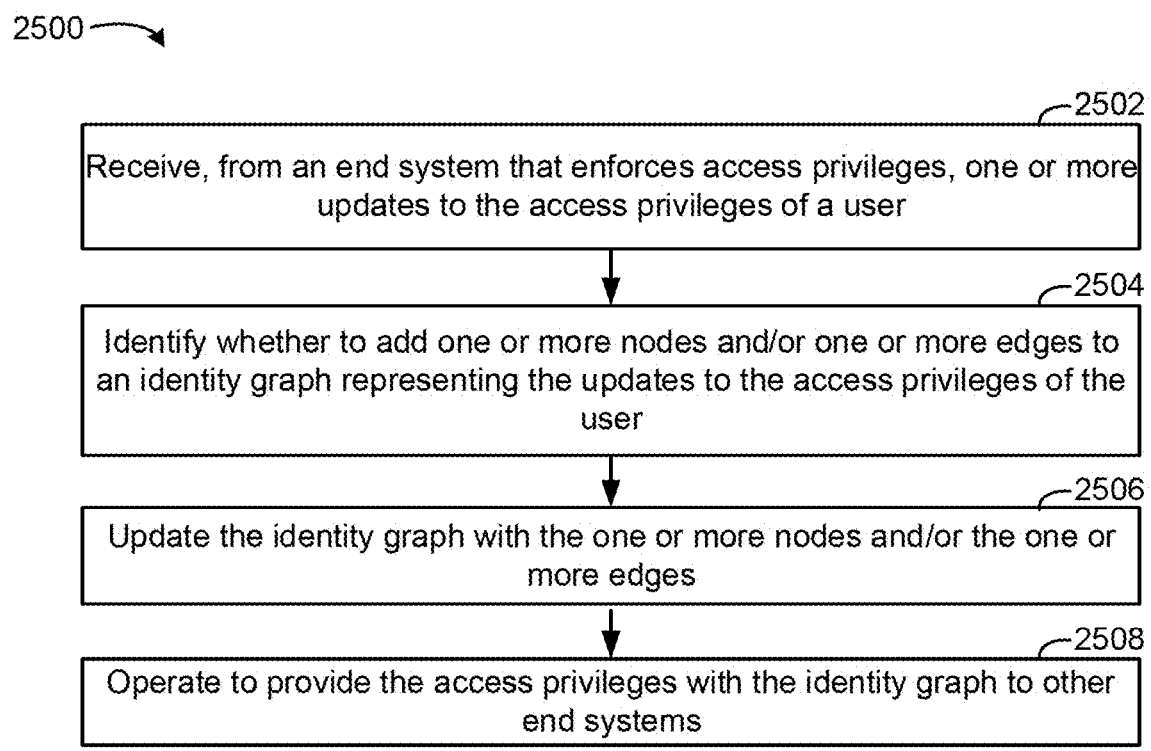
FIG. 25 is a flow chart of a process of updating an identity graph based on updates received from an end system, according to an exemplary embodiment.

Referring now to FIG. 25 is a flow chart of a process 2500 of updating an identity graph based on updates received from an end system, according to an exemplary embodiment. The process of FIG. 25 can be performed by any of the computing devices or systems as described herein. For example, the process of FIG. 25 can be performed by the identity management service 1120.

In step 2502, the identity management service 1120 can receive, from an end system (e.g., one of the physical security systems 1108, the software application platforms 1110, and the private information platform 1112) that enforces the access privileges, one or more updates to access privileges of a user. In step 2504, the identity management service 1120 can identify whether to add one or more nodes and/or one or more edges to an identity graph (e.g., one of the identity graphs described with reference to FIGS. 11-24). The one or more nodes and/or one or more edges represent the updates to the access privileges of the user. In step 2506, with the one or more nodes and/or one or more edges, the identity management service 1120 can update the identity graph. In step 2508, the identity management service 1120 can operate to provide the access privileges with the identity graph to other end systems. For example, the identity management service 1120 could push the access privileges to another end system, i.e., the updates of one end system can be pushed to another end system through the access privilege tracking of the identity graph.

Figure 26:
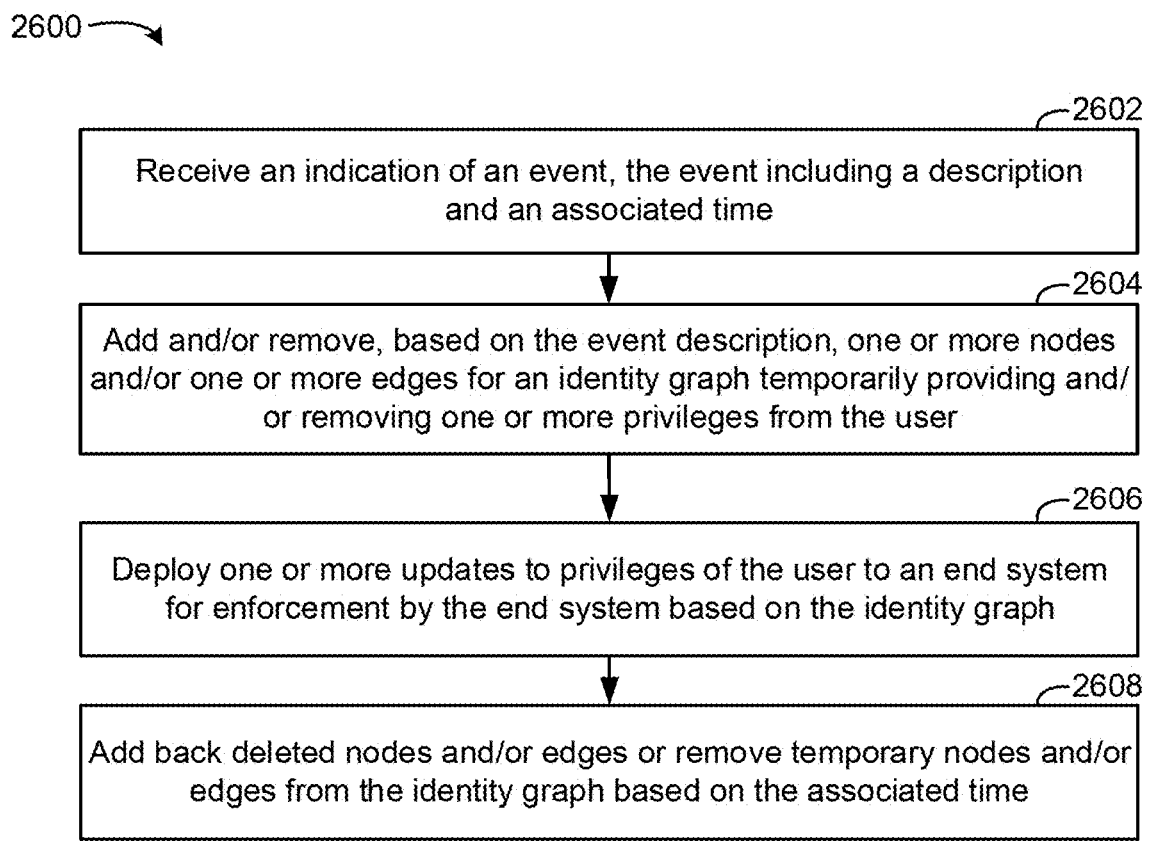
FIG. 26 is a flow chart of a process updating an identity graph with an event, according to an exemplary embodiment.

Referring now to FIG. 26, a flow chart of a process 2600 updating an identity graph with an event, according to an exemplary embodiment. The process 2600 of FIG. 26 can be performed by any of the computing devices or systems as described herein. For example, the process 2600 of FIG. 26 can be performed by the identity management service 1120.

In step 2602, the identity management service 1120 can receive an indication of an event, the event including a description and an associated time (e.g., received from one of the physical security systems 1108, the software application platforms 1110, and/or the private information platform 1112). The description may be an identifier of the event, e.g., meeting, fire, security breach, etc. The associated time may be a time at which the event occurs, has occurred, and/or is active (e.g., a time range). In step 2604, the identity management service 1120 can add and/or remove, based on the event description, one or more nodes and/or one or more edges of an identity graph (e.g., one of the identity graphs described with reference to FIGS. 11-25) temporarily providing or removing one or more privileges from the user.

In step 2606, based on updates to the access privileges, the identity management service 1120 can deploy one or more updates to privileges of the user to an end system that enforces the privileges. The updates can be deployed according to the nodes and/or edges added or removed from the identity graph. In step 2608, at the associated time of the event, the identity management service 1120 can add back deleted nodes and/or edges, reinstating privileges revoked by removing the nodes and/or edges in the second step. Furthermore, the identity management service 1120 remove temporary nodes and/or edges revoking temporary privileges created in the second step by adding the one or more nodes and/or edges.

Figure 27:
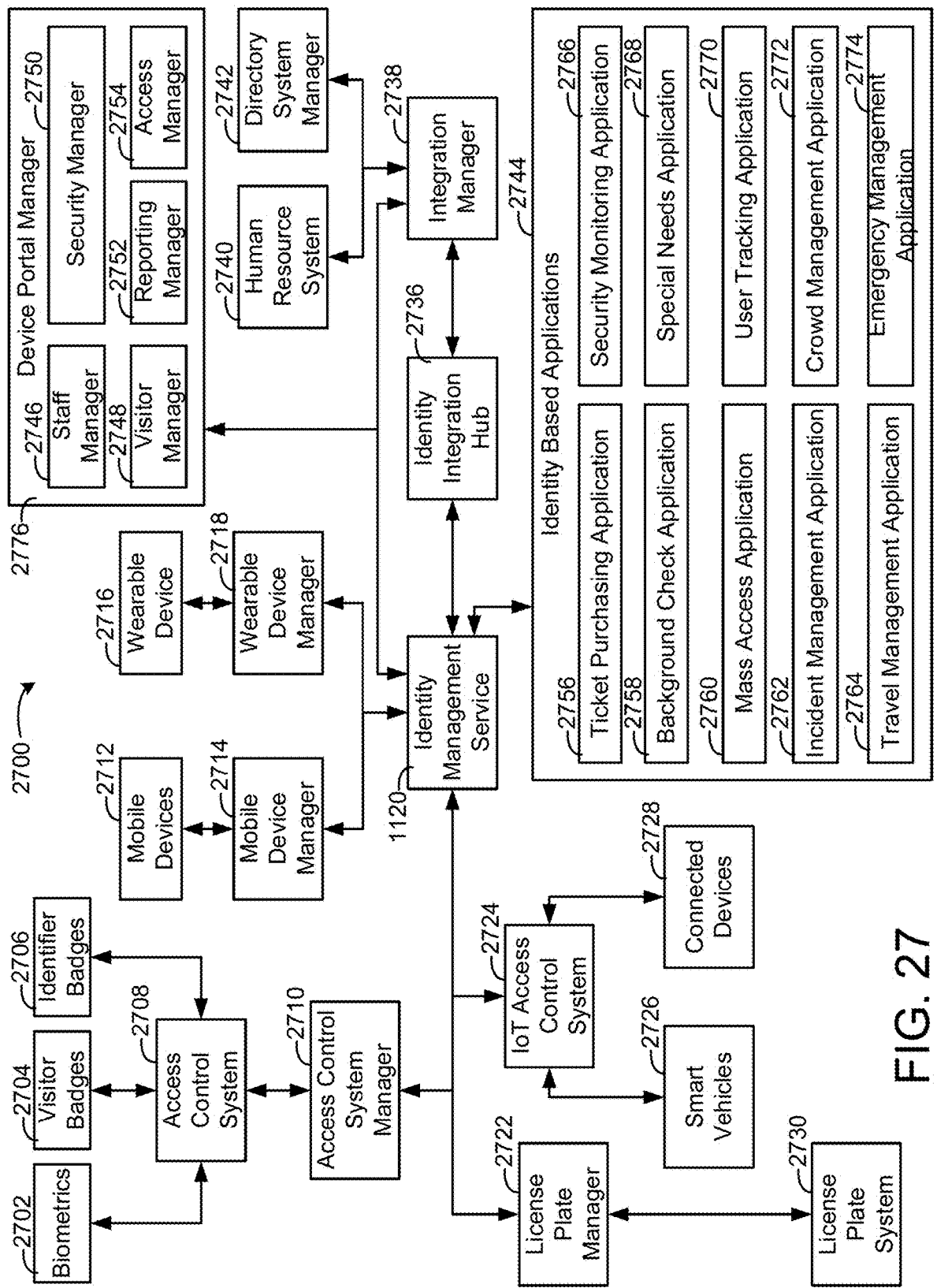
FIG. 27 is a block diagram of a system including the identity management service of FIG. 11 interconnected with physical security systems, according to an exemplary embodiment.

Referring now to FIG. 27, a block diagram of a system 2700 including the identity management service 1120 of FIG. 11 interconnected with physical security systems is shown, according to an exemplary embodiment. An identity graph service can provide a unified identity provisioning and management experience though a single API that hides heterogeneities of underlying physical access control systems, information technology (IT) systems, and identity management systems.

The system of FIG. 27 includes an access control system 2708 and an access control system manager 2710. The access control system 2708 can receive biometrics 2702, visitor badges 2704, and identifier badges 2706. The access control system 2708 can be a physical access control system (PACS) such as Lenel and/or C-Cure. The access control system 2708 can have integration with various biometric readers and Federal Information Processing Standard (FIPS) card readers. Furthermore, the access control system 2708 can be integrated with (or separate from) a license plate manager 2722 and/or a license plate system 2730. Lenel and/or C-Cure can be integrated with license plate recognition. In some cases, PACS uses SQL servers and/or provides a software development kit (SDK) for 3rd party integration.

The access control system manager 2710 may be an on-premises physical access control management system. In some embodiments, the physical access control management system is a legacy system. In some embodiments, the access control system manager is Prowatch or an Automatic number-plate recognition (ANPR). In some embodiments, authentication readers are integrated into and/or connected with the access control system manager 2710. The readers can include smart card readers, barcode readers, fingerprint readers, facial recognition cameras, etc. In some embodiments, user enrollment in the services of the identity management service 1120 can be triggered through biometric signature readers managed by the access control system manager.

The system further includes an IoT access control system 2724 that connects with IoT devices and/or systems such as smart vehicles 2726 or connected devices 2728 (e.g., smart watches). The IoT access control system 2724 can facilitate discovery and association of mobile and IT device to a security principal (i.e., a person). The IoT access control system 2724 can utilize integration of IT asset management systems such as Microsoft Intune. Therefore, when a new device is registered and association is found from the device management system, then the identity management service 1120 can update the identity graph. Furthermore, this functionality can be performed by the identity integration hub 2736 and/or the integration manager 2738, in some embodiments. The identity integration hub 2736 can discover and associate a principal with an IoT device (e.g., ownership, rental, etc.). The integration manager 2738 can integrate with a human resource system 2740 and/or a directory system manager 2742. The integration manager 2738 can facilitate unified operation for initiating HR changes and/or initiating access role changes.

The integration manager 2738 can be a Microsoft Identity Manager. The integration manager can be a IT user identity management system that can connect to directories such as an Active Directory, HR systems, ERP systems, email systems, etc. The integration manager 2738 can synchronize identities based on rules, for example, the rules may be to always synchronize users, to periodically synchronize groups, etc. The rules may also pertain to the synchronization of roles, permissions, and/or computer devices of users. The integration manager can be configured to provision and de-provision, enable and disable, move, and synchronize all types of attributes including passwords. Credentials such as passwords can be synchronized differently than other attributes. For example, credentials can be being propagated in real time while regular attributes are synchronized on a schedule. The integration manager 2738 can operate as a master user management policy manager that can synchronize all IT system related identities.

The identity integration hub 2736 can be a service installed on a cloud, in a server on-premises, and/or distributed across both off-premises and on-premises systems. The identity integration hub 2736 can perform identity synchronization between the identity graph of the identity management service 1120 and the integration manager 2738. Furthermore, the identity integration hub 2736 can perform access policy synchronization between the identity graph of the identity management service 1120 and the integration manager 2738.

Furthermore, the system of FIG. 27 can perform integration with mobile device manager 2714 and/or wearable device manager 2718 that connect with mobile devices 2712 and/or wearable devices 2716. The system 2700 of FIG. 27 can also facilitate cloud to cloud integration or other data source integration to obtain mobile/wearable device. In some embodiments, the system 2700 of FIG. 27 can implement integration with Azure Active Directory to synchronize users and/or roles.

The identity management service 1120 can, through the wearable device manager 2718, establish an association between a mobile device or a wearable device to a user. The identity management service 1120 may use device information of wearable devices that are often provisioned outside of a physical access control system. Therefore, there may be a separate integration between the identity management service 1120 and the wearable device manager 2718. The wearable device manager 2718 may be a software service such as Intune. With the integration between the identity management service 1120 and the wearable device manager 2718, the identity management service 1120 can facilitate multi-factor authentication. Similarly, the IoT access control system 2724 can be configured to provide a way to associate a user, a connected device (e.g., a smart watch), and/or a car. The IoT access control system 2724 can be Azure IoT Hub.

The system 2700 of FIG. 27 can further include a device portal manager 2776. The portal manager 2776 can provide a portal for staff 2746, security managers 2750, visitors 2748, etc. The device portal manager 2776 can further include a reporting manager 2752 and an access manager 2754. The identity management service 1120 can also integrate with identity based applications 2744. The identity based applications 2744 can utilize the identity management of the identity management service 1120 for providing or denying access to a user or entity. The applications can include a ticket purchasing application 2756, a security monitoring application 2766, a background check application 2758, a special needs application 2768, a mass access application 2760, a user tracking application 2770, an incident management application 2762, a crowd management application 2772, a travel management application 2764, and/or an emergency management application 2774 (e.g., emergency response and/or notification management).

In some embodiments, the portal 2776 provides unified operation management and self-service capability for visitors, fans, employees, building staff, stadium staffs, etc. The portal 2776 can be a robust, fully automated solution that enables employees, contractors, outsourced vendors, visitors, etc. with proper login privileges to perform their own physical access changes and modifications from a single website. Security managers can deploy global and/or regional policies for self-service identity, card and access management across the enterprise using an automated web interface. The portal 2776 reduces security operational costs and eases daily administration burdens on security staff. The portal 2776 can ensure that once a request has been submitted or approved there is no manual intervention required and that changes are made based upon deployed policies.

The portal 2776 can provide default reporting services that provide useful reports covering operational and management information that a security department can use on a daily, weekly and/or monthly basis. The reports can be generated based on collected data for quarterly evaluations of security staff, to help plan future security budgets, determine resource requirements and more. The portal 2776 can enable all access management, access event and audit activity reports to be run from a common repository aggregated from all physical access control systems in a single process.

In some embodiments, the device portal manager 2776 can enable access management. For example, the device portal manager can cause access event and audit activity reports to be generated from a common repository aggregated from all physical access control systems in a single process. In some embodiments, the device portal manager 2776 generates the reports automatically and can be scheduled and distributed per system administrator rules. For example, business managers may get direct access to reporting portal based on their role and security privileges.

The identity management service 1120 can be an identity and/or related entity integration service that supports a single API for provisioning of user, zone, and/or device. The identity management service 1120 can facilitate master data management for identity related information such as associating a principle, devices, and/or other biometric signatures. The identity management service 1120 can be utilized for integration for identity related entity synchronization and/or integration between existing PACS and graph based services for synchronization of identities, unified operations for user provisioning, creating, deleting, disabling, updating, etc.

The identity management service 1120 can provide automation, cost and labour reduction, and increased operational efficiencies to physical access control management processes. The integration of existing and new smart technologies can allow disparate physical access control systems to be integrated into a single user interface with a common operating platform. This integration can streamline processes and allow for proper planning and deferment of capital expense improvements in the access control systems.

In some embodiments, the identity management service 1120 can be used for frictionless access at a building and/or stadium. The identity management service 1120 can be configured to link disparate physical security systems and information technology based identity management within a single policy framework ensuring reduced operational costs. The identity management service 1120 can achieve increased operational efficiency by reducing cycle time for physical access management and optimize the process. The identity management service 1120 can allow an operator to control what users have access to, when the users have the access, and the rules or payments associated with the user accessing or using the facilities. The identity management service 1120 can remove administrator burdens of managing identities, rights, and/or privileges in multiple disparate systems.

Furthermore, the identity management service 1120 can decrease compliance risks associated with manual processes. The identity management service 1120 can improve management of blacklists and patron alarms. Furthermore, the identity management service 1120 can eliminate possible human errors due to duplicate identity entries. The identity management service 1120 can identify a person based on any unique identifier regardless of the identity system that detects the person. Because the identity management service 1120 stores a repository of information on each user, regardless of the identifier used to authenticate, the security systems can operate with complete information about each person. The identity management service 1120 can integrate with external alarm and/or event management that generate identity alarms and/or transactions.

The identity management service 1120 can perform multiple credential management. In particular, the identity management service 1120 can be configured to associate any unique identifier to a person. The identity management service 1120 can utilize the identifier as a credential and supporting association of unlimited credentials to a person. The identity management service 1120 can be configured to synchronizes identities, credentials, and/or permissions across subsystems, e.g., multiple different security systems. The identity management service 1120 can be configured to support credentials such as RFID, access cards, biometrics, license plates, mobile devices, MAC addresses, etc. The identity management service 1120 can be configured to recognize identity one or more channels including readers, analytics, Wi-Fi, beacons, mobile applications, etc.

The identity management service 1120 can be configured to perform unified access policy management. The identity management service 1120 can support role and/or zone based access control via a single identity and policy management. The identity management service 1120 can operate as single point of credential issuance for an entire population. The identity management service 1120 can automatically assign access rights, schedules, privileges, etc. based on role and/or group membership. The identity management service 1120 can be configured to perform batch processing of identities in bulk. In some embodiments, the identity management service 1120 can be configured to handle distributed decision making in access control systems while providing emergency door access control policy.

The identity management service 1120 can be configured to provide an integration interface (e.g., an API) with other systems. For example, the integration interface can interface the identity management service 1120 with HR systems, a ticket purchase database, PACS, integrated venue safety and security monitoring, incident management services, external smart security screening services, personnel tracking, special needs services, ticket enablement, mass access service, a vehicle access control, and crowd management.

The identity management service 1120 can include integration connectors. The integration connectors can be on-premises connectors that run software that knows determines to connect the legacy physical access control system such as Honeywell Prowatch or Software House C-Cure and performs credential management operations such as create, delete, disable, update of users and roles. In addition to the user management, the integration connector can perform security zone and/or door management. When deployed, the connector can be configured to discover all users from the existing access control system and publish to identity graph service to enable identity and credential association in the future. The connector can perform a change capture process from the source system and notify the source data changes to update the identity graph. The connector may require a cloud connection to exchange user credential management information. Connector can be configured to perform synchronization of users, roles, zones and/or schedules between the identity graph of the identity management service 1120 and existing PACS. A connector can be installed in a customer provided computing system. For example, a customer could utilize an X-86 windows server based machine within a customer network in a fully virtualized and/or containerized manner.

The identity graph of the identity management service 1120 can be deployed with an API to operate as a data ecosystem for the consolidation, correlation, and/or management of identities used across the different subsystems of an enterprise. The identity management service 1120 can combine a powerful and flexible graph data storage system, a set of workflow tools and processes, and integration connectors that bridge the identity graph into and out of multiple subsystems. These subsystems may be physical access card and biometric systems, HR systems, IT directory systems, partner integrations such as transit services, etc. The identity graph can make it possible to seamlessly connect technology and processes in support of people, i.e., to keep people safe and protected, to keep people efficient, and to keep people happy. The identity management service 1120 can, in some embodiments, utilize an IoT hub to ensure delivery of messages between the identity management service 1120 and end subsystems.

The identity management service 1120 can act as a master directory for many users, including employees and potentially volunteers. Operations involving these users can be facilitated through the identity integration hub and/or the integration manager. The operations can be performed directly or indirectly through synchronization between the integration manager and the human resource system, in some embodiments. The identity integration hub can be configured to manage the further perform bidirectional synchronization between the integration manager and the identity graph of the identity management service 1120.

The identity integration hub can utilize a generic SQL connector from the integration manager to provide a delta change service from new identities that do not correspond to any existing user in the integration manager but that should be created in integration manager, e.g. a user created out of band in a PACS service directly and not through the normal HR processes. If the decision is ultimately made to import ticket users into the integration manager, the identity integration hub can be configured to provide a feed of users to integration manager from the ticketing APIs.

The SQL connector of the integration manager can be used to push newly created users from the integration manager into the identity graph of the identity management service 1120. The integration manager SQL connector can export the users into an staging database and a change capture system pulls the new users into the identity graph for unification, matching, and/or ultimately into downstream physical access control systems. The integration manager SQL connector can also be used for signaling that a user has been de-provisioned, and the identity integration hub detects the removal of a user and starts and required downstream de-provisioning from the physical access control systems.

The identity integration hub provides an API with the status of any ongoing synchronization workflows. The identity integration hub can be configured to track the progress of exports from the integration manager and how those new elements/identities are progressing through the full identity graph workflows. The exports can be tracked as the exports go through a data matching and cleaning process to be linked to any existing users. The identity integration hub can further track how the identities are being used to provision access in downstream PACS. The API can be used for dash boarding and alerting as to the health of the system. If a particular workflow is taking longer than normal for a given number of identities or otherwise not meeting an SLA, administrators can be notified so that the problem investigated to resolve the issue and ensure that staff, volunteers, participants, and/or guests all have a positive experience without undue delay.

The identity management service 1120 can be configured to facilitate multiple credential management. One problem that the identity graph addresses includes collecting and coordinating the identifiers for people across a multitude of subsystems that collectively manage the people of an enterprise, organization, and/or space. As people join the organization and move throughout the space, each subsystem they interact with might use a different identifier for a person. The HR database identifies a person by their legal name and taxpayer identifier, IT identifies a user by their email address, the physical card reader knows the RFID tag identifier assigned to a user, a ride share system can identify a user by their phone number, etc. However, the same person needs to be represented and managed by each subsystem.

Some systems can utilize a point-to-point workflow between subsystems to facilitate multiple credential management. For example, a user can be created by an HR system and a workflow can be dispatched that creates an email account for the user in the IT system. Then a workflow is created to tell security to create a badge for a user. This approach can have multiple problems. For example, it may be complex to manage all of the workflows. Smaller organizations may do not automate the integrations and manually follow a standard operating procedure. Automating the workflows, however, is considerable work, and large enterprises have entire dedicated teams to develop and manage the workflows. Further drawbacks may be that the point-to-point update scheme makes the workflows susceptible to failures.

Furthermore, any non-standard use case is often difficult. For example, in too many enterprises, something as simple as creating a permanent security badge for a frequent visitor often requires some kind of "fake" employment ID in the HR system in order for the correct sequence of workflows to run to create all of the necessary identifiers to get to an issued security badge.

Because the workflows are complicated and susceptible to failure, multiple integrations are difficult. However, the identity management system can enable the ability to integrate multiple system with low or no manual input and with a low chance of failure. In some embodiments, the identity management system can implement a smart visitor experience, where any employee can arrange for a visitor to a building. In some embodiments, the employee can provide the identity management service 1120 with the name and phone number of the visitor, and a smart building AI agent of the identity management service 1120 can text with the visitor to acquire any information needed, such as license plate numbers, and the agent can automatically update the parking system to be prepared for the care of the visitor, and text the visitor a QR code image that can be scanned at a self-service kiosk in the lobby to create a badge that is pre-configured for the people tracking system and smart meeting rooms. When the visitor pulls into the parking space, the employee they are visiting is automatically notified.

Figure 28:
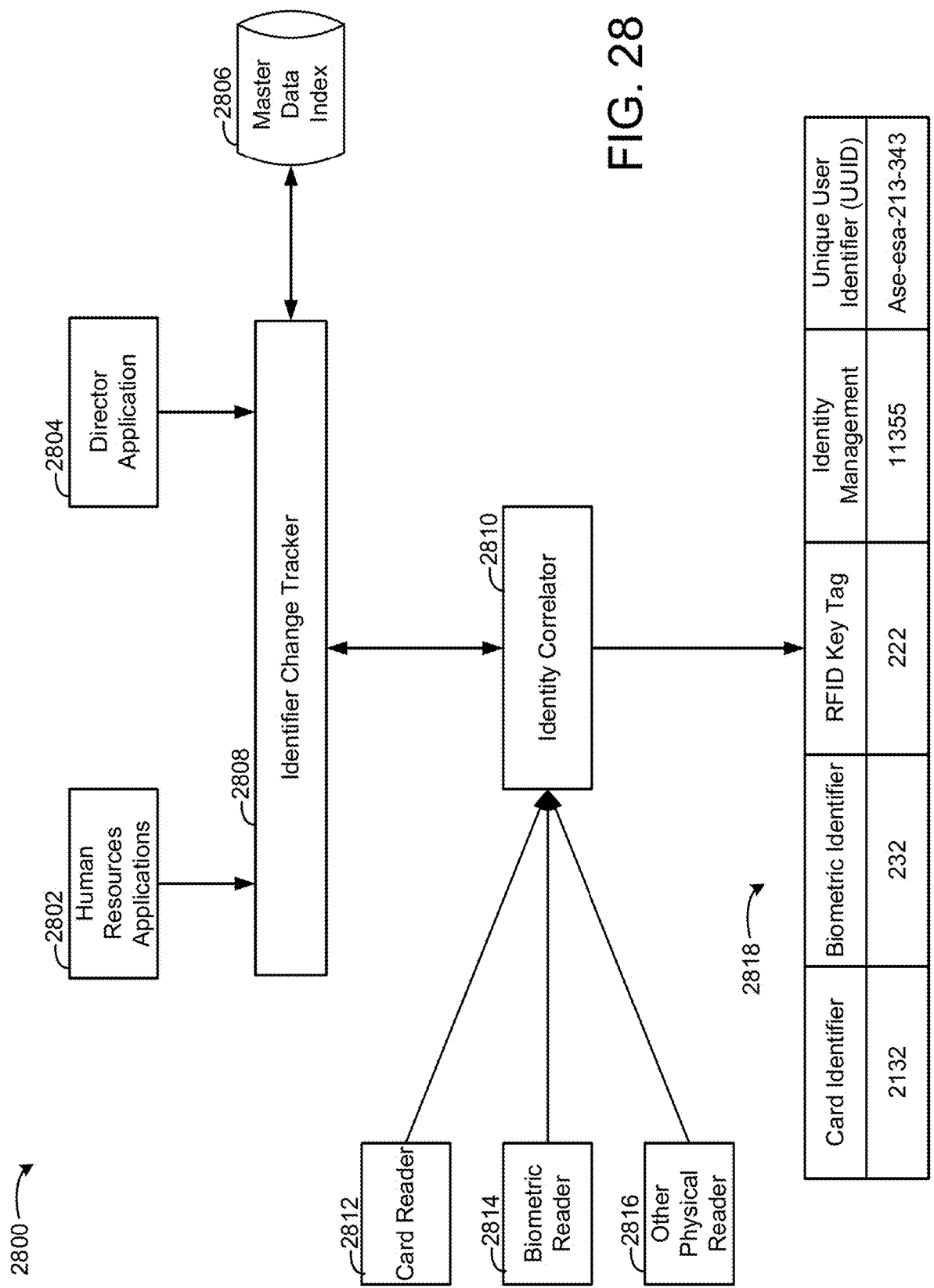
FIG. 28 is a block diagram of a system for tracking changes in credentials and correlating credentials, according to an exemplary embodiment.

Referring now to FIG. 28, a system 2800 for tracking changes in credentials and correlating credentials is shown, according to an exemplary embodiment. The system 2800 includes an identifier change tracker 2808 and an identity correlator 2810. The identifier change tracker 2808 and the identity correlator 2810 can be implemented by the identity management service 1120. The identifier change tracker 2808 can receive indications of changes to credentials of a user from a human resource application 2802, a director application 2804, and/or any other application. The identifier change tracker 2808 can maintain a master data index 2806 indicating all changes received by the identifier change tracker 2808.

A card reader 2812, biometric reader 2814, or other physical security reader 2816 can provide identifiers for the user that has undergone a change, e.g., received a new access card, has been newly registered from the system, etc. The identity correlator 2810 can aggregate the identifiers of the user and generate a table 2818 linking the identifiers to a unique user identifier of the user. The table 2818 can be used to updating an identity graph (e.g., one of the identity graphs described in FIGS. 11-27), in some embodiments.

Referring again generally to FIGS. 27-28, the identity management service 1120 can be configured to implement a unified access policy. The identity management service 1120 can be configured to integrate with systems such as Microsoft identity manager (MIM), leveraging the MIM ecosystem to coordinate identities between on-premises Active Directory, Azure Active Directory, the Microsoft Graph, Office 365, and many smart cards and other integrations. The identity management service 1120 can further bridge MIM into other smart building subsystems such as physical access control cards, video management systems, building management systems, and IoT enabled devices such as wearable bands.

Considering a common workflow such as new employee onboarding, a local HR system likely to have a workflow from the acceptance of an offer to the creation of a new employee ID. That workflow may very well trigger a workflow to MIM to provision new accounts in Active Directory and to synchronize that account to the cloud in Azure AD. The identity management service 1120 can monitor the state of those workflows and store the resulting identifiers in the identity graph and link them as two identifiers for the same person. In turn, the two identifiers can be used for an additional workflow that takes the appropriate identifier, uses the connectors of the identity management service 1120 to provision an account in the local card access control system, create a card, and store and link the resulting identifier.

If the local card access system also has some biometric requirements that can only be managed through the card access system, the workflow can track the state of the process, and wait until the new employee has visited a local security office to take a palm or fingerprint scan and then mark the workflow as complete once the card access system is satisfied. The identity graph can store very sensitive information that needs to be carefully protected. The identity graph can build on top of secure Azure services such as CosmosDB, which fully encrypts data at rest in the service. Additionally, the identity graph can be configured to utilize "smart" entity technology to create specialized views over top of existing data, for example, masking out Personally identifiable information (PII) data. In some cases, the "smart" entity views can be able to store and retrieve specific keys from customer-managed Azure Key Vaults, so customers can store data in identity graph with a zero-trust approach, with the data being completely inaccessible to everyone but the customer directly.

The identity graph can be configured to build on top of the Digital Vault, a data collaboration system for smart environments. Digital Vault is designed as an API layer for custom applications to have a unified view of an environment or smart space, and can be used for custom integrations. For example, consider an integration for a large sporting event. The ticketing application can sell tickets to the event, and link information about the ticket and how to verify the ticket holder into the identity graph (a phone number for an SMS code or an email address with a QR code, etc.). The ticket holder, before the event, can redeem their ticket at stations before the event and link the ticket to an RFID wrist-band. The RFID from the band can be stored into the identity graph, and pushed into an integration with the local transit authority so the band provides free transit rides the day of the event. The ticketing application can be developed completely independently of the transit integration, and the common identity graph can serve as the integration platform to keep development coordination efforts minimal and provide for faster development efforts.

Security and access control systems are critical, no-downtime-allowed systems. These systems must continue to operate even if upstream servers or the cloud is unavailable, and data generated from the devices must never be lost. Therefore, it can be important to maintain high availability on any storage system or process that makes decisions, and to ensure that in the event of failure, a new instance takes over quickly while maintaining all committed data.

Some physical access decisions are made locally by a local controller or panel. In order to keep latency low and minimize failure opportunities, access decisions at a door or a turnstile generally do not make many network requests, so even in the face of a network failure, the decisions will continue to be made with the last, best known data. The matching and cleaning services provided by MIM and the identity graph can be continually run and pushed as updates through the connectors and ultimately downloaded to the PACS, where they can be used for decisions even if the network is temporarily not available. The connectors themselves can be made highly available. In some cases, key care is placed to ensure that data stored by the PACS is not lost and a failure by a connector can be detected quickly and a new connector activated to replace the failed connector, while not losing any data processed by the failed connector.

For example, many PACS store their data in an underlying SQL database. To maintain high availability, this database can be mirrored to additional follower databases, in some embodiments, to multiple data centers, with strong consistency. The connectors process from these follower databases, ensuring that the connectors see all of the PACS data. The connectors store their own state in the same highly available database, and if a connector fails, its replacement is able to recover without data loss.

Many connectors themselves can be run in a highly available fashion, in some embodiments, containerized in a cluster management system such as Kubernetes. Kubernetes will monitor the health of the connector and the node running the connector, and if either should fail, Kubernetes can quickly detect the failure and cleanly start a replacement on a new node. Based on the transactional state management, the failed collector is quickly replaced with no data loss and minimal disruption to the data synchronization process.

In the event of a power failure and/or network error, in a PACS, each door and/or zone access decision are made by a local controller. Furthermore, each controller can have a list of identities that are valid and are downloaded at predetermined interval from a host access control management system. Hence, the identity management service 1120 performs cardholder/user download requests to each physical access control system once the identity graph service completes the identity synch among various identity providers. Once card holders are all downloaded into access control panel/controller, all decision are made at local device that has a battery to operate (e.g., 48 hours of battery operation).

The identity management service 1120 can include various connectors for connecting with other security systems. For example, the connectors can connect the identity management service 1120 with integrated venue safety systems, security monitoring and incident management services, smart security systems, screening services, personnel tracking, special needs services, ticket enablement, mass access services, vehicle access control, crowd management, etc. The security systems that the connectors connect with may include an integration API/protocol or other data access method for the connector to utilize. In some embodiments, the security system only allows a predefined number of queries within a predefined interval, the connector can be configured to operate according to the various query rules that the security system may have.

The identity management service 1120 can facilitate automatic provisioning for new hires of a building. The identity management service 1120 can receive hiring information from the human resource system and automatically provision the identity of the user, produces a credential for the user, and assign access control rights to the user (e.g., entitlement to a meal in a cafeteria, entitlement to transportation to and/or from work sites, etc.). The identity management service 1120 can further assign accommodation locations for the user and populate the identity of the user in any other required system (e.g., IT systems, email account systems, etc.). The identity management service 1120 can, in addition to onboarding, facilitate various workflows for visitors, contractors, etc.

The identity management service 1120 can facilitate "fan" provisioning. Fans may be users who attend a stadium or other venue for a sports game, a conference talk, a concert, etc. The identity management system can link tickets and/or fan credentials to an identity of the fan in the identity graph. This can automate assignment of privileges to venue resources (e.g., main turnstile) for a user and allow the identity management service 1120 to share the privileges with other systems. The identity management service 1120 can facilitate delivery of ticket purchase information, fan information ingestion into the identity graph, and/or monitoring, etc. The identity management service 1120 can run a correlation engine to associate a fan with tickets purchased by the fan. The identity management service 1120 can provide tools for editing and/or updating the record for fan and associated tickets. The identity management service 1120 can facilitate a rule based access control for providing fans with access to the venue and can provide a delivery API for checking the validity of a ticket.

Figure 29:
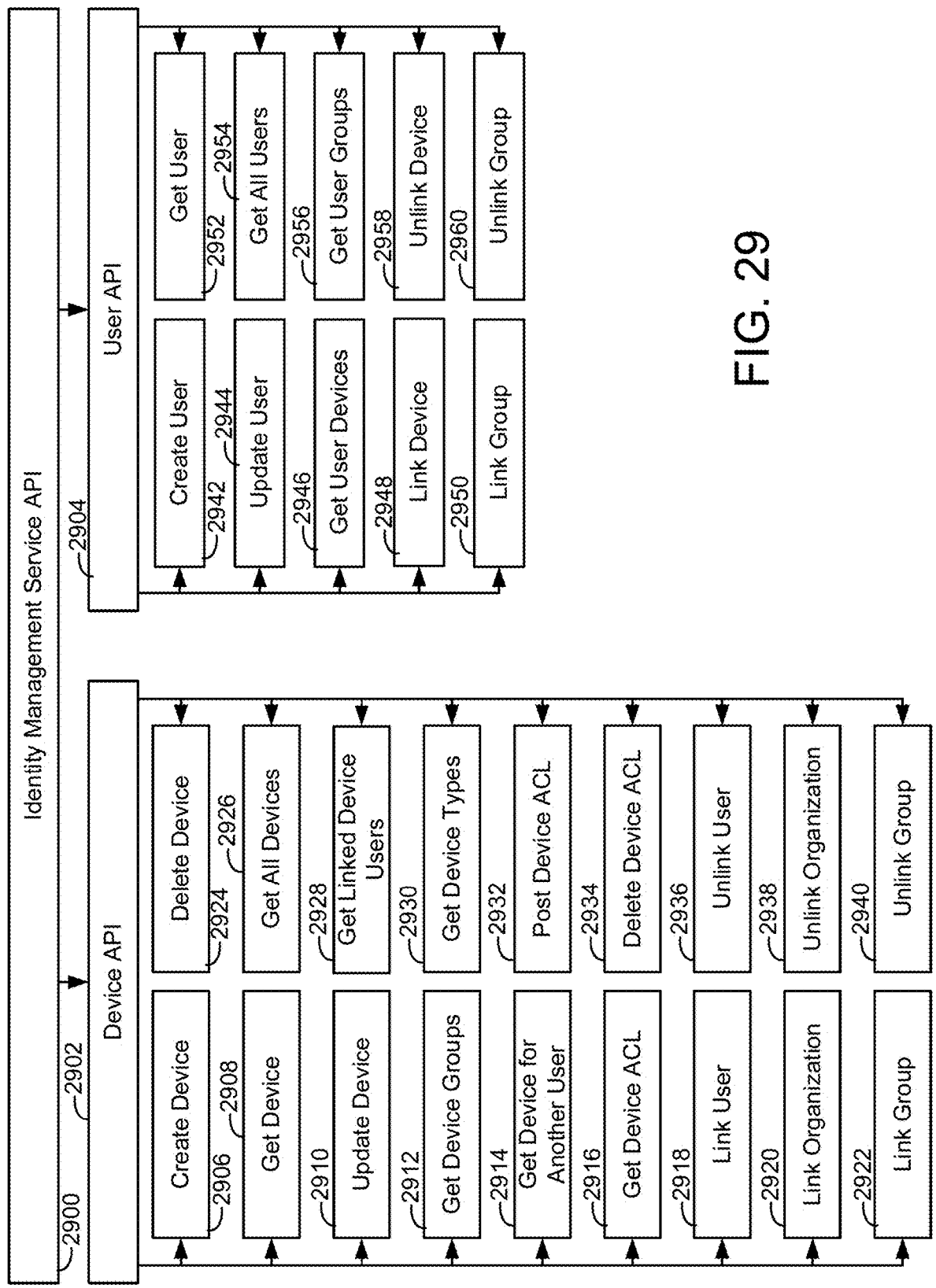
FIG. 29 is a block diagram of an application programming interface (API) for the identity management system of FIG. 11, according to an exemplary embodiment.

Referring now to FIG. 29, a block diagram of an application programming interface (API) 2900 for the identity management service 1120 of FIG. 11 is shown, according to an exemplary embodiment. The API 2900 can be implemented by the identity management service for accessing the identity graph (e.g., the identity graphs described with reference to FIGS. 11-29) and updating the identity graph. Systems and/or user devices can communicate with the identity management service 1120 through the API 2900. The API 2900 can be split into a device API 2902 for managing devices and a user API 2904 for managing users, user devices, and user groups.

The device API can include various create commands, delete commands, get commands, update commands, link commands, post commands and unlink commands. The commands can include a create device command 2906, a delete device command 2924, a get device command 2908, a get all devices command 2926, an update device command 2910, a get linked device users command 2928, a get device groups command 2912, a get device types command 2930, a get device for another user command 2914, a post device ACL command 2932, a get device ACL command 2916, a delete device ACL command 2934, a link user command 2918, an unlink user command 2936, a link organization command 2920, an unlink organization command 2938, a link group command 2922, and an unlink group command 2940.

The user API 2904 can include various create commands, get commands, update commands, link commands, and unlink commands. The user API 2904 includes a create user command 2942, a get user command 2952, an update user command 2944, a get all users command 2954, a get user devices command 2946, a get user groups command 2956, a link device command 2948, an unlink device command 2958, a link group command 2950, and an unlink group command 2960.

Figure 30:
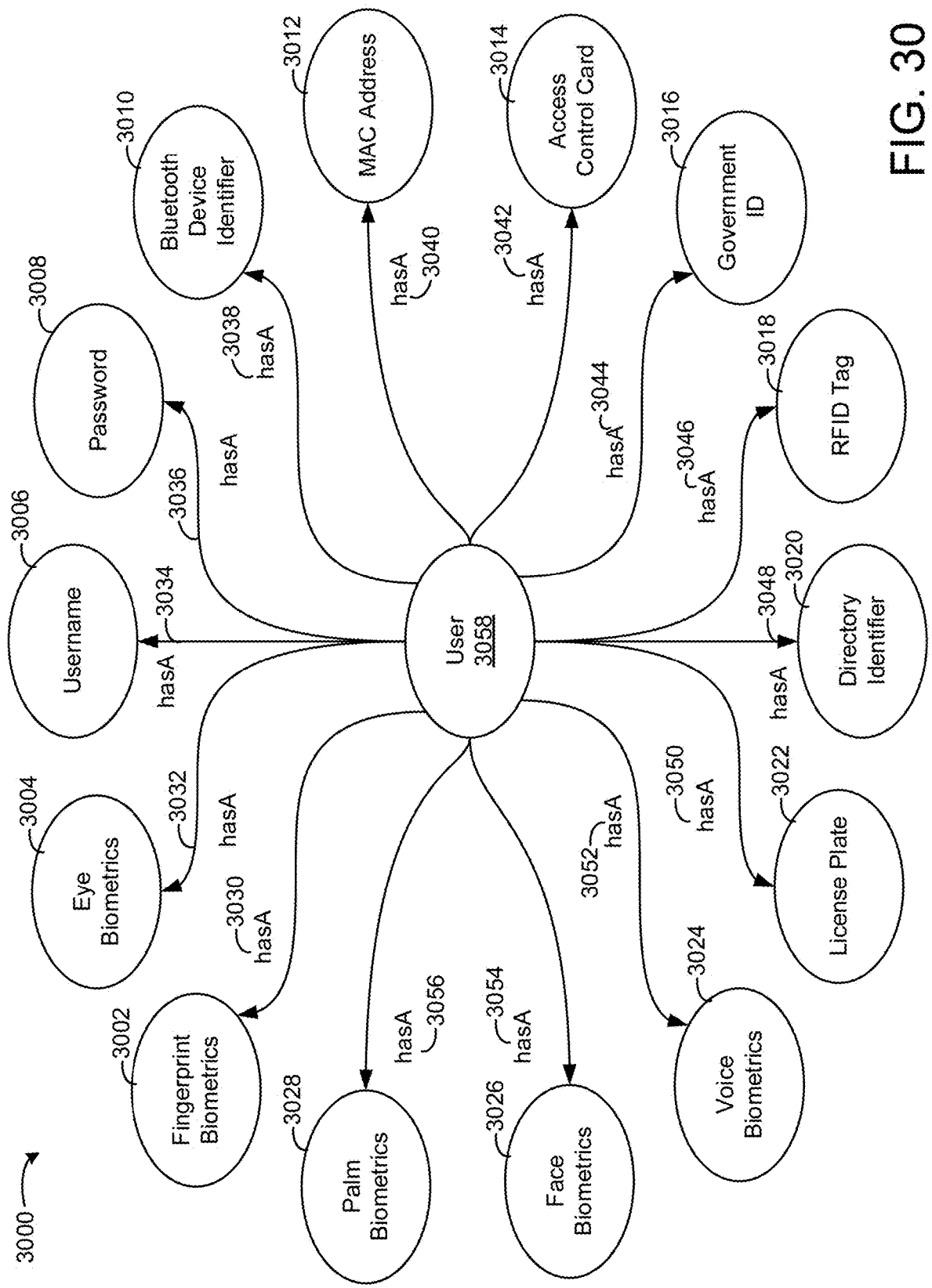
FIG. 30 is a block diagram of an identity graph where multiple biometrics of different end security systems are correlated for a user, according to an exemplary embodiment.

Referring now to FIG. 30, an identity graph 3000 where multiple biometrics of different end security systems are correlated for a user, according to an exemplary embodiment. The identity graph 3000 indicates a single user node 3050 and number other nodes, each related to the user node through the "hasA" edges 3030-3054. The other nodes include a fingerprint biometrics node 3002, an eye biometrics node 3004, a username node 3006, a password node 3008, a Bluetooth device identifier node 3010, a MAC address node 3012, an access control card node 3014, a government ID node 3016, an RFID tag node 3018, a directory identifier node 3020, a license plate node 3022, a voice biometrics node 3024, a face biometrics node 3026, and a palm biometrics node 3028. The identity graph 3000 can be a full knowledge graph to describe the relationship between a security principal and related identity attribute or a signature. The graph 3000 can be in the form of triples.

The identity graph 3000 of the identity management service 1120 can provide a single storage location where identifiers can be stored and/or linked to a storage location in an external secure storage. In an external secure storage, identifiers can be accessible through a tokenized data access API. The identity management service 1120 can issue multiple credentials to an entity via the identity graph 3000. Since the identity graph 3000 also may indicate the rights, privileges, and schedules of the entity, regardless of the credential used by the entity for identification, all the rights, privileges, and/or schedules can be implemented for the entity. In some embodiments, the identity management service 1120 integrates with an external accreditation system to verify status or privileges.

The identity graph 3000 can use a flexible schema that can store information regardless of the original source of the data. The identity management service 1120 can include connectors and integrations not only with IT systems but also with common building subsystems like security systems, video systems, and building management systems. The identity graph 3000 makes it easier to develop workflow processes because it provides a single place to store, clean transform and normalize, link and federate, and profile and analyze identifiers across subsystems. The identity graph 3000 provides audit and lifecycle management of data stored in the graph 3000. The identity graph 3000 can be used to create new workflows and/or can integrate with existing workflows.

Referring generally to FIGS. 31-40, interfaces 3100-4000 are shown for editing an identity graph (e.g., the identity graph described with reference to FIGS. 11-29). The interfaces 3100-4000 can be generated by the identity management service 1120 and/or the device portal manager 2776. The interfaces 3100-4000 can allow a user to view and/or edit the identity graph of the identity management service 1120. In some embodiments, the interfaces are displayed on a user device of a user, e.g., a cellphone, a laptop, a desktop computer, a console, a tablet and/or any other user device including a display (touchscreen, computer monitor, etc.) and/or an input device (e.g., touch screen, mouse, keyboard, etc.).

Figure 31:
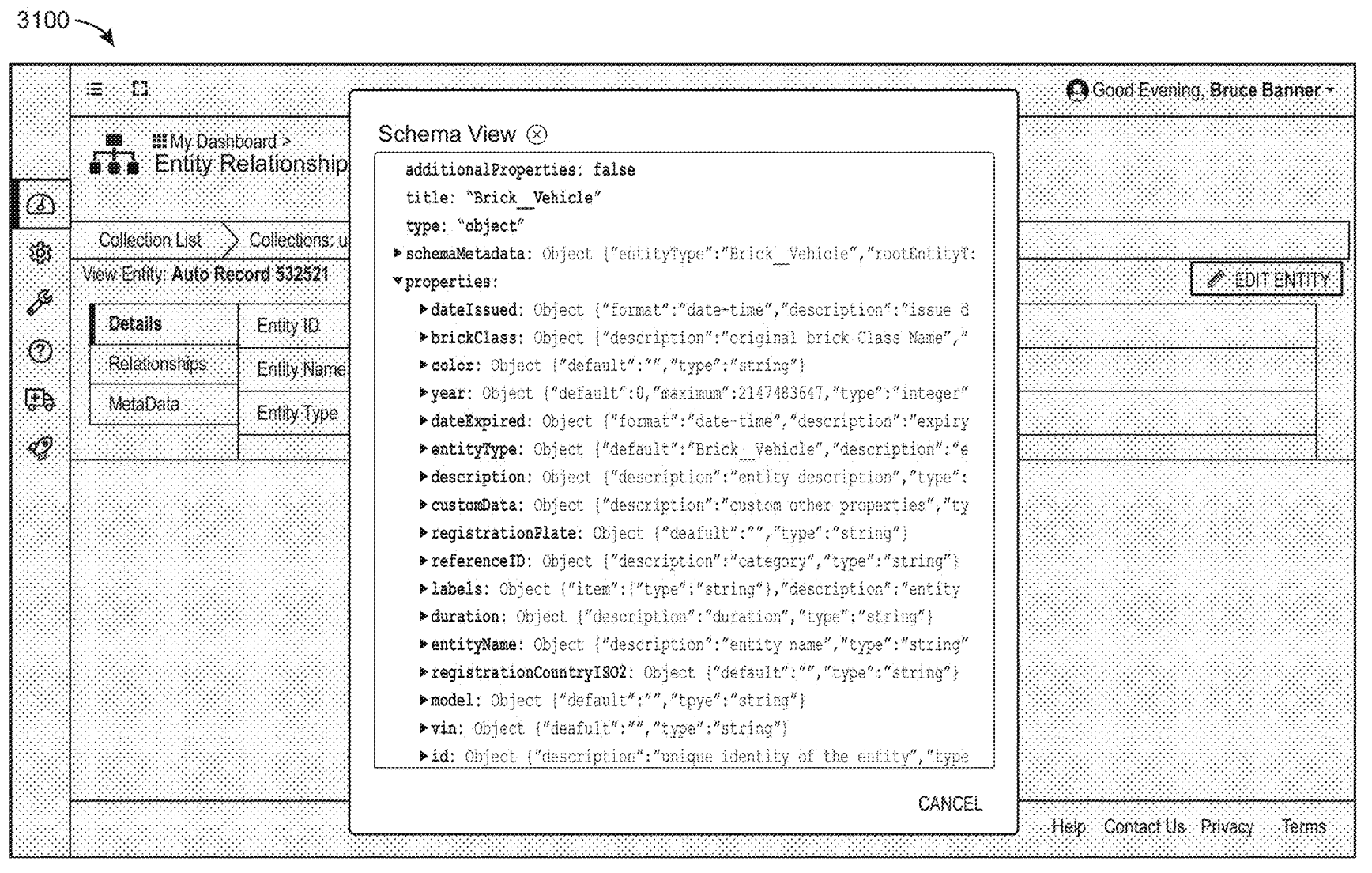

Referring now to FIG. 31, an interface 3100 illustrating a vehicle object for an identity graph and properties of the vehicle object is shown, according to an exemplary embodiment. The vehicle object can include a title and a type. Furthermore, properties such as date issued, Brick class, color year, date expired, entity type, description, custom data, registration plate, reference ID, labels, duration, entity name, registration country, model, VIN, and an ID can be viewed in the interface of FIG. 31.

Referring now to FIGS. 32-33, interfaces 3200-3300 including entity names and entity types of an entity graph are shown, according to an exemplary embodiment. The interfaces 3200-3300 of FIGS. 32-33 provide a list view of various entities by name. Furthermore, the interfaces 3200-3300 of FIGS. 32-33 provide an indication of an entity type for each entity. Buttons to view details, edit, or delete each entity are provided within the interfaces 3200-3300 of FIGS. 32-33.

Figure 34:
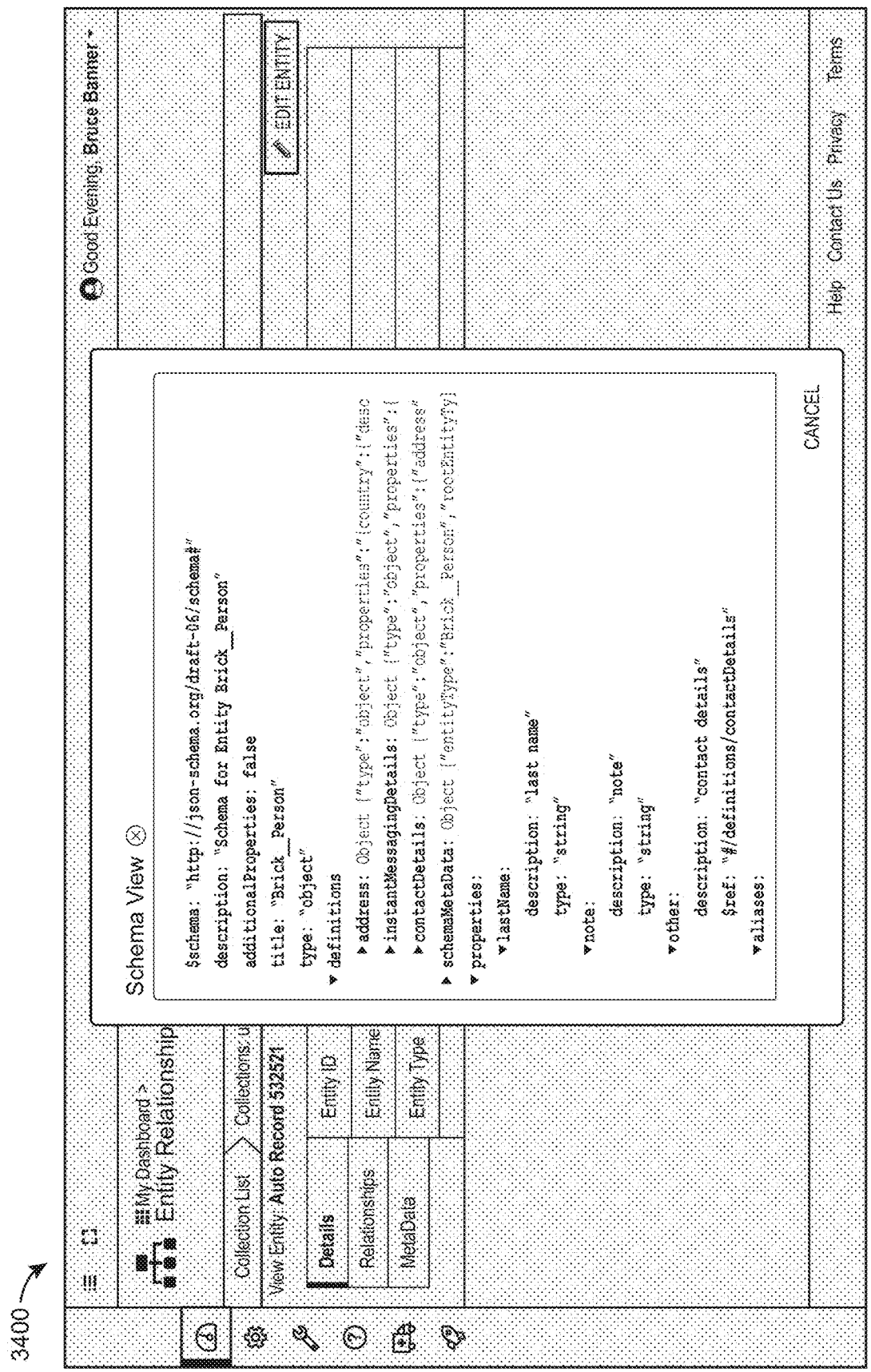
FIG. 34 is an interface illustrating a user object for an identity graph, according to an exemplary embodiment.

Referring now to FIG. 34, interface 3400 illustrating a user object for an identity graph and properties of the vehicle object are shown, according to an exemplary embodiment. The person object can include a title and a type. Furthermore, data for the person such as address, instant messaging details, contact details, last name, notes, other, and aliases can be shown in the interface 3400 of FIG. 34.

Figure 35:
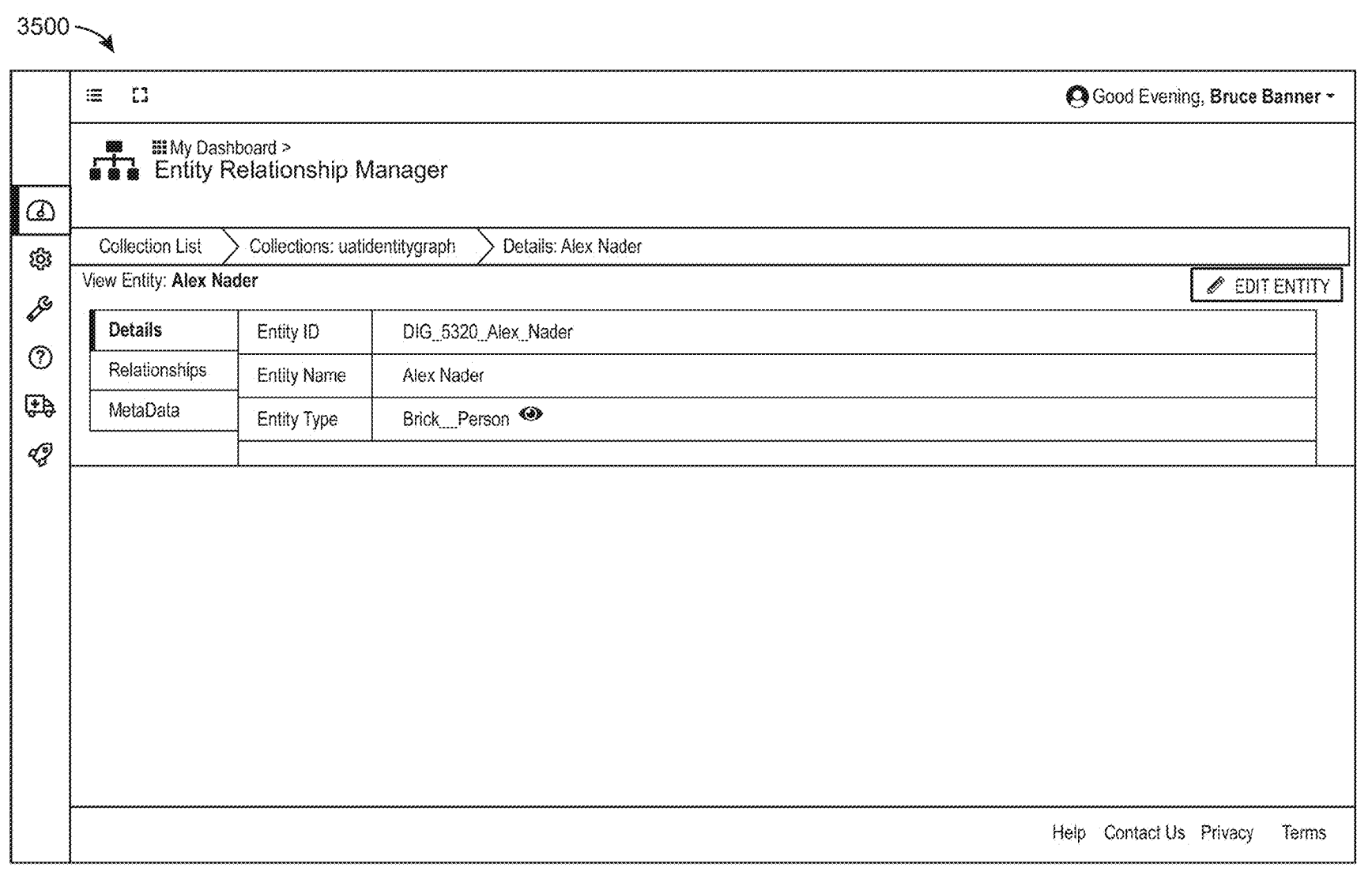

Referring now to FIG. 35, an interface 3500 illustrating a user object is shown, according to an exemplary embodiment. The interface 3500 indicates details, relationships, and metadata for the user object. Furthermore, an entity ID, an entity name, and an entity type for the user object are provided within the interface. The interface includes an edit entity button for editing the details, relationships, and/or metadata of the user object.

Figure 36:
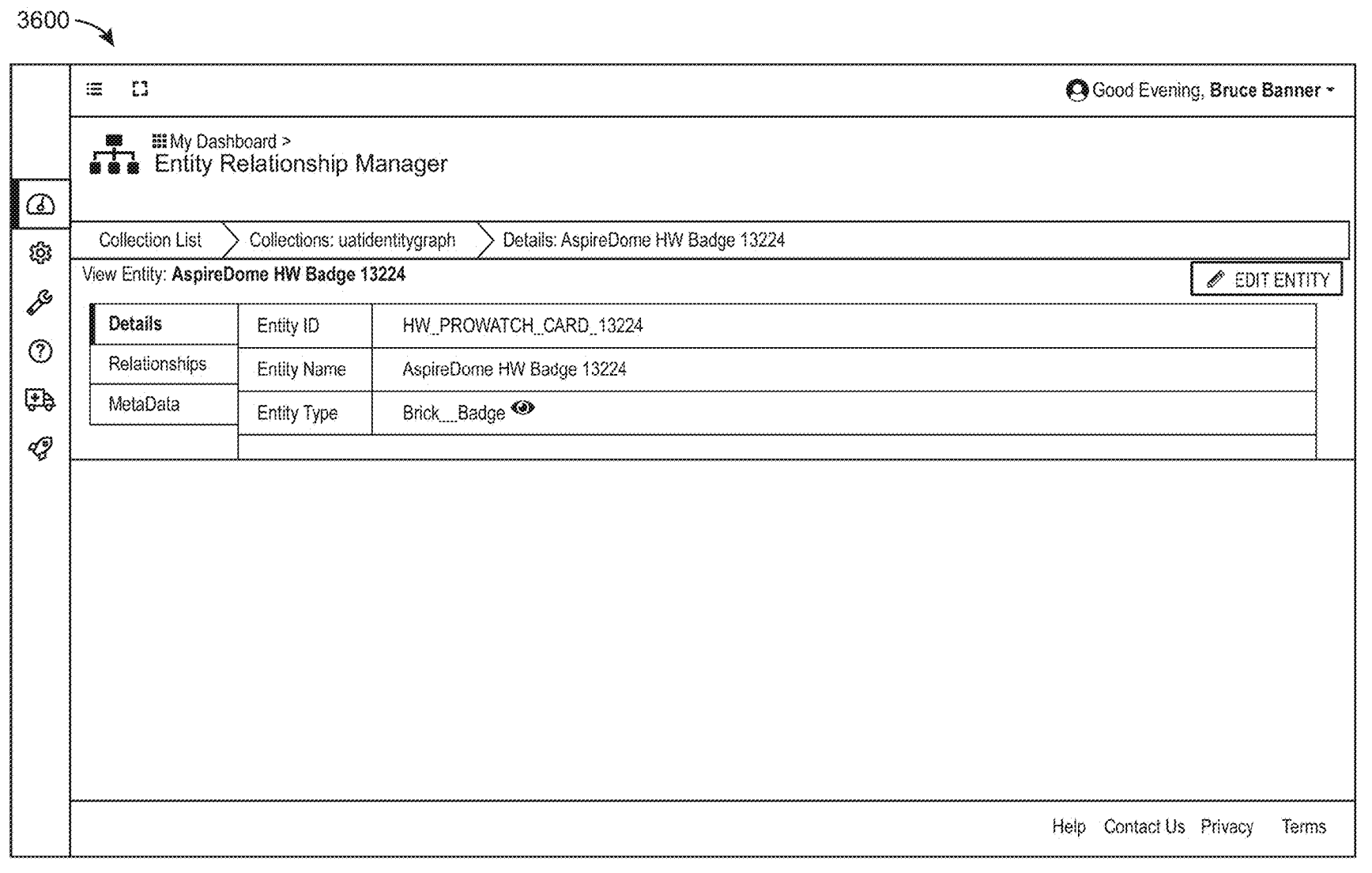

Referring now to FIG. 36, an interface 3600 illustrating a user badge is shown, according to an exemplary embodiment. The interface 3600 indicates details, relationships, and metadata for the user badge. Furthermore, an entity ID, an entity name, and an entity type for the user badge are provided within the interface. The interface 3600 includes an edit entity button for editing the details, relationships, and/or metadata of the user object.

Referring now to FIGS. 37-40 are interfaces 3700-4000 for editing relationships of an entity graph are shown, according to an exemplary embodiment. In FIG. 37, an entity "Alex Nader" is shown. The relationships tab is selected in FIG. 37 and details of the various relationships of the "Alex Nader" entity are shown. An indication of the total number of relationships, four, and an indication of a total number of relationship types are shown, six. The various relationships to other entities are shown individually in the interface of FIG. 37, e.g., a "BRICK_hasCredentials" relationship is shown and a "Brick_isSameAs" relationship is shown. The interface of FIG. 37 includes an add relationship button allowing a user to add new relationships for the "Alex Nader" entity.

Figure 39:
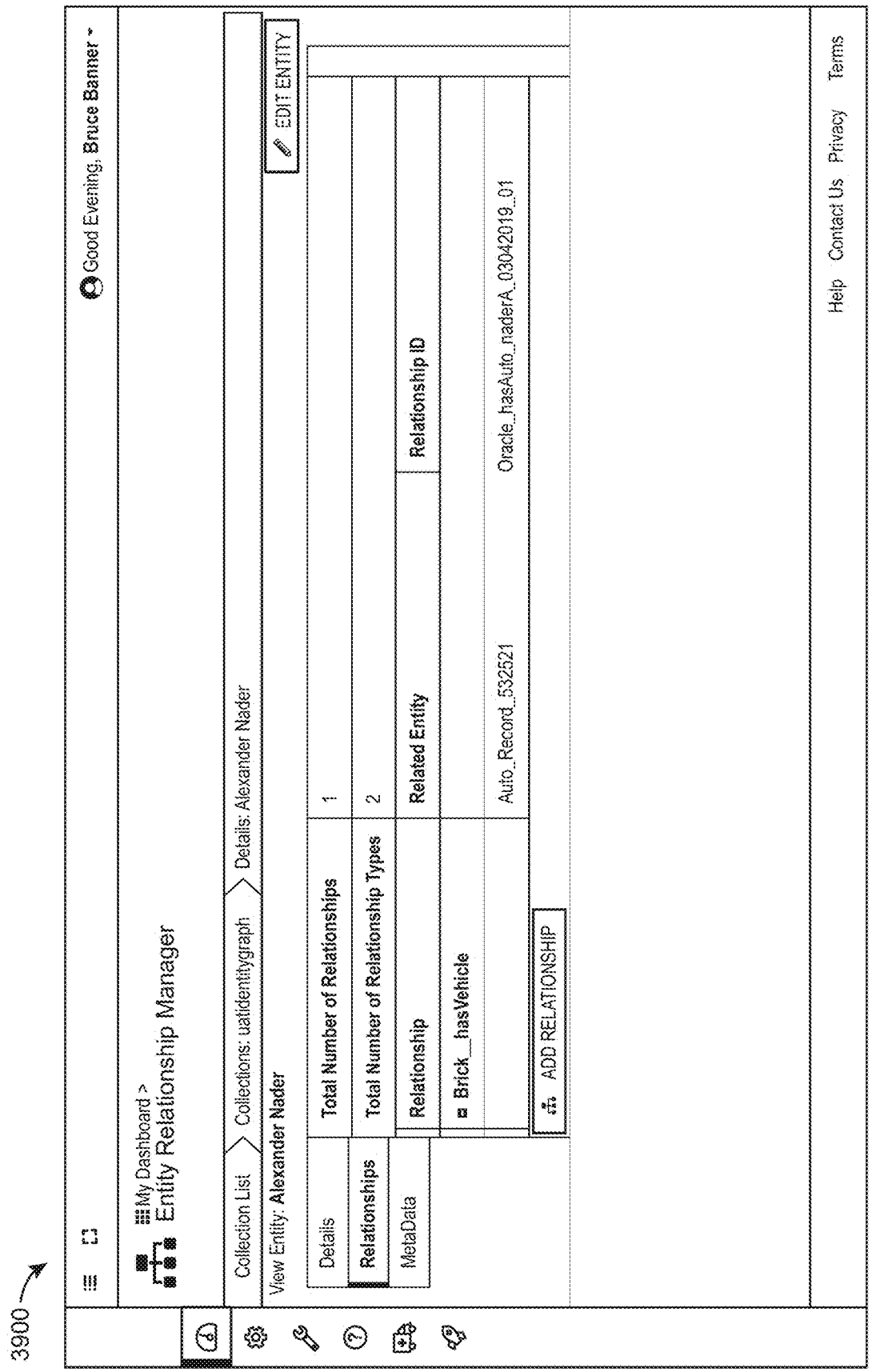
Figure 40:
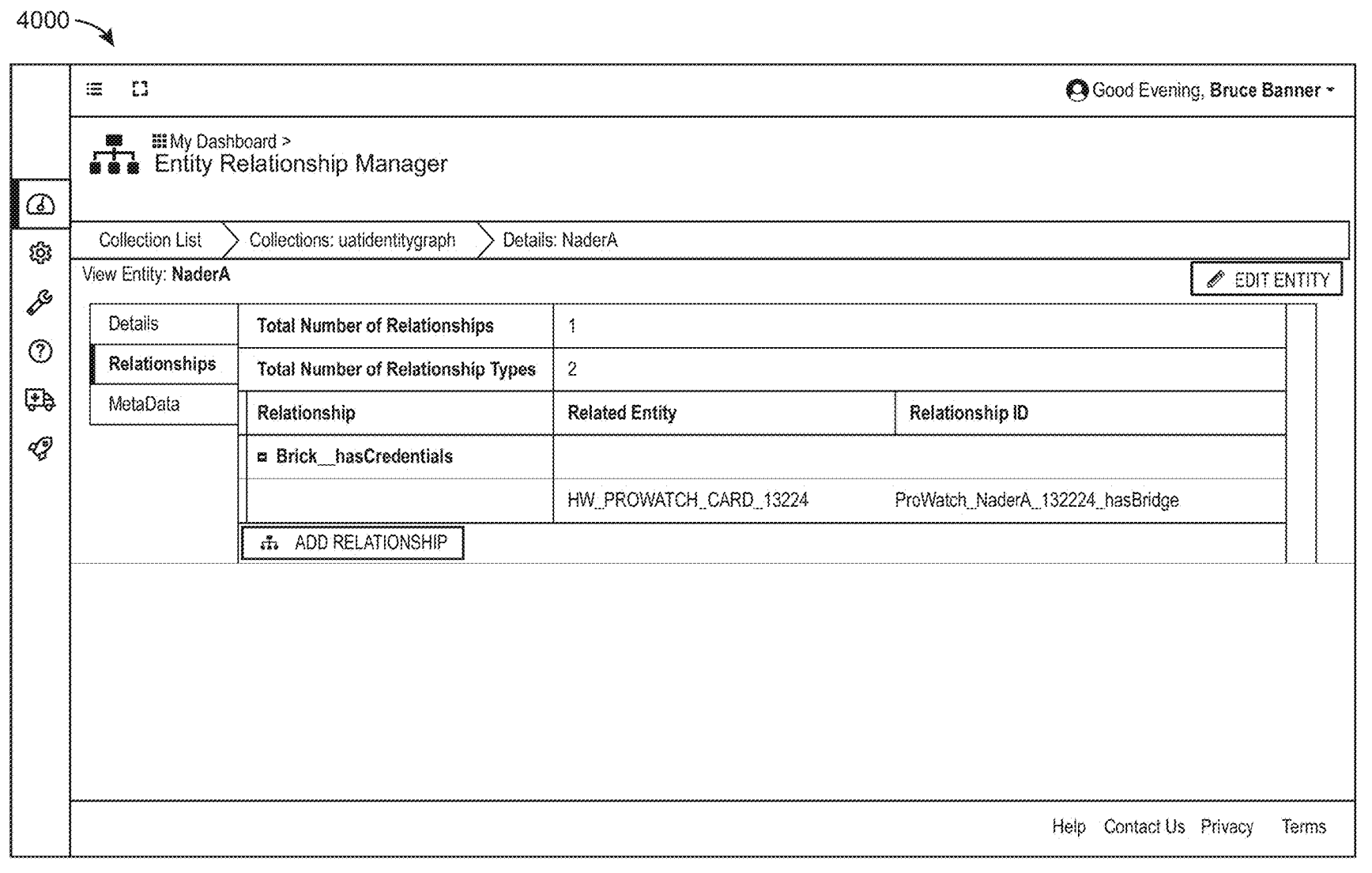

In FIG. 38, a user deletes a relationship for the "Alex Nader" entity described in FIG. 37. In response to deleting the entity, the interface of FIG. 38 updates the indication of the total number of relationships to three and updates the indication of the total number of relationship types to five. FIGS. 39-40 indicate the relationships of another entity, "Alexander Nader." The interfaces 3900-4000 of FIGS. 39-40 indicate that a total number of relationships for the entity is one while the total number of relationships types is two.

Figure 41:
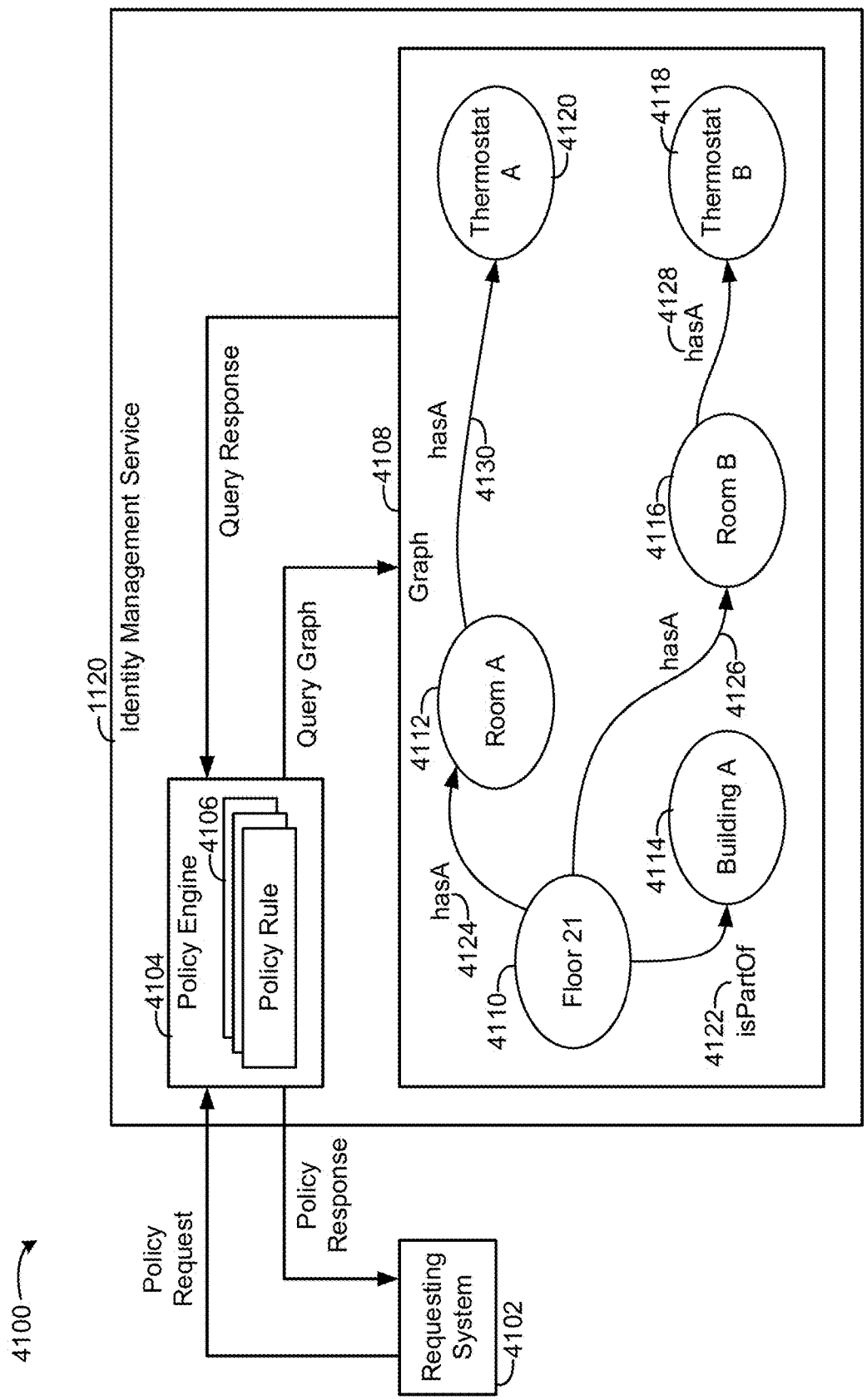
FIG. 41 is a block diagram of the identity management service of FIG. 11 that includes a policy engine that interprets policy rules against a graph, according to an exemplary embodiment.

Referring now to FIG. 41, a system 4100 including the identity management service 1120 that includes a policy engine 4104 that interprets policy rules 4106 against a graph 4108 is shown, according to an exemplary embodiment. The identity management service 1120 receives a policy request from a requesting system 4102. The requesting system 4102 can be an internal or external component of the system 4100. For example, the requesting system 4102 can be a software component, a user device, a system, etc. The policy request can be a request for read access to information, write access to information, access control for spaces, login requests for systems, etc. The policy request can indicate a question, e.g., whether a particular entity (e.g., user, system, space, group, organization, etc.) has access to perform a certain operation (e.g., read information, write information, access a space, make a control command, login to an application, etc.).

The policy engine 4104 can store the policy rules 4106 which define whether an entity (e.g., user, device, system, space, group, organization etc.) has access to perform a certain operation. For example, a rule could be "Tom has access to Floor 21," "Thermostat A can control temperature in Building A," "John can text Steve," "Members of Organization B and message Team Leader Pete," "Steve can login to a control software application," "Joe can control the temperature in room B." Various other rules can be included by the policy rules 4106. The policy engine 4104 can interpret the policy request against the policy rules 4106 by searching through the policy rules 4106 to identity one or more rules associated with the policy request and then determining whether the one or more rules confirm or deny a request for an action by the policy request.

In some embodiments, the policy engine 4104 to interpret the policy rules 4106 against the graph 4108 to determine whether to approve or deny the policy request. The graph 4108 can be the identity graph or the entity graphs discussed with reference to FIGS. 1-40. The graph 4108 includes nodes 4110-4120 and edges 4122-4130 between the nodes 4110-4120. The graph 4108 includes a "floor 21" node 4110 related to a "room A" edge 4124. The graph 4108 includes a "hasA" edge 4126 between the "floor 21" node 4110 and a "room B" node 4116. The graph 4108 includes an "isPartOf" edge 4122 between the "floor 21" node 4110 and the "building A" node 4114. The "room A" node 4112 is related to a "thermostat A" node 4120 by a "hasA" edge 4130. A "room B" node 4116 is related to a "thermostat B" node 4118 by a "hasA" edge 4128.

As an example, if the requesting system 4102 provides a policy request "Does Tom have access to Floor 21" the requesting system 4102 can check the policy rules 4106 and find the a policy rule "Tom has Access to Building A" exists. The policy engine 4104 can generate a query to determine whether the Floor 21 is located on the Building A, and thus whether Tom has access to the Floor 21 because Tom has access to the Building A. The query can identify the "isPartOf" edge 4122 between the "floor 21" node 4110 and the "building A" node 4114, identifying that the floor 21 is part of the building A and thus Tom should have access to the floor 21. The policy engine 4104 can receive a response to the query and provide a policy response including approval to the requesting system 4102.

Another policy request may be "Can thermostat A control temperature in Room A?" Based on the request, the policy engine 4104 can identify a policy rule "Thermostat A can control temperature in Building A." The policy engine 4104 can search the graph 4108 to determine whether the Room A is part of the Building A, and thus that the Thermostat A has the ability to control the temperature in the Room A. The query that the policy engine 4104 generates against the graph 4108 can identity that the "floor 21" node 4110 is related to the "building A" node 4114 by the "isPartOf" edge 4122 and furthermore that the "floor 21" node 4110 is related to the "room A" node 4112 by the "hasA" edge 4124. Responsive to identity the relationship between the Room A and the Building A, the policy engine 4104 can respond to the requesting system 4102 with an approval that the thermostat A can control the temperature in the Room A.

Another policy request can be "Can Joe control Thermostat B?" Based on the request, the policy engine 4104 can identity a policy rule 4106 is that "Joe can control the temperature in room B." The policy engine 4104 can query the graph 4108 to determine whether the thermostat B is associated with the room B, indicating that Joe can control the thermostat B. The policy engine 4104 can query the graph 4108 to identity the "hasA" edge 4128 between the "room B" node 4116" and the "thermostat B" node 4118. Based on the identification of the edge 4128, the policy engine 4104 can determine that Joe can control the Thermostat B, the policy engine 4104 can provide the policy response including approval for Joe to control the Thermostat B to the requesting system 4102.

Figure 42:
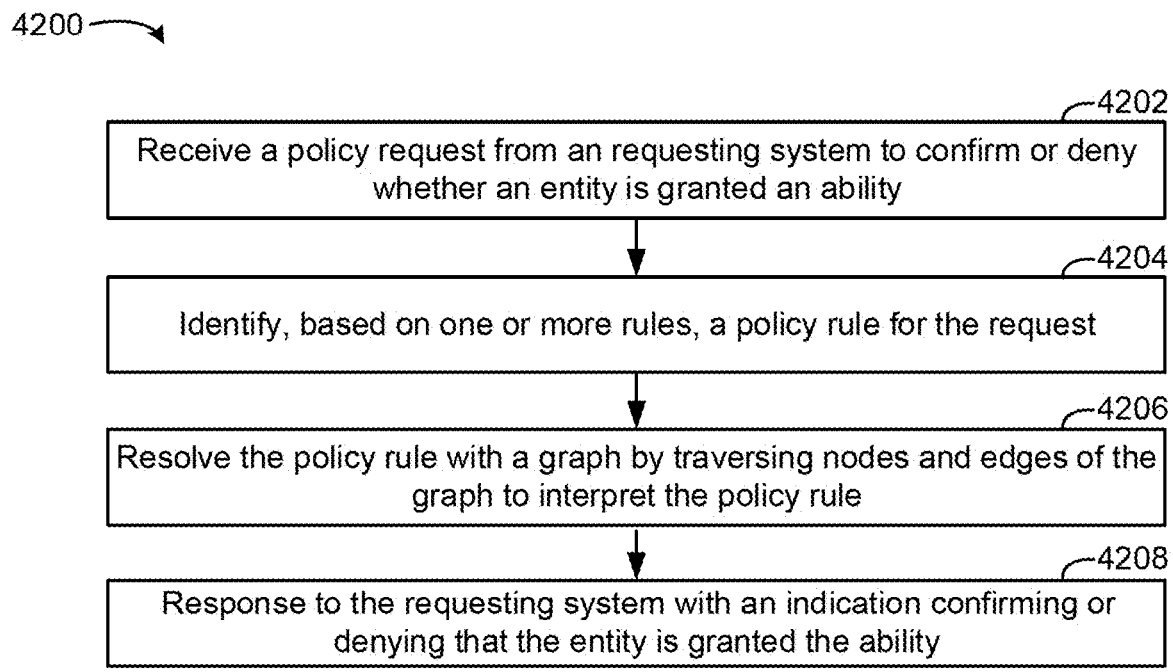
FIG. 42 is a flow diagram of a process interpreting policy rules against a graph to determine whether to confirm or deny a policy request, according to an exemplary embodiment.

Referring now to FIG. 42 is a flow diagram of a process 4200 interpreting policy rules against a graph to determine whether to confirm or deny a policy request is shown, according to an exemplary embodiment. The process 2400 can be performed by the identity management service 1120 and is described with reference to FIG. 41, in some embodiments. Any computing device described herein can be configure dot perform the process 4200.

In step 4202, the identity management service 1120 can receive a policy request from the requesting system 4102 to confirm or deny whether an entity is granted an ability. The entity may be a person, a device, a system, a space, etc. The ability may be a read ability, a write ability, a control ability, a login ability, a physical space access ability, etc.

In step 4204, the identity management service 1120 can identify, based on the policy rules 4106, a policy rule that relates to the request received in the step 4204. For example, the request may be used by the identity management service 1120 to search through the policy rules 4106 to identity the policy rule that relates to the request.

In step 4206, the identity management service 1120 can resolve the policy rule identified in the step 4204 by traversing nodes and/or edges of the graph 4108. The traversal of the graph 4108 can resolve and explain the policy rule in order to determine whether to approve or reject the policy request received in the step 4202. In step 4208, based on the determination made in the step 4206, the identity management service 1120 can respond to the requesting system 4102 with an indication confirming or denying that the entity is granted the ability.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed:

1. A system for identity management, the system comprising one or more memory devices storing instructions thereon that, when executed by one or more processors, cause the one or more processors to:
   receive, from a first entity, a request associated with a piece of information;
   query, responsive to receipt of the request, a graph database to identify a permission associated with the first entity, the graph database storing a plurality of permissions associated with a plurality of entities, and wherein respective permissions of the plurality of permissions indicate pieces of information accessible by respective entities of the plurality of entities;
   detect, responsive to querying the graph database, a first edge stored in the graph database, the first edge between a first node representing the first entity and a second node representing the permission associated with the first entity;
   identify, responsive to detection of the first edge, the permission associated with the first entity; and
   transmit, to the first entity, one or more signals to grant the request associated with the piece of information.

2. The system of claim 1, wherein the graph database stores:
   a plurality of nodes including the first node and the second node, and the plurality of nodes representing respective identities for the plurality of entities and at least one of a role of the first entity, an organization of the first entity, or a group associated with the first entity; and
   a plurality of edges including the first edge, the plurality of edges between the plurality of nodes representing relationships between the plurality of entities.

3. The system of claim 1, wherein the one or more signals to grant the request associated with the piece of information are transmitted responsive to a determination that the permission of the first entity provides access to the piece of information.

4. The system of claim 1, wherein the instructions further cause the one or more processors to:
   receive, from a second entity, a second request to access a second piece of information;
   identify, responsive to querying the graph database, a second permission associated with the second entity;
   determine, based on one or more characteristics of the second permission, that the second permission precludes the second entity from accessing the second piece of information; and
   transmit, to the second entity, one or more second signals to indicate that the second entity is prevented from accessing the second piece of information.

5. The system of claim 4, wherein the instructions further cause the one or more processors to:
   receive, from a second system, an indication of a change to the second permission of the second entity;
   update, responsive to receipt of the indication, the graph database to reflect the change to the second permission of the second entity; and
   transmit, to the second entity, one or more third signals to grant access to the second piece of information responsive to the change to the second permission allowing access to the second piece of information.

6. The system of claim 1, wherein the first entity is at least one of a device, an application, or a second system.

7. The system of claim 1, wherein querying the graph database to identify the permission associated with the first entity includes identifying that the first edge links the first node representing the first entity with the second node representing the permission associated with the first entity.

8. The system of claim 1, wherein the instructions further cause the one or more processors to identify the permission associated with the first entity by:
   identifying a policy rule of a plurality of policy rules that applies to the permission; and
   interpreting the policy rule by querying the graph database to identify information of the graph database, the information providing an interpretation of the policy rule that indicates whether the first entity has the permission.

9. A method for identity management, the method comprising:
   receiving, by one or more processing circuits, from a first entity, a request associated with a piece of information;
   querying, by the one or more processing circuits, responsive to receipt of the request, a graph database to identify a permission associated with the first entity, the graph database storing a plurality of permissions associated with a plurality of entities, and wherein respective permissions of the plurality of permissions indicate pieces of information accessible by respective entities of the plurality of entities;
   detecting, by the one or more processing circuits, responsive to querying the graph database, a first edge stored in the graph database, the first edge between a first node representing the first entity and a second node representing the permission associated with the first entity;

identifying, by the one or more processing circuits, responsive to detection of the first edge, the permission associated with the first entity; and transmitting, by the one or more processing circuits, to the first entity, one or more signals to grant the request associated with the piece of information.

10. The method of claim 9, wherein the graph database stores:
a plurality of nodes including the first node and the second node, and the plurality of nodes representing respective identities for the plurality of entities and at least one of a role of the first entity, an organization of the first entity, or a group associated with the first entity; and
a plurality of edges including the first edge, the plurality of edges between the plurality of nodes representing relationships between the plurality of entities.

11. The method of claim 9, wherein the one or more signals to grant the request associated with the piece of information are transmitted responsive to a determination that the permission of the first entity provides access to the piece of information.

12. The method of claim 9, further comprising:
receiving, by the one or more processing circuits, from a second entity, a second request to access a second piece of information;
identifying, by the one or more processing circuits, responsive to querying the graph database, a second permission associated with the second entity;
determining, by the one or more processing circuits, based on one or more characteristics of the second permission, that the second permission precludes the second entity from accessing the second piece of information; and
transmitting, by the one or more processing circuits, to the second entity, one or more second signals to indicate that the second entity is prevented from accessing the second piece of information.

13. The method of claim 12, further comprising:
receiving, by the one or more processing circuits, from a second system, an indication of a change to the second permission of the second entity;
updating, by the one or more processing circuits, responsive to receipt of the indication, the graph database to reflect the change to the second permission of the second entity; and
transmitting, by the one or more processing circuits, to the second entity, one or more third signals to grant access to the second piece of information responsive to the change to the second permission allowing access to the second piece of information.

14. The method of claim 9, wherein the first entity is at least one of a device, an application, or a second system.

15. The method of claim 9, wherein querying, by the one or more processing circuits, the graph database to identify the permission associated with the first entity includes identifying, by the one or more processing circuits, that the first edge links the first node representing the first entity with the second node representing the permission associated with the first entity.

16. The method of claim 9, wherein identifying, by the one or more processing circuits, the permission associated with the first entity includes:
identifying, by the one or more processing circuits, a policy rule of a plurality of policy rules that applies to the permission; and
interpreting, by the one or more processing circuits, the policy rule by querying the graph database to identify information of the graph database, the information providing an interpretation of the policy rule that indicates whether the first entity has the permission.

17. One or more non-transitory storage media storing instructions thereon that, when executed by one or more processors, cause the one or more processors to:
receive, from a first entity, a request associated with a piece of information;
query, responsive to receipt of the request, a graph database to identify a permission associated with the first entity, the graph database storing a plurality of permissions associated with a plurality of entities, and wherein respective permissions of the plurality of permissions indicate pieces of information accessible by respective entities of the plurality of entities;
detect, responsive to querying the graph database, that the permission is associated with a first node representing the first entity within the graph database; and
transmit, to the first entity, one or more signals to grant the request associated with the piece of information.

18. The one or more non-transitory storage media of claim 17, wherein the graph database stores:
a plurality of nodes including the first node, and the plurality of nodes representing respective identities for the plurality of entities and at least one of a role of the first entity, an organization of the first entity, or a group associated with the first entity; and
a plurality of edges between the plurality of nodes representing relationships between the plurality of entities.

19. The one or more non-transitory storage media of claim 17, wherein the one or more signals to grant the request associated with the piece of information are transmitted responsive to a determination that the permission of the first entity provides access to the piece of information.

20. The one or more non-transitory storage media of claim 17, wherein the instructions further cause the one or more processors to:
receive, from a second entity, a second request to access a second piece of information;
identify, responsive to querying the graph database, a second permission associated with the second entity;
determine, based on one or more characteristics of the second permission, that the second permission precludes the second entity from accessing the second piece of information; and
transmit, to the second entity, one or more second signals to indicate that the second entity is prevented from accessing the second piece of information.

* * * * *